US010800702B2

(12) United States Patent
Akino et al.

(10) Patent No.: US 10,800,702 B2
(45) Date of Patent: Oct. 13, 2020

(54) DISPERSANT COMPOSITION FOR HYDRAULIC COMPOSITIONS FOR CENTRIFUGAL MOLDING

(71) Applicant: KAO CORPORATION, Tokyo (JP)

(72) Inventors: Yusuke Akino, Wakayama (JP);
Yusuke Yoshinami, Wakayama (JP);
Koji Koyanagi, Wakayama (JP);
Masaaki Shimoda, Wakayama (JP);
Keisuke Nakamura, Wakayama (JP);
Shunya Tanaka, Wakayama (JP);
Kazuya Saida, Wakayama (JP)

(73) Assignee: KAO CORPORATION, Tokyo (JP)

( * ) Notice: Subject to any disclaimer, the term of this patent is extended or adjusted under 35 U.S.C. 154(b) by 330 days.

(21) Appl. No.: 15/580,367

(22) PCT Filed: Mar. 15, 2016

(86) PCT No.: PCT/JP2016/058145
§ 371 (c)(1),
(2) Date: Dec. 7, 2017

(87) PCT Pub. No.: WO2016/199467
PCT Pub. Date: Dec. 15, 2016

(65) Prior Publication Data
US 2018/0162775 A1 Jun. 14, 2018

(30) Foreign Application Priority Data

Jun. 8, 2015 (JP) .................................. 2015-115692

(51) Int. Cl.
*C04B 24/22* (2006.01)
*B28B 1/20* (2006.01)
*C04B 28/02* (2006.01)
*C04B 40/00* (2006.01)
*B28B 7/42* (2006.01)
*C04B 24/32* (2006.01)
*C04B 28/04* (2006.01)
*C04B 103/40* (2006.01)
*C04B 111/56* (2006.01)

(52) U.S. Cl.
CPC ............. *C04B 24/226* (2013.01); *B28B 1/20* (2013.01); *B28B 7/42* (2013.01); *C04B 24/32* (2013.01); *C04B 28/02* (2013.01); *C04B 28/04* (2013.01); *C04B 40/0039* (2013.01); *C04B 2103/408* (2013.01); *C04B 2111/56* (2013.01)

(58) Field of Classification Search
CPC ....... C04B 24/226; C04B 24/32; C04B 28/02; C04B 40/0039; C04B 28/04; B28B 1/20; B28B 7/42
See application file for complete search history.

(56) References Cited

U.S. PATENT DOCUMENTS

| 10,322,967 | B2 | 6/2019 | Saida et al. |
| 10,322,968 | B2 | 6/2019 | Tanaka et al. |
| 10,322,969 | B2 | 6/2019 | Saida et al. |
| 2004/0250737 | A1 | 12/2004 | Yaguchi et al. |
| 2006/0293417 | A1 | 12/2006 | Taniguchi et al. |

FOREIGN PATENT DOCUMENTS

| AU | 2002338709 A1 | 4/2003 |
| CA | 2 460 926 A1 | 3/2003 |
| CN | 1880260 A | 12/2006 |
| CN | 101863079 A | 10/2010 |
| EP | 1 427 681 A2 | 6/2004 |
| EP | 1433768 A1 | 6/2004 |
| EP | 1 427 681 B1 | 4/2010 |
| JP | 46-28525 | 4/1973 |
| JP | 50-150724 | 12/1975 |
| JP | 55-23047 A | 2/1980 |
| JP | 60-11255 A | 1/1985 |
| JP | 61-197456 A | 9/1986 |
| JP | 61-281054 A | 12/1986 |
| JP | 5-70199 A | 3/1993 |
| JP | 6-41385 B2 | 6/1994 |
| JP | 8-12397 A | 1/1996 |
| JP | 9-328345 A | 12/1997 |
| JP | 11-60312 A | 3/1999 |
| JP | 2003-165755 A | 6/2003 |
| JP | 2007-261119 A | 10/2007 |
| JP | 4294259 B2 | 7/2009 |
| JP | 2010-47467 A | 3/2010 |
| JP | 2012-144385 A | 8/2012 |

(Continued)

OTHER PUBLICATIONS

International Preliminary Report on Patentability and English translation of the Written Opinion of the International Searching Authority (Forms PCT/IB/373 and PCT/ISA/237) dated Dec. 12, 2017, for International Application No. PCT/JP2016/058145.

(Continued)

*Primary Examiner* — John E Uselding
(74) *Attorney, Agent, or Firm* — Element IP, PLC

(57) ABSTRACT

A method for producing a hardened product of a hydraulic composition, includes mixing water, a hydraulic powder, a dispersant composition, and an aggregate to prepare a hydraulic composition, filling the hydraulic composition into a mold, and steam curing, in the mold, the hydraulic composition filled into the mold. The dispersant composition includes (A) a formaldehyde naphthaienesulfonate condensate or a salt thereof, (B) a compound having an alkylenoxy group, and optionally (C) a polycarboxylic acid-based copolymer, in particular proportions.

18 Claims, No Drawings

(56) References Cited

FOREIGN PATENT DOCUMENTS

| JP | 2014-94873 A | 5/2014 |
|----|----|----|
| JP | 2014-185043 A | 10/2014 |
| WO | WO 03/024885 A2 | 3/2003 |
| WO | WO 03/024885 A3 | 3/2003 |

OTHER PUBLICATIONS

Chinese Office Action and Search Report, dated Jan. 20, 2020 for Chinese Application No. 201680028187.3, with an English translation of the Chinese Office Aciton.
International Search Report, issued in PCT/JP2016/058145, dated May 10, 2016.
Kagaku Jiten (Chemistry Dictionary), 1st edition, 7th issue, published by Tokyo Kagaku Dojin Kabushiki Kaisha, Apr. 1, 2003.
Extended European Search Report for European Application No. 16807174.4, dated Dec. 14, 2018.

DISPERSANT COMPOSITION FOR HYDRAULIC COMPOSITIONS FOR CENTRIFUGAL MOLDING

FIELD OF THE INVENTION

The present invention relates to a dispersant composition for hydraulic compositions for centrifugal molding, a hydraulic composition for centrifugal molding, a dispersant composition for hydraulic compositions for steam curing, a hydraulic composition for steam curing, and a method for producing a hardened product of a hydraulic composition.

Further, the present invention relates to use of a predetermined composition as a dispersant for hydraulic compositions for centrifugal molding or a dispersant for hydraulic compositions for steam curing. Further, the present invention relates to use of other predetermined composition as a hydraulic composition for centrifugal molding.

Further, the present invention relates to use of other predetermined composition as a hydraulic composition for steam curing.

BACKGROUND OF THE INVENTION

Dispersants for hydraulic compositions are chemical admixtures, and used for dispersing cement particles, thereby reducing a unit water quantity necessary for achieving a required slump and enhancing workability and the like of a hydraulic composition. Examples of conventionally-known dispersants include naphthalene-based dispersants such as a formaldehyde naphthalenesulfonate condensate, polycarboxylic acid-based dispersants such as a copolymer of a carboxylic acid and a monomer having an alkylene glycol chain, and melamine-based dispersants such as a melaminesulfonic acid-formaldehyde condensate.

Compared to polycarboxylic acid-based dispersants, dispersants for hydraulic powders composed of an aromatic ring-containing high-molecular compound, such as naphthalene-based dispersants, are characterized in that they have smaller fluctuations in exhibiting the fluidity in response to changes of materials or temperatures, and a hydraulic composition produced therefrom has a relatively low viscosity and they are easy to use in manufacturing a hydraulic composition.

Dispersants for hydraulic powders composed of an aromatic ring-containing high-molecular compound, such as naphthalene-based dispersants, are characterized in that they have smaller fluctuations in exhibiting the fluidity in response to changes of materials or temperatures, and a hydraulic composition produced therefrom has a relatively low viscosity and they are easy to use in manufacturing a hydraulic composition. In particular, they are suitable for centrifugal molding as they have a good centrifugal moldability (without sludge or rock pockets).

JP-A 61-281054 describes a concrete chemical admixture, which contains a cement dispersant and a specific nonionic surfactant at a predetermined weight ratio.

JP-A 2003-165755 describes a workability-improving agent for improving workability of a cement composition, which contains a specific polyalkylene oxide derivative and/or a specific hydrocarbon derivative. JP-A 2003-165755 also describes a cement water-reducing agent containing the workability-improving agent and a water-reducing agent.

JP-A 60-011255 describes a slurry, which is composed of water and a hydraulic composition containing a β naphthalenesulfonic acid formaldehyde condensate and a nonionic surfactant having an oxyethylene chain.

JP-A 55-023047 describes a cement additive, which is composed of a formalin condensate of a metal salt of naphthalenesulfonate and a polyoxyethylene-based compound.

JP-A 48-028525 describes a method for manufacturing a concrete product, which includes molding a desired concrete product with concrete additionally containing an anionic surfactant, and performing atmospheric pressure steam curing of the molded product.

Meanwhile, use of a surfactant as a cement chemical admixture has been conventionally proposed. JP-A 50-150724 describes a cement chemical admixture, which contains an anionic surfactant of sulfuric ester type and a polyoxyalkylene- or polyhydric alcohol-based nonionic surfactant.

SUMMARY OF THE INVENTION

A centrifugal molding method is known as a method for producing a hollow cylindrical concrete molded product such as tubes, piles and poles among concrete molded products. This centrifugal molding method is a method, which includes feeding kneaded concrete materials into a mold and compacting concrete while pushing against an inner surface of the mold by a centrifugal force generated by rotating the mold at a high speed.

Generally in Japan, when producing concrete piles of which a high strength is required, a high strength admixture is added to concrete and steam curing is conducted to ensure the strength that allows shipping in seven days from kneading.

Concrete piles include a construction pile used as a foundation pillar for a structure. Construction piles are required to have a higher strength along with the tendency toward great sizes and high-rises of structures, and in recent years, high strength piles having a concrete design strength of greater than 100 N/mm$^2$ come into existence. Then, from now on, it is considered that molded products having a further higher strength, such as molded products having a concrete design strength of greater than 123 N/mm$^2$ may be demanded.

However, in the case of a molded product having a concrete design strength of greater than 123 N/mm$^2$, even when an amount to be added of a dispersant for hydraulic powders composed of an aromatic ring-containing high-molecular compound is increased, the strength improvement for a centrifugally-molded product reaches a level of saturation.

In addition, when an amount to be added of a dispersant for hydraulic powders composed of an aromatic ring-containing high-molecular compound is increased, an unhardened hydraulic composition is in a highly dispersed state; and if such hydraulic composition is used for centrifugal molding, a considerable volume of sludge is generated, resulting in a deteriorated surface property of a hardened product.

The present invention provides a dispersant composition for hydraulic compositions, which enables to obtain a hydraulic composition that provides a high-strength hardened product by centrifugally molding and has an excellent moldability.

Among concrete molded products, for producing large-sized civil engineering concrete products such as a box culvert, an L-shaped retaining wall or a segment; or small-sized concrete products such as a side ditch, a floor board, or a block, in general, steam curing is widely used as an accelerated curing method. Further, in recent years, from the viewpoint of the durability or the economic efficiency, precast structure members have been manufactured for high strength building components. One of main purposes of this steam curing is to accelerate hardening and enhance a use frequency of a mold per unit period, for example, per one day. Possible measures to shorten a period for reuse of a mold include shortening a preparatory period (presteaming period) and curing at a high temperature, but an inappropriate curing condition may significantly deteriorate the durability of concrete.

For large-sized civil engineering concrete products and precast structure members for building, of which a high strength is required, it is necessary to add a larger amount of dispersant for hydraulic powders composed of an aromatic ring-containing high-molecular compound, and a hydration reaction of cement is delayed. This requires a longer presteaming period in steam curing method, and it is considered undesirable for the viewpoint of increasing a use frequency of a mold. In order to solve this problem, reduction of the period by curing at a high temperature may be considered, but this may cause fine cracks on the surface or the inner part of concrete, or generate a change of fine pore structure, considerably deteriorating the durability.

The present invention provides a dispersant composition for hydraulic compositions, which provides a high-strength hardened product by steam curing and can enhance the frequency of use of a mold per unit period, for example, per one day.

The present invention relates to a dispersant composition for hydraulic compositions for centrifugal molding, which includes:

(A) a dispersant for hydraulic powders composed of an aromatic ring-containing high-molecular compound; and
(B) one or more compounds selected from compounds represented by the following general formula (B1), compounds represented by the following general formula (B2), compounds represented by the following general formula (B3) and compounds represented by the general formula (B4), X represents O or COO;

AO represents an alkyleneoxy group having a carbon number of 2 or more and 4 or less;

$n_1$ represents an average number of moles of added AO and is 1 or more and 200 or less;

$n_2$ represents an average number of moles of added AO and is 1 or more and 200 or less;

$n_3$ and $n_4$ are the same or different, and each represents an average number of moles of added AO and is 0 or more, and the total of $n_3$ and $n_4$ is 1 or more and 200 or less;

$Y^1$ and $Y^2$ are the same or different, and each represents a hydrogen atom or $SO_3M$, and at least one of $Y^1$ and $Y^2$ is $SO_3M$;

$n_5$ and $n_6$ are the same or different; each represents an average number of moles of added AO and is 0 or more; the total of $n_5$ and $n_6$ is 1 or more and 200 or less; when $n_5$ is 0, $Y^1$ is a hydrogen atom; and when $n_6$ is 0, $Y^2$ is a hydrogen atom; and M is a counter ion.

Further, the present invention relates to a hydraulic composition for centrifugal molding, which includes the dispersant composition for hydraulic compositions for centrifugal molding of the above-described present invention, a hydraulic powder, an aggregate and water, wherein a ratio of water/hydraulic powder is 10 mass % or more and 25 mass % or less.

Furthermore, the present invention relates to a dispersant composition for hydraulic compositions for steam curing, which includes:

(A) a dispersant for hydraulic powders composed of an aromatic ring-containing high-molecular compound; and
(B) one or more compounds selected from compounds represented by the following general formula (B1), compounds represented by the following general formula (B2), compounds represented by the following general formula (B3) and compounds represented by the general formula (B4), wherein a content ratio of (B) is 1 mass % or more and 60 mass % or less relative to a total content of (A) and (B),

[Chemical Formula 1]

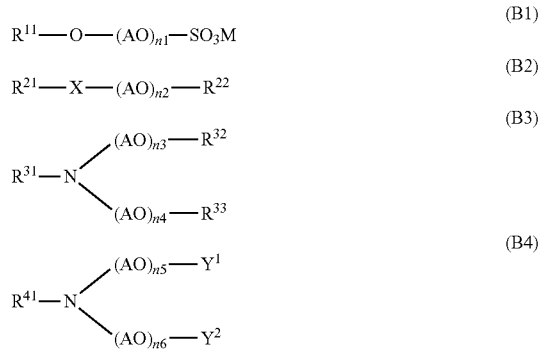

[Chemical Formula 2]

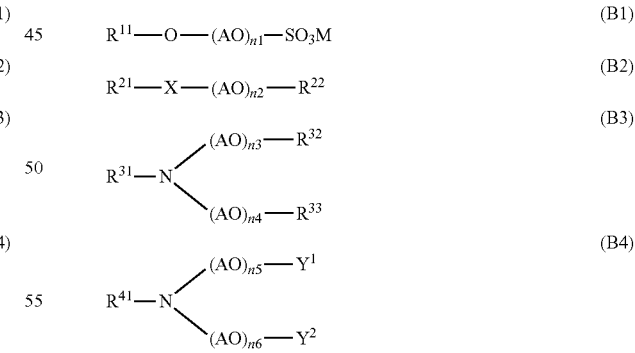

wherein $R^{11}$, $R^{21}$, $R^{31}$ and $R^{41}$ each independently represent a hydrocarbon group having a carbon number of 4 or more and 27 or less;

$R^{22}$ represents a hydrogen atom or an alkyl group having a carbon number of 1 or more and 3 or less;

$R^{32}$ and $R^{33}$ are the same or different, and each represents a hydrogen atom or an alkyl group having a carbon number of 1 or more and 3 or less;

wherein $R^{11}$, $R^{21}$, $R^{31}$ and $R^{41}$ each independently represent a hydrocarbon group having a carbon number of 4 or more and 27 or less;

$R^{22}$ represents a hydrogen atom or an alkyl group having a carbon number of 1 or more and 3 or less;

$R^{32}$ and $R^{33}$ are the same or different, and each represents a hydrogen atom or an alkyl group having a carbon number of 1 or more and 3 or less;

X represents 0 or COO;

AO represents an alkyleneoxy group having a carbon number of 2 or more and 4 or less;

$n_1$ represents an average number of moles of added AO and is 1 or more and 200 or less;

$n_2$ represents an average number of moles of added AO and is 1 or more and 200 or less;

$n_3$ and $n_4$ are the same or different, and each represents an average number of moles of added AO and is 0 or more, and the total of $n_3$ and $n_4$ is 1 or more and 200 or less;

$Y^1$ and $Y^2$ are the same or different, and each represents a hydrogen atom or $SO_3M$, and at least one of $Y^1$ and $Y^2$ is $SO_3M$;

$n_5$ and $n_6$ are the same or different; each represents an average number of moles of added AO and is 0 or more; the total of $n_5$ and $n_6$ is 1 or more and 200 or less; when $n_5$ is 0, $Y^1$ is a hydrogen atom; and when $n_6$ is 0, $Y^2$ is a hydrogen atom; and M is a counter ion.

Further, the present invention relates to a hydraulic composition for steam curing, which includes: the dispersant composition for hydraulic compositions for steam curing of the above-described present invention, a hydraulic powder, an aggregate and water, wherein a ratio of water/hydraulic powder is 10 mass % or more and 53 mass % or less, and a total content of (A) and (B) is 0.25 parts by mass or more and 10 parts by mass or less relative to 100 parts by mass of the hydraulic powder.

Moreover, the present invention relates to a method for producing a hardened product of a hydraulic composition, which includes the following steps.

Step 1: mixing water, a hydraulic powder, an aggregate and the dispersant composition for hydraulic compositions for centrifugal molding of the above-described present invention to prepare a hydraulic composition having a water/hydraulic powder ratio of 10 mass % or more and 25 mass % or less.

Step 2: filling the hydraulic composition obtained in step 1 into a mold.

Step 3: compacting the hydraulic composition filled into the mold in step 2 by applying a centrifugal force.

Step 4: setting, in the mold, the hydraulic composition compacted in step 3.

Further, the present invention relates to a method for producing a hardened product of a hydraulic composition, which includes the following steps.

Step 1': mixing water, a hydraulic powder, an aggregate and the dispersant composition for hydraulic compositions for steam curing of the above-described present invention to prepare a hydraulic composition having a water/hydraulic powder ratio of 10 mass % or more and 53 mass % or less, wherein the dispersant composition for hydraulic compositions for steam curing is mixed so that a ratio of a mixing amount of (B) is 1 mass % or more and 60 mass % or less relative to a total mixing amount of (A) and (B) and the total mixing amount of (A) and (B) is 0.25 parts by mass or more and 10 parts by mass or less relative to 100 parts by mass of the hydraulic powder.

Step 2': filling the hydraulic composition obtained in step 1' into a mold.

Step 5': steam-curing, in the mold, the hydraulic composition filled into the mold in step 2'.

Further, the present invention relates to a method for producing a hardened product of a hydraulic composition, which includes the following steps.

Step 1: mixing water, a hydraulic powder, the following (A), the following (B) and an aggregate to prepare a hydraulic composition for centrifugal molding having a water/hydraulic powder ratio of 10 mass % or more and 25 mass % or less.

Step 2: filling the hydraulic composition obtained in step 1 into a mold.

Step 3: compacting the hydraulic composition filled into the mold in step 2 by applying a centrifugal force.

Step 4: setting, in the mold, the hydraulic composition compacted in step 3.

(A) a dispersant for hydraulic powders composed of an aromatic ring-containing high-molecular compound; and (B) one or more compounds selected from compounds represented by the following general formula (B1), compounds represented by the following general formula (B2), compounds represented by the following general formula (B3) and compounds represented by the general formula (B4).

Further, the present invention relates to a method for producing a hardened product of a hydraulic composition, which includes the following steps.

Step 1': mixing water, a hydraulic powder, the following (A), the following (B) and an aggregate to prepare a hydraulic composition for steam curing having a water/hydraulic powder ratio of 10 mass % or more and 53 mass % or less, wherein (A) and (B) are mixed so that a ratio of a mixing amount of (B) is 1 mass % or more and 60 mass % or less relative to a total mixing amount of (A) and (B) and the total mixing amount of (A) and (B) is 0.25 parts by mass or more and 10 parts by mass or less relative to 100 parts by mass of the hydraulic powder.

Step 2': filling the hydraulic composition obtained in step 1' into a mold.

Step 5': steam-curing, in the mold, the hydraulic composition filled into the mold in step 2'.

(A) a dispersant for hydraulic powders composed of an aromatic ring-containing high-molecular compound; and (B) one or more compounds selected from compounds represented by the following general formula (B1), compounds represented by the following general formula (B2), compounds represented by the following general formula (B3) and compounds represented by the general formula (B4).

Further, the present invention relates to a method for producing a hardened product of a hydraulic composition, which includes the following steps.

Step 1: mixing water, a hydraulic powder, the following (A), the following (B), the following (C) and an aggregate to prepare a hydraulic composition having a water/hydraulic powder ratio of 10 mass % or more and 25 mass % or less.

Step 2: filling the hydraulic composition obtained in step 1 into a mold.

Step 3: compacting the hydraulic composition filled into the mold in step 2 by applying a centrifugal force.

Step 4: setting, in the mold, the hydraulic composition compacted in step 3.

(A) a dispersant for hydraulic powders composed of an aromatic ring-containing high-molecular compound;

(B) one or more compounds selected from compounds represented by the following general formula (B1), compounds represented by the following general formula (B2), compounds represented by the following general formula (B3) and compounds represented by the general formula (B4); and (C) a polycarboxylic acid-based copolymer.

Further, the present invention relates to a method for producing a hardened product of a hydraulic composition, which includes the following steps.

Step 1': mixing water, a hydraulic powder, the following (A), the following (B), the following (C) and an aggregate to prepare a hydraulic composition having a water/hydraulic powder ratio of 10 mass % or more and 53 mass % or less, wherein (A) and (B) are mixed so that a ratio of a mixing amount of (B) is 1 mass % or more and 60 mass % or less relative to a total mixing amount of (A) and (B) and the total mixing amount of (A) and (B) is 0.25 parts by mass or more and 10 parts by mass or less relative to 100 parts by mass of the hydraulic powder.

Step 2': filling the hydraulic composition obtained in step 1' into a mold.

Step 5': steam-curing, in the mold, the hydraulic composition filled into the mold in step 2'.

(A) a dispersant for hydraulic powders composed of an aromatic ring-containing high-molecular compound;

(B) one or more compounds selected from compounds represented by the following general formula (B1), compounds represented by the following general formula (B2), compounds represented by the following general formula (B3) and compounds represented by the general formula (B4); and (C) a polycarboxylic acid-based copolymer.

Hereinafter, (A) a dispersant for hydraulic powders composed of a high-molecular compound containing an aromatic ring is referred to as component (A).

Further, compounds represented by the above general formula (B1), compounds represented by the above general formula (B2), compounds represented by the above general formula (B3), and compounds represented by the above general formula (B4) are referred to as compound (B1), compound (B2), compound (B3) and compound (B4), respectively.

Further, compound (B1), compound (B2), compound (B3) and compound (B4) are collectively referred to as component (B).

Further, (C) a polycarboxylic acid-based copolymer is referred to as component (C).

The present invention provides a dispersant composition for hydraulic compositions, which enables to obtain a hydraulic composition that provides a high-strength hardened product by centrifugal molding and has an excellent moldability. The dispersant composition for hydraulic compositions of the present invention is for a hydraulic composition for centrifugal molding or a hydraulic composition for steam curing.

Embodiments of the Invention

[Dispersant Composition for Hydraulic Compositions]

Hereinafter, the dispersant composition for hydraulic compositions for centrifugal molding of the present invention and the dispersant composition for hydraulic compositions for steam curing of the present invention are explained collectively as a dispersant composition for hydraulic compositions. In the following descriptions, a dispersant composition for hydraulic compositions refers to, unless otherwise specified, both or one of the dispersant composition for hydraulic compositions for centrifugal molding of the present invention and the dispersant composition for hydraulic compositions for steam curing of the present invention.

The matters pertaining to the dispersant composition for hydraulic compositions for centrifugal molding of the present invention are applicable to the dispersant composition for hydraulic compositions for steam curing of the present invention.

The matters pertaining to the dispersant composition for hydraulic compositions for steam curing of the present invention are applicable to the dispersant composition for hydraulic compositions for centrifugal molding of the present invention.

A mechanism for exhibiting effects of the present invention is unknown, but assumed as follows.

A dispersant for hydraulic powders composed of an aromatic ring-containing high-molecular compound like a naphthalene-based dispersant, which is component (A) of the present invention, has an electrostatic repulsion, and has a much more excellent centrifugal moldability than a dispersant having a strong steric repulsion.

In the present invention, combined use of component (A) and a specific compound of component (B) enables the control of an adsorption rate (efficient cement adsorption), and thereby enhancement of water-reduction (lowering of an amount to be added) and lowering of delay are achieved. It is speculated that the lowering of an amount to be added and the lowering of delay increase hydration active points of cement, so that the effect of strength enhancement can be imparted.

When the water/hydraulic powder ratio is low, the ionic strength is high. Thus, in general, the dispersivity of component (A) to the hydraulic powder is less likely to develop. However, in the present invention, it is believed that the above-described approach including enhancing of water-reduction and lowering of delay enables a tremendous performance improvement.

<Component (A)>

Component (A) is a dispersant for hydraulic powders composed of an aromatic ring-containing high-molecular compound. As an aromatic ring, exemplified are a benzene ring, a naphthalene ring, an anthracene ring, and a triazine ring.

Component (A) is preferably a dispersant for hydraulic powders composed of a high-molecular compound having an aromatic ring-containing monomer unit.

As the aromatic ring-containing monomer unit, exemplified are one or more monomer units selected from a benzene ring-containing monomer unit, a naphthalene ring-containing monomer unit and a triazine ring-containing monomer unit.

From the viewpoint of the centrifugal moldability and/or the strength development of a hardened product, component (A) is preferably a dispersant for hydraulic powders composed of a high-molecular compound having a naphthalene ring-containing monomer unit.

Examples of component (A) more preferably include formaldehyde naphthalenesulfonate condensates or salts thereof. Formaldehyde naphthalenesulfonate condensates or salts thereof are a condensate of naphthalenesulfonic acid and formaldehyde or salts thereof. A formaldehyde naphthalenesulfonate condensate may be co-condensated with an aromatic compound capable of co-condensating with a naphthalenesulfonate, as a monomer, for example, methylnaphthalene, ethylnaphthalene, butylnaphthalene, hydroxynaphthalene, naphthalene carboxylic acid, anthracene, phenol, cresol, creosote oil, tar, melamine, urea, sulfanilic acid and/or derivatives thereof as long as it does not impair the performance.

Examples of formaldehyde naphthalenesulfonate condensates or salts thereof to be used include commercially available products such as Mighty 150, Demol N, Demol RN, Demol MS, Demol SN-B, and Demol SS-L (all manufactured by Kao Corporation); and Cellflow 120, Lavelin FD-40, and Lavelin FM-45 (all manufactured by DKS Co., Ltd.).

The formaldehyde naphthalenesulfonate condensate or the salt thereof has, from the viewpoint of the centrifugal moldability and/or the strength development of a hardened product and the viewpoint of fluidity enhancement of a hydraulic composition, a weight average molecular weight of preferably 200,000 or less, more preferably 100,000 or less, further preferably 80,000 or less, further more preferably 50,000 or less, and further more preferably 30,000 or less. The formaldehyde naphthalenesulfonate condensate or the salt thereof has, from the viewpoint of the centrifugal moldability and/or the strength development of a hardened product and the viewpoint of fluidity enhancement of a hydraulic composition, a weight average molecular weight of preferably 1,000 or more, more preferably 3,000 or more, further preferably 4,000 or more, and further more preferably 5,000 or more. The formaldehyde naphthalenesulfonate condensate may be in an acidic state or a neutralized product.

The molecular weight of a formaldehyde naphthalenesulfonate condensate or a salt thereof can be measured using a gel permeation chromatography (GPC) under the following conditions.

[GPC Condition]
Column: G4000SWXL+G2000SWXL (Tosoh Corporation)
Eluent: 30 mM $CH_3COONa/CH_3CN=6/4$
Flow rate: 0.7 ml/min
Detection: UV 280 nm
Sample size: 0.2 mg/ml
Standard substance: in terms of sodium polystyrene sulfonate (monodispersed sodium polystyrene sulfonate: molecular weight, 206, 1800, 4000, 8000, 18000, 35000, 88000, 780000) manufactured by Nishio Kogyo Kabushiki Kaisha
Detector: UV-8020 (Tosoh Corporation)

A method for manufacturing a formaldehyde naphthalenesulfonate condensate or a salt thereof includes, for example, a method for obtaining a condensate by condensation reaction of a naphthalenesulfonate with formaldehyde. The condensate may be neutralized. Further, a water insoluble substance generated as a by-product of neutralization may be removed. Specifically, in order to obtain a naphthalenesulfonate, 1.2 to 1.4 mol of sulfuric acid is used relative to 1 mol of naphthalene and reacted with each other for 2 to 5 hours at 150° C. to 165° C., so that a sulfonated product is obtained. Next, formalin is added dropwise at 85° C. to 95° C. for 3 to 6 hours to provide 0.95 to 0.99 mol of formaldehyde relative to 1 mol of the sulfonated product, and condensation reaction is conducted at 95° C. to 105° C. after the dropwise addition. Further, an aqueous solution of the obtained condensate has a high acidity. Thus, from the viewpoint of preventing metallic corrosion of a storage tank or the like, water and a neutralizer are added to the obtained condensate and they may be subjected to neutralizing process at 80° C. to 95° C. It is preferred that the 1.0 to 1.1 molar equivalent of neutralizer be added to the naphthalenesulfonate and unreacted sulfuric acid. Further, as a method for removing a water insoluble product generated by neutralization, separation by filtration is preferred. Through these processes, an aqueous solution of a water soluble salt of formaldehyde naphthalenesulfonate condensate is obtained. This aqueous solution can be used as-is as an aqueous solution of component (A). Further, if needed, the aqueous solution is dried and powdered, and a powdered salt of formaldehyde naphthalenesulfonate condensate can be obtained, and this may be used as component (A).

Drying and reduction to powder can be conducted by spray drying, drum drying, freeze-drying or the like.

Examples of component (A) include, in addition to a formaldehyde naphthalenesulfonate condensate or a salt thereof, a phenol-based dispersant, a lignin-based dispersant, melamine-based dispersant and a styrene sulfonate-based dispersant.

<Component (B)>
<Compound (B1)>

Compound (B1) is compounds represented by the above general formula (B1).

In the general formula (B1), $R^{11}$ is a hydrocarbon group having a carbon number of 4 or more and 27 or less. This hydrocarbon group includes a substituent-containing hydrocarbon group.

A substituent mentioned in the present specification is an atom or an atomic group, which is introduced instead of a hydrogen atom in a most basic organic compound (KA-GAKU JITEN (Chemistry Dictionary), 1st edition, 7th issue, Tokyo Kagaku Dojin Kabushiki Kaisha, Apr. 1, 2003). A substituent-containing hydrocarbon may be a derivative of the hydrocarbon. A derivative is a compound, wherein when a certain hydrocarbon is considered as a parent body, a modification that does not largely change a structure or properties of the parent body, such as introduction of a functional group, oxidation, reduction or atom substitution, is made.

Examples of hydrocarbon groups of $R^{11}$ include an alkyl group, an alkenyl group, an aralkyl group, an aryl group, and an aryl group having a substituent (hereinafter, referred to as substituted aryl group). From the viewpoint of the centrifugal moldability and/or the strength development of a hardened product after centrifugal molding, the hydrocarbon group of $R^{11}$ is preferably a group selected from an alkyl group, an alkenyl group and a substituted aryl group, and more preferably a group selected from an alkenyl group and a substituted aryl group.

From the viewpoint of the centrifugal moldability and/or the strength development of a hardened product after centrifugal molding, the alkyl group of $R^{11}$ is preferably an aliphatic alkyl group, and more preferably a linear aliphatic alkyl group.

From the viewpoint of the centrifugal moldability and/or the strength development of a hardened product after centrifugal molding, the alkenyl group of $R^{11}$ is preferably an aliphatic alkenyl group, and more preferably a linear aliphatic alkenyl group.

The substituted aryl group of $R^{11}$ is an aryl group wherein a hydrogen atom of an aromatic ring is substituted by a substituent, and examples thereof include an aryl group wherein a hydrogen atom of an aromatic ring is substituted by a hydrocarbon group. The carbon number of the substituted aryl group including a substituent is 4 or more and 27 or less. Examples of the substituted aryl group include aryl groups wherein one, two or three hydrogen atoms of an aromatic ring are substituted by a substituent such as a hydrocarbon group. The aryl group for the substituted aryl group is preferably a phenyl group. Examples of the substituted aryl group include a substituted aryl group having a carbon number of 13 or more and 27 or less. Examples of the substituent for the substituted aryl group include a hydrocarbon group having a carbon number of 1 or more and 10 or less.

Examples of the substituted aryl group include groups selected from an alkyl group-substituted phenyl group having a carbon number of preferably 1 or more and further preferably 2 or more, and preferably 10 or less and further preferably 8 or less; a benzyl group-substituted phenyl group; and a styrenated phenyl group. As the substituted aryl group, exemplified is a group selected from a benzyl group-substituted phenyl group and a styrenated phenyl group.

The substituted aryl group is preferably a group selected from a monobenzyl phenyl group, a dibenzyl phenyl group, a tribenzyl phenyl group, a monostyrenated phenyl group, and a distyrenated phenyl group; more preferably a group selected from a tribenzyl phenyl group and a distyrenated phenyl group.

From the viewpoint of the centrifugal moldability and/or the strength development of a hardened product after centrifugal molding and the economic viewpoint, $R^{11}$ is preferably an alkyl group.

From the viewpoint of the centrifugal moldability and/or the strength development of a hardened product after centrifugal molding and the viewpoint of the easy solubility in water, $R^{11}$ is preferably an alkenyl group.

From the viewpoint of the centrifugal moldability and/or the strength development of a hardened product after centrifugal molding and the viewpoint of preventing foaming of a hydraulic composition, $R^{11}$ is preferably a substituted aryl group.

The carbon number of $R^{11}$ is, from the viewpoint of the centrifugal moldability and/or the strength development of a hardened product after centrifugal molding, preferably 8 or more, more preferably 12 or more, and further preferably 16 or more; and preferably 22 or less, more preferably 20 or less, and further preferably 18 or less.

From the viewpoint of the centrifugal moldability and/or the strength development of a hardened product after centrifugal molding, specific examples of $R^{11}$ include groups selected from a hydrocarbon group having a carbon number of preferably 8 or more, further preferably 10 or more, and further more preferably 16 or more; and preferably 22 or less, and further preferably 20 or less; and a hydrocarbon group wherein a hydrogen atom thereof is substituted by a substituent.

From the viewpoint of the centrifugal moldability and/or the strength development of a hardened product after centrifugal molding, other specific examples of $R^{11}$ include groups selected from an alkyl group or an alkenyl group having a carbon number of preferably 8 or more, further preferably 10 or more, further more preferably 16 or more, and preferably 22 or less, and further preferably 20 or less, and a group wherein a hydrogen atom of the alkyl or alkenyl group is substituted by a substituent.

From the viewpoint of the centrifugal moldability and/or the strength development of a hardened product after centrifugal molding, other specific examples of $R^{11}$ include groups selected from:

an alkyl group, preferably an aliphatic alkyl group, and more preferably a linear aliphatic alkyl group, having a carbon number of preferably 8 or more, further preferably 10 or more and further more preferably 16 or more, and preferably 22 or less and further preferably 20 or less; and an alkenyl group, preferably an aliphatic alkenyl group, and more preferably a linear aliphatic alkenyl group, having a carbon number of preferably 8 or more, further preferably 10 or more and further more preferably 16 or more, and preferably 22 or less and further preferably 20 or less.

From the viewpoint of the centrifugal moldability and/or the strength development of a hardened product after centrifugal molding and the viewpoint of preventing foaming of a hydraulic composition, $R^{11}$ is preferably a substituted aryl group and more preferably a distyrenated phenyl group.

Examples of hydrocarbon groups of $R^{11}$ include, as described above, an alkyl group, an alkenyl group, an aralkyl group, an aryl group, and an aryl group having a substituent (hereinafter, referred to as substituted aryl group). From the viewpoint of the strength development of a hardened product after steam curing, the hydrocarbon group of $R^{11}$ is preferably a group selected from an alkyl group, an alkenyl group and a substituted aryl group, and more preferably a group selected from an alkenyl group and a substituted aryl group.

From the viewpoint of the strength development of a hardened product after steam curing, the alkenyl group of $R^{11}$ is preferably an aliphatic alkenyl group, and more preferably a linear aliphatic alkenyl group.

The substituted aryl group of $R^{11}$ is an aryl group wherein a hydrogen atom of an aromatic ring is substituted by a substituent, and examples thereof include an aryl group wherein a hydrogen atom of an aromatic ring is substituted by a hydrocarbon group. The carbon number of the substituted aryl group including a substituent is 4 or more and 27 or less. Examples of the substituted aryl group include aryl groups wherein one, two or three hydrogen atoms of an aromatic ring are substituted by a substituent such as a hydrocarbon group. The aryl group for the substituted aryl group is preferably a phenyl group. Examples of the substituted aryl group include a substituted aryl group having a carbon number of 13 or more and 27 or less. Examples of the substituent for the substituted aryl group include a hydrocarbon group having a carbon number of 1 or more and 10 or less.

Examples of the substituted aryl group include groups selected from an alkyl group-substituted phenyl group having a carbon number of preferably 1 or more and further preferably 2 or more, and preferably 10 or less and further preferably 8 or less; a benzyl group-substituted phenyl group; and a styrenated phenyl group. As the substituted aryl group, exemplified is a group selected from a benzyl group-substituted phenyl group and a styrenated phenyl group.

The substituted aryl group is preferably a group selected from a monobenzyl phenyl group, a dibenzyl phenyl group, a tribenzyl phenyl group, a monostyrenated phenyl group, and a distyrenated phenyl group; more preferably a group selected from a tribenzyl phenyl group and a distyrenated phenyl group.

From the viewpoint of the strength development of a hardened product after steam curing and the viewpoint of the easy solubility in water, $R^{11}$ is preferably an alkenyl group.

From the viewpoint of the strength development of a hardened product after steam curing and the viewpoint of preventing foaming of a hydraulic composition, $R^{11}$ is preferably a substituted aryl group.

The carbon number of $R^{11}$ is, from the viewpoint of the strength development of a hardened product after steam curing, preferably 8 or more, more preferably 12 or more, and further preferably 16 or more; and preferably 22 or less.

From the viewpoint of the strength development of a hardened product after steam curing, specific examples of $R^{11}$ include groups selected from an alkyl group or an alkenyl group having a carbon number of preferably 8 or more, further preferably 10 or more, further more preferably 16 or more, and preferably 22 or less, and further preferably 20 or less, and a group wherein a hydrogen atom of the alkyl or alkenyl group is substituted by a substituent.

From the viewpoint of the strength development of a hardened product after steam curing, other specific examples of $R^{11}$ include groups selected from:

an alkyl group, preferably an aliphatic alkyl group, and more preferably a linear aliphatic alkyl group, having a carbon number of preferably 8 or more, further preferably 10 or more and further more preferably 16 or more, and preferably 22 or less and further preferably 20 or less; and an alkenyl group, preferably an aliphatic alkenyl group, and more preferably a linear aliphatic alkenyl group, having a carbon number of preferably 8 or more, further preferably 10 or more and further more preferably 16 or more, and preferably 22 or less and further preferably 20 or less.

Further, from the viewpoint of the strength development of a hardened product after steam curing and the viewpoint of preventing foaming of a hydraulic composition, $R^{11}$ is preferably a substituted aryl group, and more preferably a group selected from a tribenzyl phenyl group and a distyrenated phenyl group.

More specific examples of $R^{11}$ include groups selected from a decyl group, a lauryl group, a myristyl group, a palmityl group, a stearyl group, a behenyl group, an isostearyl group, an oleyl group, a tribenzyl phenyl group, and a distyrenated phenyl group; preferably groups selected from a lauryl group, a myristyl group, a palmityl group, a stearyl group, a behenyl group, an isostearyl group, an oleyl group, a tribenzyl phenyl group, and a distyrenated phenyl group; more preferably groups selected from a lauryl group, a myristyl group, a palmityl group, a stearyl group, an oleyl group, a tribenzyl phenyl group, and a distyrenated phenyl group; and further more preferably groups selected from an oleyl group, a stearyl group, a distyrenated phenyl group and a tribenzyl phenyl group. These groups are preferred from the viewpoint of the strength development of a hardened product after steam curing and the viewpoint of the fluidity improvement. Further, these groups are preferred from the viewpoint of the centrifugal moldability and/or the strength development of a hardened product after centrifugal molding.

In the general formula (B1), AO represents an alkyleneoxy group having a carbon number of 2 or more and 4 or less, and from the viewpoint of the centrifugal moldability and/or the strength development of a hardened product, preferably one or more groups selected from an alkyleneoxy group having a carbon number of 2 and an alkyleneoxy group having a carbon number of 3. From the viewpoint of the centrifugal moldability and/or the strength development of a hardened product, AO preferably includes an alkyleneoxy group having a carbon number of 2.

In the general formula (B1), $n_1$ represents an average number of moles of added AO, and from the viewpoint of the centrifugal moldability and/or the strength development of a hardened product and the viewpoint of the cement dispersibility, it is 1 or more and 200 or less. $n_1$ is, from the viewpoint of the centrifugal moldability and/or the strength development of a hardened product after centrifugal molding and the viewpoint of the fluidity improvement, preferably 10 or more, more preferably 20 or more; and from the viewpoint of the likelihood of interaction with component (A) and the economic viewpoint and the viewpoint of the centrifugal moldability and/or the strength development of a hardened product after centrifugal molding, preferably 60 or less and more preferably 40 or less.

When $R^{11}$ is a substituted aryl group, $n_1$ is, from the viewpoint of the strength development of a hardened product after steam curing, preferably 10 or more, more preferably 15 or more, and further preferably 25 or more; and preferably 65 or less, more preferably 50 or less, further preferably 40 or less, and further more preferably 35 or less.

When $R^{11}$ is an alkenyl group, $n_1$ is, from the viewpoint of the strength development of a hardened product after steam curing, preferably 5 or more, more preferably 8 or more, and further preferably 9 or more; and preferably 65 or less, more preferably 50 or less, further preferably 40 or less, further more preferably 35 or less, further more preferably 25 or less, further more preferably 20 or less, and further more preferably 12 or less.

When $R^{11}$ is an alkyl group, $n_1$ is, from the viewpoint of the strength development of a hardened product after steam curing, preferably 15 or more, and more preferably 20 or more; and preferably 55 or less, and more preferably 30 or less.

In the general formula (B1), M is a counter ion, and examples thereof include ions selected from a hydrogen ion, an alkali metal ion, an alkaline earth metal ion (½ atom) and an ammonium ion.

From the viewpoint of the centrifugal moldability and/or the strength development of a hardened product and the viewpoint of ease of manufacturing a compound, M is preferably an ammonium ion.

From the viewpoint of the centrifugal moldability and/or the strength development of a hardened product and the viewpoint of the offensive smell of a compound, M is preferably an alkali metal ion, more preferably an alkali metal ion selected from a sodium ion and a potassium ion.

Examples of the compound (B1) include polyoxyethylene alkenyl ether sulfuric esters such as polyoxyethylene oleyl ether sulfuric ester, or salts thereof; and polyoxyethylene substituted aryl ether sulfuric esters such as polyoxyethylene distyrenated phenyl ether sulfuric ester, or salts thereof.

<Compound (B2)>

Compound (B2) is compounds represented by the above general formula (B2).

In the general formula (B2), $R^{21}$ is a hydrocarbon group having a carbon number of 4 or more and 27 or less. This hydrocarbon group includes a substituent-containing hydrocarbon group. Substituents therefor are as mentioned for compound (B1).

Examples of hydrocarbon groups of $R^{21}$ include an alkyl group, an alkenyl group, an aralkyl group, an aryl group, and an aryl group having a substituent (hereinafter, referred to as substituted aryl group). From the viewpoint of the centrifugal moldability and/or the strength development of a hardened product after centrifugal molding, the hydrocarbon group of $R^{21}$ is preferably a group selected from an alkyl group and an alkenyl group.

From the viewpoint of the centrifugal moldability and/or the strength development of a hardened product after centrifugal molding, the alkyl group of $R^{21}$ is preferably an aliphatic alkyl group, and more preferably a linear aliphatic alkyl group.

From the viewpoint of the centrifugal moldability and/or the strength development of a hardened product after centrifugal molding, the alkenyl group of $R^{21}$ is preferably an aliphatic alkenyl group, and more preferably a linear aliphatic alkenyl group.

The substituted aryl group of $R^{21}$ is an aryl group wherein a hydrogen atom of an aromatic ring is substituted by a substituent, and examples thereof include an aryl group wherein a hydrogen atom of an aromatic ring is substituted by a hydrocarbon group. The carbon number of the substituted aryl group including a substituent is 4 or more and 27 or less. Examples of the substituted aryl group include aryl groups wherein one, two or three hydrogen atoms of an aromatic ring are substituted by a substituent such as a hydrocarbon group. The aryl group for the substituted aryl group is preferably a phenyl group. Examples of the substituted aryl group include a substituted aryl group having a carbon number of 13 or more and 27 or less. Examples of the substituent for the substituted aryl group include a hydrocarbon group having a carbon number of 1 or more and 10 or less.

Examples of the substituted aryl group include groups selected from an alkyl group-substituted phenyl group having a carbon number of preferably 1 or more and further preferably 2 or more, and preferably 10 or less and further preferably 8 or less; a benzyl group-substituted phenyl group; and a styrenated phenyl group. As the substituted aryl group, exemplified is a group selected from a benzyl group-substituted phenyl group and a styrenated phenyl group.

The substituted aryl group is preferably a group selected from a monobenzyl phenyl group, a dibenzyl phenyl group, a tribenzyl phenyl group, a monostyrenated phenyl group, and a distyrenated phenyl group; more preferably a group selected from a tribenzyl phenyl group and a distyrenated phenyl group.

From the viewpoint of the centrifugal moldability and/or the strength development of a hardened product after centrifugal molding and the economic viewpoint, $R^{21}$ is preferably an alkyl group.

From the viewpoint of the centrifugal moldability and/or the strength development of a hardened product after centrifugal molding and the viewpoint of the easy solubility in water, $R^{21}$ is preferably an alkenyl group.

The carbon number of $R^{21}$ is, from the viewpoint of the centrifugal moldability and/or the strength development of a hardened product after centrifugal molding and the viewpoint of the dispersibility improvement, preferably 8 or more, more preferably 12 or more, and further preferably 16 or more; and preferably 22 or less, more preferably 20 or less, and further preferably 18 or less.

From the viewpoint of the centrifugal moldability and/or the strength development of a hardened product after centrifugal molding, specific examples of $R^{21}$ include groups selected from a hydrocarbon group having a carbon number of preferably 10 or more and further preferably 12 or more, and preferably 22 or less and further preferably 20 or less; and a hydrocarbon group wherein a hydrogen atom thereof is substituted by a substituent.

From the viewpoint of the centrifugal moldability and/or the strength development of a hardened product after centrifugal molding, other specific examples of $R^{21}$ include groups selected from an alkyl group or an alkenyl group having a carbon number of preferably 10 or more and further preferably 12 or more, and preferably 22 or less and further preferably 20 or less; a group wherein a hydrogen atom of the alkyl or alkenyl group is substituted by a substituent; and a phenyl group substituted by a hydrocarbon group.

From the viewpoint of the centrifugal moldability and/or the strength development of a hardened product after centrifugal molding, other specific examples of $R^{21}$ include groups selected from:

an alkyl group, preferably an aliphatic alkyl group, and more preferably a linear aliphatic alkyl group, having a carbon number of preferably 10 or more and further preferably 12 or more, and preferably 22 or less and further preferably 20 or less; and an alkenyl group, preferably an aliphatic alkenyl group, and more preferably a linear aliphatic alkenyl group, having a carbon number of preferably 10 or more and further preferably 12 or more, and preferably 22 or less and further preferably 20 or less. Further, other specific examples of $R^{21}$ include groups selected from a phenyl group substituted by an alkyl group having a carbon number of preferably 1 or more and further preferably 2 or more, and preferably 10 or less and further preferably 8 or less; a benzyl group-substituted phenyl group; and a styrenated phenyl group.

More specific examples of $R^{21}$ include groups selected from a decyl group, a lauryl group, a myristyl group, a palmityl group, a stearyl group, a behenyl group, an isostearyl group, and an oleyl group; from the viewpoint of the centrifugal moldability and/or the strength development of a hardened product after centrifugal molding and the viewpoint of the fluidity improvement, preferably groups selected from a lauryl group, a myristyl group, a palmityl group, a stearyl group, a behenyl group, an isostearyl group, and an oleyl group; and more preferably groups selected from a lauryl group, a myristyl group, a palmityl group, a stearyl group, and an oleyl group.

Examples of hydrocarbon groups of $R^{21}$ include, as described above, an alkyl group, an alkenyl group, an aralkyl group, an aryl group, and an aryl group having a substituent (hereinafter, referred to as substituted aryl group). From the viewpoint of the strength development of a hardened product after steam curing, the hydrocarbon group of $R^{21}$ is preferably a group selected from a substituted aryl group and an alkenyl group.

The substituted aryl group of $R^{21}$ is an aryl group substituted by a hydrocarbon group, and examples thereof include a substituted aryl group having a carbon number of 13 or more and 27 or less.

The substituted aryl group of $R^{21}$ is an aryl group wherein a hydrogen atom of an aromatic ring is substituted by a substituent, and examples thereof include an aryl group wherein a hydrogen atom of an aromatic ring is substituted by a hydrocarbon group. The carbon number of the substituted aryl group including a substituent is 4 or more and 27 or less. Examples of the substituted aryl group include aryl groups wherein one, two or three hydrogen atoms of an aromatic ring are substituted by a substituent such as a hydrocarbon group. The aryl group for the substituted aryl group is preferably a phenyl group. Examples of the substituted aryl group include a substituted aryl group having a carbon number of 13 or more and 27 or less. Examples of the substituent for the substituted aryl group include a hydrocarbon group having a carbon number of 1 or more and 10 or less.

Examples of the substituted aryl group include groups selected from an alkyl group-substituted phenyl group having a carbon number of preferably 1 or more and further preferably 2 or more, and preferably 10 or less and further preferably 8 or less; a benzyl group-substituted phenyl group; and a styrenated phenyl group. As the substituted aryl group, exemplified is a group selected from a benzyl group-substituted phenyl group and a styrenated phenyl group.

The substituted aryl group is preferably a group selected from a monobenzyl phenyl group, a dibenzyl phenyl group, a tribenzyl phenyl group, a monostyrenated phenyl group, and a distyrenated phenyl group; more preferably a group selected from a tribenzyl phenyl group and a distyrenated phenyl group.

From the viewpoint of the strength development of a hardened product after steam curing and the viewpoint of preventing foaming of a hydraulic composition, $R^{21}$ is preferably a substituted aryl group.

From the viewpoint of the strength development of a hardened product after steam curing and the viewpoint of the easy solubility in water, $R^{21}$ is preferably an alkenyl group.

From the viewpoint of the strength development of a hardened product after steam curing, the substituted aryl group of $R^{21}$ is preferably a distyrenated phenyl group.

From the viewpoint of the strength development of a hardened product after steam curing, the alkenyl group of $R^{21}$ is preferably an aliphatic alkenyl group, and more preferably a linear aliphatic alkenyl group.

The carbon number of $R^{21}$ is, from the viewpoint of the strength development of a hardened product after steam curing and the viewpoint of the dispersibility improvement, preferably 8 or more, more preferably 12 or more, and further preferably 16 or more; and preferably 22 or less.

From the viewpoint of the strength development of a hardened product after steam curing and the viewpoint of the dispersibility improvement, specific examples of $R^{21}$ include groups selected from a hydrocarbon group having a carbon number of preferably 10 or more and more preferably 12 or more, and preferably 22 or less; and a hydrocarbon group wherein a hydrogen atom thereof is substituted by a substituent.

From the viewpoint of the strength development of a hardened product after steam curing, other specific examples of $R^{21}$ include groups selected from an alkenyl group having a carbon number of preferably 10 or more and more preferably 12 or more, and preferably 22 or less; a group wherein a hydrogen atom of the alkenyl group is substituted by a substituent; and a substituted aryl group, preferably a hydrocarbon-substituted phenyl group.

From the viewpoint of the strength development of a hardened product after steam curing, other specific examples of $R^{21}$ include groups selected from an alkenyl group, preferably an aliphatic alkenyl group, and more preferably a linear aliphatic alkenyl group, having a carbon number of preferably 10 or less, further preferably 12 or more, and further more preferably 16 or more; and preferably 22 or less, and further preferably 20 or less. Further, the substituted aryl group is preferably a distyrenated phenyl group.

More specific examples of $R^{21}$ include groups selected from a decyl group, a lauryl group, a myristyl group, a palmityl group, a stearyl group, a behenyl group, an isostearyl group, an oleyl group and a distyrenated phenyl group; and from the viewpoint of the strength development of a hardened product after steam curing and the viewpoint of the fluidity improvement, preferably groups selected from a lauryl group, a myristyl group, a palmityl group, a stearyl group, a behenyl group, an isostearyl group, an oleyl group and a distyrenated phenyl group; and more preferably groups selected from a lauryl group, a myristyl group, a palmityl group, a stearyl group, oleyl group and a distyrenated phenyl group.

In the general formula (B2), X represents O or COO, preferably O.

In the general formula (B2), AO represents an alkyleneoxy group having a carbon number of 2 or more and 4 or less, and from the viewpoint of the centrifugal moldability and/or the strength development of a hardened product, preferably one or more groups selected from an alkyleneoxy group having a carbon number of 2 and an alkyleneoxy group having a carbon number of 3. From the viewpoint of the centrifugal moldability and/or the strength development of a hardened product, AO preferably includes an alkyleneoxy group having a carbon number of 2.

In the general formula (B2), $n_2$ represents an average number of moles of added AO, and from the viewpoint of the centrifugal moldability and/or the strength development of a hardened product and the viewpoint of the cement dispersibility, it is 1 or more and 200 or less. $n_2$ is, from the viewpoint of the centrifugal moldability and/or the strength development of a hardened product and the viewpoint of the fluidity improvement, preferably 10 or more, more preferably 20 or more; and from the viewpoint of the likelihood of interaction with component (A) and the economic viewpoint and the viewpoint of the centrifugal moldability and/or the strength development of a hardened product, preferably 60 or less and more preferably 40 or less.

When $R^{21}$ is a substituted aryl group, $n_2$ is, from the viewpoint of the strength development of a hardened product after steam curing, preferably 10 or more, and preferably 25 or less and more preferably 15 or less.

When $R^{21}$ is an alkyl group, $n_2$ is, from the viewpoint of the strength development of a hardened product after steam curing, preferably 1 or more and preferably 5 or less.

When $R^{21}$ is an alkenyl group, $n_2$ is, from the viewpoint of the strength development of a hardened product after steam curing, preferably 5 or more, more preferably 8 or more, and further preferably 10 or more; and preferably 65 or less, more preferably 50 or less, further preferably 40 or less, further more preferably 35 or less, further more preferably 25 or less, and further more preferably 15 or less.

In the general formula (B2), $R^{22}$ is a hydrogen atom or an alkyl group having a carbon number of 1 or more and 3 or less, and preferably a hydrogen atom.

Examples of the compound (B2) include polyoxyethylene alkyl ethers such as polyoxyethylene 2-ethyl hexyl ether, polyoxyethylene decyl ether, polyoxyethylene lauryl ether and polyoxyethylene oleyl ether, and polyoxyethylene alkenyl ethers. Further, examples thereof include polyoxyethylene alkyl esters such as polyoxyethylene monostearate. Further, examples thereof include polyoxyethylene substituted aryl ethers such as polyoxyethylene distyrenated phenyl ether.

<Compound (B3)>

Compound (B3) is compounds represented by the above general formula (B3).

In the general formula (B3), $R^{31}$ is a hydrocarbon group having a carbon number of 4 or more and 27 or less. This hydrocarbon group includes a substituent-containing hydrocarbon group. Substituents therefor are as mentioned for compound (B1).

Examples of hydrocarbon groups of $R^{31}$ include an alkyl group, an alkenyl group, an aralkyl group, an aryl group, and an aryl group having a substituent (hereinafter, referred to as substituted aryl group). Examples of the substituted aryl group include aryl groups wherein one, two or three hydrogen atoms of an aromatic ring are substituted. From the viewpoint of the centrifugal moldability and/or the strength development of a hardened product, the hydrocarbon group of $R^{31}$ is preferably a group selected from an alkyl group and an alkenyl group.

From the viewpoint of the centrifugal moldability and/or the strength development of a hardened product, the alkyl group of $R^{31}$ is preferably an aliphatic alkyl group, more preferably a linear aliphatic alkyl group.

From the viewpoint of the centrifugal moldability and/or the strength development of a hardened product, the alkenyl group of $R^{31}$ is preferably an aliphatic alkenyl group, more preferably a linear aliphatic alkenyl group.

From the viewpoint of the centrifugal moldability and/or the strength development of a hardened product and the economic viewpoint, $R^{31}$ is preferably an alkyl group.

From the viewpoint of the centrifugal moldability and/or the strength development of a hardened product and the viewpoint of easy solubility in water, $R^{31}$ is preferably an alkenyl group.

From the viewpoint of the centrifugal moldability and/or the strength development of a hardened product, the carbon number of $R^{31}$ is selected from preferably 8 or more, more preferably 12 or more, and further preferably 16 or more; and preferably 22 or less, more preferably 20 or less, and further preferably 18 or less.

From the viewpoint of the centrifugal moldability and/or the strength development of a hardened product, specific examples of $R^{31}$ include groups selected from a hydrocarbon group having a carbon number of preferably 10 or more and more preferably 12 or more, and preferably 27 or less, more preferably 26 or less, and further preferably 24 or less; and a hydrocarbon group wherein a hydrogen atom thereof is substituted by a substituent.

From the viewpoint of the centrifugal moldability and/or the strength development of a hardened product, other specific examples of $R^{31}$ include groups selected from an alkyl group or an alkenyl group having a carbon number of preferably 10 or more, more preferably 12 or more, and preferably 27 or less, more preferably 26 or less, further preferably 24 or less; and a group wherein a hydrogen atom of the alkyl or alkenyl group is substituted by a substituent.

From the viewpoint of the centrifugal moldability and/or the strength development of a hardened product, other specific examples of $R^{31}$ include groups selected from:

an alkyl group, preferably an aliphatic alkyl group, and more preferably a linear aliphatic alkyl group, having a carbon number of preferably 10 or more and more preferably 12 or more, and preferably 27 or less, more preferably 26 or less and further preferably 24 or less; and an alkenyl group, preferably an aliphatic alkenyl group, and more preferably a linear aliphatic alkenyl group, having a carbon number of preferably 10 or more and more preferably 12 or more, and preferably 27 or less, more preferably 26 or less and further preferably 24 or less.

More specifically, examples of $R^{3'}$ include groups selected from a decyl group, a lauryl group, a myristyl group, a palmityl group, a stearyl group, a behenyl group, an isostearyl group and an oleyl group; and from the viewpoint of the centrifugal moldability and the strength development of a hardened product and the viewpoint of the fluidity improvement, preferred is a group selected from a lauryl group, a myristyl group, a palmityl group, a stearyl group, a behenyl group, an isostearyl group, and an oleyl group; and more preferred is a group selected from a lauryl group, a myristyl group, a palmityl group, a stearyl group and an oleyl group.

In the general formula (B3), AO represents an alkyleneoxy group having a carbon number of 2 or more and 4 or less, and from the viewpoint of the centrifugal moldability and/or the strength development of a hardened product, preferably one or more groups selected from an alkyleneoxy group having a carbon number of 2 and an alkyleneoxy group having a carbon number of 3. From the viewpoint of the centrifugal moldability and/or the strength development of a hardened product, AO preferably includes an alkyleneoxy group having a carbon number of 2.

In the general formula (B3), $n_3$ and $n_4$ are the same or different, and each represents an average number of moles of added AO and is 0 or more. From the viewpoint of the centrifugal moldability and/or the strength development of a hardened product and the viewpoint of the cement dispersibility, the total of $n_3$ and $n_4$ is 1 or more, preferably 10 or more, more preferably 20 or more; and from the economic viewpoint, 200 or less, preferably 60 or less and more preferably 40 or less.

In the general formula (B3), $R^{32}$ and $R^{33}$ are the same or different, and each represents a hydrogen atom or an alkyl group having a carbon number of 1 or more and 3 or less. $R^{32}$ and $R^{33}$ are each preferably a hydrogen atom from the viewpoint of the centrifugal moldability and/or the strength development of a hardened product.

Examples of the compound (B3) include polyoxyalkylene alkylamine such as polyoxyethylene alkylamine.

<Compound (B4)>

Compound (B4) is compounds represented by the above general formula (B4).

In the general formula (B4), $R^{41}$ is a hydrocarbon group having a carbon number of 4 or more and 27 or less. This hydrocarbon group includes a substituent-containing hydrocarbon group. Substituents therefor are as mentioned for compound (B1).

Examples of hydrocarbon groups of $R^{41}$ include an alkyl group, an alkenyl group, an aralkyl group, an aryl group, and an aryl group having a substituent (hereinafter, referred to as substituted aryl group). Examples of the substituted aryl group include aryl groups wherein one, two or three hydrogen atoms of an aromatic ring are substituted. From the viewpoint of the centrifugal moldability and/or the strength development of a hardened product, the hydrocarbon group of $R^{41}$ is preferably a group selected from an alkyl group and an alkenyl group.

From the viewpoint of the centrifugal moldability and/or the strength development of a hardened product, the alkyl group of $R^{41}$ is preferably an aliphatic alkyl group, and more preferably a linear aliphatic alkyl group.

From the viewpoint of the centrifugal moldability and/or the strength development of a hardened product, the alkenyl group of $R^{41}$ is preferably an aliphatic alkenyl group, and more preferably a linear aliphatic alkenyl group.

From the viewpoint of the centrifugal moldability and/or the strength development of a hardened product and the economic viewpoint, $R^{41}$ is preferably an alkyl group.

From the viewpoint of the centrifugal moldability and/or the strength development of a hardened product and the viewpoint of easy solubility in water, $R^{41}$ is preferably an alkenyl group.

The carbon number of $R^{41}$ is, from the viewpoint of the centrifugal moldability and/or the strength development of a hardened product, preferably 8 or more, more preferably 12 or more, and further preferably 16 or more; and preferably 22 or less, more preferably 20 or less, and further preferably 18 or less.

From the viewpoint of the centrifugal moldability and/or the strength development of a hardened product, specific examples of $R^{41}$ include groups selected from a hydrocarbon group having a carbon number of preferably 10 or more, more preferably 12 or more, and preferably 27 or less, more preferably 26 or less, and further preferably 24 or less; and a hydrocarbon group wherein a hydrogen atom thereof is substituted by a substituent.

From the viewpoint of the centrifugal moldability and/or the strength development of a hardened product, other specific examples of $R^{41}$ include groups selected from an alkyl group or an alkenyl group having a carbon number of preferably 10 or more, more preferably 12 or more, and preferably 27 or less, more preferably 26 or less, further preferably 24 or less; and a group wherein a hydrogen atom of the alkyl or alkenyl group is substituted by a substituent.

From the viewpoint of the centrifugal moldability and/or the strength development of a hardened product, other specific examples of $R^{41}$ include groups selected from:

an alkyl group, preferably an aliphatic alkyl group, and more preferably a linear aliphatic alkyl group, having a carbon number of preferably 10 or more, and more preferably 12 or more, and preferably 27 or less, more preferably 26 or less, and further preferably 24 or less; and an alkenyl group, preferably an aliphatic alkenyl group, and more preferably a linear aliphatic alkenyl group, having a carbon number of preferably 10 or more, and more preferably 12 or more, and preferably 27 or less, more preferably 26 or less, and further preferably 24 or less.

More specific examples of $R^{41}$ include groups selected from a decyl group, a lauryl group, a myristyl group, a palmityl group, a stearyl group, a behenyl group, an isostearyl group, and an oleyl group; from the viewpoint of the strength development of a hardened product and the viewpoint of the fluidity improvement, preferably groups selected from a lauryl group, a myristyl group, a palmityl group, a stearyl group, a behenyl group, an isostearyl group, and an oleyl group; and more preferably groups selected from a lauryl group, a myristyl group, a palmityl group, a stearyl group, and an oleyl group.

In the general formula (B4), AO represents an alkyleneoxy group having a carbon number of 2 or more and 4 or less, and from the viewpoint of the centrifugal moldability and/or the strength development of a hardened product, preferably one or more groups selected from an alkyleneoxy group having a carbon number of 2 and an alkyleneoxy group having a carbon number of 3. From the viewpoint of the centrifugal moldability and/or the strength development of a hardened product, AO preferably includes an alkyleneoxy group having a carbon number of 2.

In the general formula (B4), $Y^1$ and $Y^2$ are the same or different, and each represents a hydrogen atom or $SO_3M$, and at least one of $Y^1$ and $Y^2$ is $SO_3M$. M is a counter ion, and examples thereof include a hydrogen ion, an alkali metal ion, an alkaline earth metal ion (½ atom) and an ammonium ion. From the viewpoint of the centrifugal moldability and/or the strength development of a hardened product and the viewpoint of ease of manufacturing a compound, M is preferably an ammonium ion. From the viewpoint of the centrifugal moldability and/or the strength development of a hardened product and the viewpoint of the offensive smell of a compound, M is preferably an alkali metal ion, more preferably an alkali metal ion selected from a sodium ion and a potassium ion.

In the general formula (B4), $n_5$ and $n_6$ are the same or different; each represents an average number of moles of added AO and is 0 or more. When $n_5$ is 0, $Y^1$ is a hydrogen atom; and when $n_6$ is 0, $Y^2$ is a hydrogen atom. From the viewpoint of the centrifugal moldability and/or the strength development of a hardened product and the viewpoint of the cement dispersibility, the total of $n_5$ and $n_6$ is 1 or more, preferably 20 or more, and more preferably 50 or more; from the viewpoint of the centrifugal moldability and/or the strength development of a hardened product and the economic viewpoint, 200 or less, preferably 150 or less, more preferably 100 or less. $n_5$ and $n_6$ do not become 0 simultaneously. Therefore, compound (B4) has at least one of $(AO)_{n5}$-$SO_3M$ and $(AO)_{n6}$-$SO_3M$.

Examples of compound (B4) include sulfuric esters of aliphatic amine alkylene adduct such as beef tallow amine ethylene oxide adduct sulfuric ester.

Component (B) may be one or more compounds belonging to compound (B1), compound (B2), compound (B3) and compound (B4).

From the viewpoint of the centrifugal moldability and/or the strength development of a hardened product, component (B) is preferably one or more compounds selected from compound (B1), compound (B2) and compound (B3).

From the viewpoint of the centrifugal moldability and/or the strength development of a hardened product, component (B) is one or more compounds selected from compound (B1).

The dispersant composition for hydraulic compositions of the present invention contains, from the viewpoint of the centrifugal moldability and/or the strength development of a hardened product, one or more compounds selected from compound (B1), compound (B2) and compound (B3); and further preferably contains one or more compounds selected from compound (B1).

<Composition, Etc. Of a Dispersant Composition for Hydraulic Compositions>

From the viewpoint of the centrifugal moldability and the strength development of a hardened product after centrifugal molding and steam curing, the dispersant composition for hydraulic compositions of the present invention contains, in a solid content thereof, component (A) in an amount of preferably 1 mass % or more, more preferably 3 mass % or more, and further preferably 5 mass % or more; and preferably 99 mass % or less, more preferably 97 mass % or less, and further preferably 95 mass % or less.

Note that regarding the dispersant composition for hydraulic compositions, the solid content refers to components other than water.

From the viewpoint of the centrifugal moldability and/or the strength development of a hardened product, the dispersant composition for hydraulic compositions of the present invention contains, in the solid content thereof, component (B) in an amount of preferably 2 mass % or more, more preferably 5 mass % or more, and further preferably 7 mass % or more; and preferably 90 mass % or less, more preferably 80 mass % or less, and further preferably 70 mass % or less.

From the viewpoint of the centrifugal moldability and/or the strength development of a hardened product after centrifugal molding, and the viewpoint of the strength development of a hardened product after steam curing, the dispersant composition for hydraulic compositions of the present invention has a content ratio of component (B) of preferably 1 mass % or more and 60 mass % or less, relative to the total content of component (A) and component (B). This ratio is obtained by [content of component (B)/[content of component (A)+content of component (B)]×100 (mass %). Hereinafter, this ratio is also expressed as (B)/[(A)+(B)]. From the viewpoints of the centrifugal moldability and/or the strength development of a hardened product after centrifugal molding, and the strength development of a hardened product after steam curing, (B)/[(A)+(B)] is more preferably 3 mass % or more, further preferably 5 mass % or more, further more preferably 10 mass % or more, and further more preferably 20 mass %; and more preferably 50% or less, further preferably 40 mass % or less, and further more preferably 30 mass % or less. In the dispersant composition for hydraulic compositions for steam curing of the present invention, (B)/[(A)+(B)] is 1 mass % or more and 60 mass % or less. (B)/[(A)+(B)] may be calculated based on a mixing amount of component (A) and a mixing amount of component (B) used in producing the dispersant composition for hydraulic compositions of the present invention.

From the viewpoint of the strength development of a hardened product after steam curing, when $R^{11}$ is a hydrocarbon group having a carbon number of 16 or more and 20 or less, (B)/[(A)+(B)] is preferably 7 mass % or more, and more preferably 15 mass % or more; and preferably 55 mass % or less, more preferably 45 mass % or less, further preferably 35 mass % or less, and further more preferably 25 mass % or less. From the viewpoint of the strength development of a hardened product after steam curing, when $R^{11}$ is a hydrocarbon group having a carbon number of 6 or more and 10 or less, (B)/[(A)+(B)] is preferably 7 mass % or more and 15 mass % or less.

In the case that component (A) is a high-molecular compound having a naphthalene ring-containing monomer unit, from the viewpoint of the centrifugal moldability and/or the strength development of a hardened product after centrifugal molding and the viewpoint of the strength development after steam curing, the dispersant composition for hydraulic compositions of the present invention has a molar ratio of the total amount of component (B) of preferably 0.2% or more and 50% or less, relative to the naphthalene ring-containing monomer unit in component (A). From the same viewpoints, the molar ratio is preferably 0.5% or more, more preferably 0.8% or more, further preferably 1.5% or more, and further more preferably 5% or more; and preferably 45% or less, more preferably 30% or less, further preferably 20% or less, further more preferably 15% or less, further more preferably 10% or less, and further more preferably 8% or less.

When $R^{11}$ is aralkyl, the molar ratio is preferably 1.5% or more, and more preferably 2% or more; and preferably 7% or less, more preferably 6% or less, further preferably 5% or less, further more preferably 4.5% or less, and further more preferably 3% or less.

When $R^{11}$ is alkenyl, the molar ratio is preferably 1.5% or more, more preferably 3% or more, further preferably 4% or more, and further more preferably 6.5% or more; and preferably 9% or less, and more preferably 8% or less.

When $R^{11}$ is an alkyl group having a carbon number of 16 or more and 18 or less, the molar ratio is preferably 0.5% or more, more preferably 1% or more, further preferably 2% or more, further more preferably 3.5% or more, and further preferably 5% or more; and preferably 45% or less, more preferably 40% or less, further preferably 25% or less, further more preferably 15% or less, and further more preferably 10% or less.

When $R^{11}$ is an alkyl group having a carbon number of 6 or more and 10 or less, the molar ratio is preferably 0.3% or more, more preferably 0.5% or more, and further preferably 1.5% or more; and preferably 7% or less, more preferably 6% or less, and further preferably 3% or less.

Further, from the viewpoint of improving the kneadability of concrete, the dispersant composition for hydraulic compositions of the present invention has a molar ratio of the total amount of component (B) of preferably 16.1% or more and 50% or less, more preferably 30.1% or more, relative to the naphthalene ring-containing monomer unit in component (A).

It should be noted that the molar ratio of the total amount of component (B) relative to the naphthalene ring-containing monomer unit in component (A) is calculated based on the total amount of the naphthalene ring-containing monomer unit in component (A) and the total amount of component (B). Specifically, it is calculated by the following equation.

Molar ratio (%)=[[total amount (mol) of component (B)]/[total amount (mol) of naphthalene ring-containing monomer unit in component(A)]]×100

In the case that the component (A) is a formaldehyde naphthalenesulfonate condensate or a salt thereof, a naphthalene ring-containing monomer unit is a monomer unit formed by dehydration-condensation reaction of a naphthalenesulfonate or a salt thereof with formaldehyde. In the case that the component (A) is a sodium salt of a formaldehyde naphthalenesulfonate condensate, the total amount (mol) of naphthalene ring-containing monomer units in the compound is calculated by the following equation. In the equation, a sodium salt of a formaldehyde naphthalenesulfonate condensate is expressed as NSF.

Total amount (mol) of naphthalene ring-containing monomer units in NSF=[total amount of mass of naphthalene ring-containing monomer units in NSF]/[molecular weight of naphthalene ring-containing monomer unit in NSF]

In the case that the component (A) is a condensate of a naphthalenesulfonate or a salt thereof and formaldehyde, the total amount of mass of naphthalene ring-containing monomer units in the component (A) is a total mass of the compound.

Further, in the case that the component (A) is a condensate of a naphthalenesulfonate or a salt thereof, formaldehyde and other monomer free of a naphthalene ring, the total amount of mass of naphthalene ring-containing monomer units in the component (A) is a mass obtained by subtracting, from the total mass of the compound, masses of monomer units derived from the naphthalene ring-free other monomer and formaldehyde.

The mass of monomer units derived from the naphthalene ring-free other monomers may be calculated from a fed amount at the time of synthesis, or may be calculated by use of a common analytical device such as a nuclear magnetic resonance spectroscope, which can determine a copolymerization mass ratio.

Further, in the case that the component (A) is a sodium salt of a formaldehyde naphthalenesulfonate condensate, the molecular weight of the naphthalene ring-containing monomer unit in the component (A) is determined as a numeral value obtained by subtracting the molecular weight of water (18.0) or a by-product of condensation reaction from the sum of the molecular weight (230.2) of sodium naphthalenesulfonate and the molecular weight (30.0) of formaldehyde, that is 242.2.

In the dispersant composition for hydraulic compositions of the present invention, in the case that, for example, the component (A) is a sodium salt of a formaldehyde naphthalenesulfonate condensate and the component (B) is an ammonium salt of a polyoxyethylene alkylether sulfonate, the molar ratio of the total amount of the component (B) to the naphthalene ring-containing monomer unit in the component (A) can be determined by: separating the component (A) from the component (B) by a common method such as a reprecipitation method or a liquid separation method; and measuring a mass ratio for calculation.

Further, the structures of the components (A) and (B) in the dispersant composition for hydraulic compositions may be analyzed by: separating the component (A) from the component (B) by a common method such as a reprecipitation method or a liquid separation method; and analyzing by use of a common analytical apparatus such as a nuclear magnetic resonance spectroscope or a liquid chromatograph.

From the viewpoint of the centrifugal moldability and/or the strength development of a hardened product; the viewpoint of further enhancing the water-reducing property and the fluidity retentivity; and the viewpoint of the strength development of a hardened product after steam curing, the dispersant composition for hydraulic compositions of the present invention may contain (C) a polycarboxylic acid-based copolymer (hereinafter, referred to as component (C)).

Examples of component (C) include a copolymer containing a monomer (C1) represented by the following general formula (C1) and a monomer represented by the following general formula (C2) as constituent monomers.

[Chemical Formula 3]

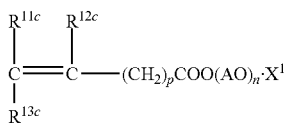

(C1)

wherein
$R^{11c}$ and $R^{12c}$ may be the same or different, and they are a hydrogen atom or a methyl group;
$R^{13c}$ is a hydrogen atom or $-COO(AO)_n \cdot X^1$;
$X^1$ is an alkyl group having a carbon number of 1 or more and 4 or less;
AO is a group selected from an ethyleneoxy group and a propyleneoxy group;
n' is an average number of moles of added AO and is 1 or more and 300 or less; and
p is 0 or more and 2 or less.

[Chemical Formula 4]

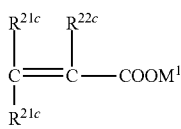

(C2)

wherein:
$R^{21c}$, $R^{22c}$ and $R^{23c}$ may be the same or different, and they are a hydrogen atom, a methyl group or $(CH_2)_r COOM^2$, $(CH_2)_r COOM^2$ may form an anhydride with $COOM^1$ or other $(CH_2)_r COOM^2$, and in that case, and $M^1$ or $M^2$ is not present in those groups;
$M^1$ and $M^2$ may be the same or different, and they are a hydrogen atom, an alkali metal, an alkaline earth metal (½ atom), an ammonium group, an alkylammonium group or a substituted alkylammonium group; and
r is 0 or more and 2 or less.

In the general formula (C1), $R^{11c}$ is preferably a hydrogen atom.

In the general formula (C1), $R^{12C}$ is preferably a methyl group.

In the general formula (C1), $R^{13c}$ is preferably a hydrogen atom.

In the general formula (C1), $X^1$ is preferably a methyl group.

In the general formula (C1), AO is preferably an ethyleneoxy group. AO preferably contains an ethyleneoxy group.

In the general formula (C1), n' is an average number of moles of added AO and is 1 or more and 300 or less. From the viewpoint of the centrifugal moldability and/or the strength development of a hardened product after centrifugal molding, n' is preferably 100 or more and more preferably 110 or more; and preferably 200 or less and more preferably 150 or less.

Further, from the viewpoint of the strength development of a hardened product after steam curing, n' is preferably 5 or more, more preferably 20 or more, and further preferably 40 or more; and preferably 200 or less, more preferably 150 or less, further preferably 100 or less, further more preferably 80 or less, and further more preferably 50 or less.

In the general formula (C1), p is preferably 0.

In the general formula (C2), $R^{21c}$ is preferably a hydrogen atom.

In the general formula (C2), $R^{22c}$ is preferably a methyl group.

In the general formula (C2), $R^{23c}$ is preferably a hydrogen atom.

$(CH_2)_r COOM^2$ may form an anhydride with $COOM^1$ or other $(CH_2)_r COOM^2$, and in that case, and $M^1$ or $M^2$ is not present in those groups.

Regarding the copolymer (I), $M^1$ and $M^2$ in the general formula (C2) may be the same or different and each is preferably a hydrogen atom.

r of $(CH_2)_r COOM^2$ in the general formula (C2) is preferably 1.

From the viewpoint of the centrifugal moldability and/or the strength development of a hardened product, the copolymer (C) may have a total amount of the monomer (C1) and the monomer (C2) in the constituent monomers of 90 mass % or more, preferably 92 mass % or more, and more preferably 95 mass % or more; and 100 mass % or less. The total amount may be 100 mass %.

From the viewpoint of the centrifugal moldability and/or the strength development of a hardened product, the ratio of the monomer (C2) relative to the total of the monomers (C1) and (C2) in the copolymer (C) is preferably 80 mol % or more and more preferably 90 mol %; and preferably 98 mol % or less and more preferably 97 mol % or less.

From the viewpoint of the strength development of a hardened product after steam curing, the ratio of the monomer (C2) relative to the total of the monomers (C1) and (C2) in the copolymer (C) is preferably 60 mol % or more and more preferably 75 mol % or more; and preferably 90 mol % or less, more preferably 80 mol % or less, and further preferably 77 mol % or less.

The copolymer (C) has a weight average molecular weight of preferably 10000 or more and more preferably 15000 or more; and preferably 100000 or less, more preferably 70000 or less, and further preferably 45000 or less. The weight average molecular weight is measured by a gel permeation chromatography (GPC) under the following conditions.

*[Gpc Conditions]
Device: GPC (HLC-8320GPC) (manufactured by Tosoh Corporation)
Column: G4000PWXL+G2500PWXL (manufactured by Tosoh Corporation)
Eluent: 0.2 M phosphate buffer/$CH_3CN$=9/1
Flow rate: 1.0 mL/min
Column Temp.: 40° C.
Detection: RI
Sample size: 0.2 mg/mL
Standard substance: in terms of polyethylene glycol (monodispersed polyethylene glycol: molecular weight: 87500, 250000, 145000, 46000, 24000)

When the dispersant composition for hydraulic compositions of the present invention contains component (C), the dispersant composition for hydraulic compositions of the present invention contains, in the solid content thereof, component (C) in an amount of preferably 1 mass % or more, more preferably 3 mass % or more, and further preferably 5 mass % or more; and preferably 30 mass % or less, more preferably 20 mass % or less, and further preferably 15 mass % or less.

The dispersant composition for hydraulic compositions of the present invention may contain a component such as a conventional cement dispersant, a water-soluble high-molecular compound, an air entraining agent, a cement wetting agent, an expansive additive, a waterproofing agent, a retarder, a set accelerating agent, a viscous agent, a coagulant, a drying shrinkage reducing agent, a strength enhancement agent, a hardening accelerator, an antiseptic agent and an antifoaming agent (excluding those corresponding to component (A), component (B) or component (C)).

The dispersant composition for hydraulic compositions of the present invention may be in the form of either a liquid or a solid. In the case that the dispersant composition for hydraulic compositions of the present invention is in the form of a liquid, it preferably contains water.

When the dispersant composition for hydraulic compositions is in the form of a liquid containing water, the content of the water in the composition is, from the viewpoint of the centrifugal moldability and/or the strength development of a hardened product; and the viewpoint of workability at the time of preparing the hydraulic composition, preferably 10 mass % or more, more preferably 30 mass % or more, and further preferably 50 mass % or more; and from the viewpoint of the centrifugal moldability and/or the strength development of a hardened product; and the viewpoint of improving the fluidity of a hydraulic composition, preferably 90 mass % or less, and more preferably 70 mass % or less.

When the dispersant composition for hydraulic compositions is in the form of a liquid containing water, the content of component (A) in the composition is, from the viewpoint of the centrifugal moldability and/or the strength development of a hardened product and the viewpoint of improving the fluidity of the hydraulic composition, preferably 1 mass % or more, more preferably 4 mass % or more, and further preferably 7 mass % or more; and preferably 50 mass % or less, more preferably 32 mass % or less, and further preferably 27 mass % or less.

When the dispersant composition for hydraulic compositions is in the form of a liquid containing water, the content of component (B) in the composition is, from the viewpoint of the centrifugal moldability and/or the strength development of a hardened product and the viewpoint of improving the fluidity of the hydraulic composition, preferably 1 mass % or more, more preferably 4 mass % or more, and further preferably 7 mass % or more; and preferably 60 mass % or less, more preferably 50 mass % or less, and further preferably 32 mass % or less.

When the dispersant composition for hydraulic compositions is in the form of a liquid containing water, the total content of components (A) and (B) in the composition is, from the viewpoint of the centrifugal moldability and/or the strength development of a hardened product and the viewpoint of improving the fluidity of the hydraulic composition, preferably 10 mass % or more, more preferably 20 mass % or more, and further preferably 30 mass % or more; and preferably 90 mass % or less, more preferably 70 mass % or less, and further preferably 50 mass % or less.

Conventionally, mixed use of components (A) and (C) does not exhibit a sufficient effect.

It is speculated that this is because an aromatic ring and a polyalkyleneoxy group are interacted with each other and their dispersing forces are countered with each other; since both components are a high-molecular compound, a pseudo increase of molecular weight raises the viscosity and causes a large decrease of the mobility thereby to reduce the dispersibility. However, in the present invention, it is speculated that combined use of component (B) allows an aromatic ring of component (A) and an alkyl group of component (B) to interact with each other. Then, it is inferred that the interaction between components (A) and (C) is curbed, and thereby combined use of components (A) and (C) becomes possible for the first time.

When the dispersant composition for hydraulic compositions is in the form of a liquid containing water, the mass ratio between components (C) and (A), (C)/(A) is from the viewpoint of the centrifugal moldability and/or the strength development of a hardened product and the viewpoint of improving the fluidity of the hydraulic composition, preferably 0/100 or more, more preferably over 0/100, further preferably 0.05/99.95 or more, further more preferably 0.1/99.9 or more, and further more preferably 1/99 or more; and preferably 50/50 or less, more preferably 30/70 or less, and further preferably 10/90 or less. Over 0/100 signifies that component (C) is over zero relative to 100 of component (A) (the same applies hereinafter).

When the dispersant composition for hydraulic compositions is in the form of a liquid containing water, the total content of components (A) and (C) in the composition is, from the viewpoint of the centrifugal moldability and/or the strength development of a hardened product and the viewpoint of improving the fluidity of the hydraulic composition, preferably 1 mass % or more, more preferably 4 mass % or more, and further preferably 7 mass % or more; and preferably 50 mass % or less, more preferably 32 mass % or less, and further preferably 27 mass % or less.

The dispersant composition for hydraulic compositions of the present invention may be produced by, for example, mixing components (A), (B) and (C) by means of any method.

[Hydraulic Composition]

The present invention provides a hydraulic composition for centrifugal molding, which contains the dispersant composition for hydraulic compositions for centrifugal molding of the present invention, a hydraulic powder, an aggregate and water, wherein a water/hydraulic powder ratio is 10 mass % or more and 25 mass % or less.

Further, the present invention provides a hydraulic composition for centrifugal molding, which contains component (A), component (B), a hydraulic powder, an aggregate and water, wherein a water/hydraulic powder ratio is 10 mass % or more and 25 mass % or less.

Further, the present invention provides a hydraulic composition for steam curing, which contains the dispersant composition for hydraulic compositions for steam curing of the present invention, a hydraulic powder, an aggregate, and water, wherein a water/hydraulic powder ratio is 10 mass % or more and 53 mass % or less, and a total content of (A) and (B) is 0.25 parts by mass or more and 10 parts by mass or less relative to 100 parts by mass of the hydraulic powder.

Further, the present invention provides a hydraulic composition for steam curing, which contains component (A), component (B), a hydraulic powder, an aggregate and water, wherein a water/hydraulic powder ratio is 10 mass % or more and 53 mass % or less, a content ratio of (B) is 1 mass % or more and 60 mass % or less relative to a total content of (A) and (B), and the total content of (A) and (B) is 0.25 parts by mass or more and 10 parts by mass or less relative to 100 parts by mass of the hydraulic powder.

Hereafter, these four hydraulic compositions are explained collectively as a hydraulic composition. In the following description, a hydraulic composition refers to both or one of the hydraulic composition for centrifugal molding of the present invention and the hydraulic composition for steam curing of the present invention. The hydraulic composition for centrifugal molding of the present invention refers to the above two embodiments of the hydraulic composition for centrifugal molding of the present invention. Further, the hydraulic composition for steam curing of the present invention refers to the above two embodiments of the hydraulic composition for steam curing of the present invention.

The matters pertaining to the hydraulic composition for centrifugal molding are applicable to the hydraulic composition for steam curing of the present invention.

The matters pertaining to the hydraulic composition for steam curing are applicable to the hydraulic composition for centrifugal molding of the present invention.

Since a load is applied to the hydraulic composition for centrifugal molding by a centrifugal force, the properties for a high yield value (equivalent to a stress to start movement) and a low shearing stress (equivalent to a stress necessary to reach a certain speed since the start of movement) are required for a unhardened composition such as fresh concrete. The present invention imparts a high yield value of an aromatic ring-based dispersant and further provides a considerable improvement to the dispersibility (almost equivalent to the viscosity), and thereby the hydraulic composition itself has an improved slurry property and becomes more useful for centrifugal molding.

Meanwhile, since the hydraulic composition for steam curing is heated by steam, a property of a shorter time period for setting and hardening (reduction of a necessary pre-steaming period) is required. The present invention considerably reduces a necessary addition amount of dispersant and thereby, the setting speed of the hydraulic composition itself is improved and becomes more useful for steam curing.

The hydraulic powder used for the hydraulic composition of the present invention is a powder having a physical property, which enables the powder to be hardened by hydration, and examples thereof include cement and gypsum. The hydraulic powder is preferably cement, and more preferably cement such as ordinary portland cement, belite cement, moderate heat cement, early strength cement, ultra early strength cement, and sulfate resisting cement. Further, it may be blast furnace slag cement, fly ash cement, silica fume cement or the like, which is prepared by adding, to cement or the like, a powder having a pozzolanic action and/or potential hydraulicity such as blast furnace slag, fly ash and silica fume, or stone powder (calcium carbonate powder).

From the viewpoint of the centrifugal moldability and/or the strength development of a hardened product, the hydraulic composition for centrifugal molding of the present invention has a water/hydraulic powder ratio of 10 mass % or more, more preferably 11 mass % or more, further preferably 12 mass % or more, further more preferably 15 mass %, and further more preferably 17 mass % or more; and preferably 25 mass % or less, preferably 24 mass % or less, more preferably 23 mass % or less, further preferably 22 mass % or less, and further more preferably 20 mass % or less.

Further, from the viewpoint of the demolding property and the strength development improvement of a concrete product, the hydraulic composition for steam curing of the present invention has a water/hydraulic powder ratio of 10 mass % or more, preferably 18 mass % or more, preferably 20 mass % or more, more preferably 25 mass % or more, and further preferably 30 mass % or more; and 53 mass % or less, preferably 45 mass % or less, more preferably 40 mass % or less, and further preferably 35 mass % or less.

Herein, the water/hydraulic powder ratio is a mass percentage (mass %) of water and a hydraulic powder in a hydraulic composition, and it is calculated by a mass of water/a mass of hydraulic powder×100. The water/hydraulic powder ratio is calculated based on an amount of water and an amount of powder having a physical property of hardening by hydration. When the powder having a physical property of hardening by hydration contains powders selected from a powder having a pozzolanic action, a powder having potential hydraulicity, and a stone powder (calcium carbonate powder), their amounts are added to the amount of the hydraulic powder in the present invention. Further, when the powder having a property of hardening by hydration contains a high strength admixture, an amount of the admixture is also added to the amount of the hydraulic powder. This is applicable to the mass part mentioned hereafter, which relates to a mass of the hydraulic powder.

Specific examples and preferred embodiments of components (A) and (B) used in the hydraulic composition of the present invention are the same as those mentioned for the dispersant composition for hydraulic compositions of the present invention. (B)/[(A)+(B)] is also applicable to the hydraulic composition, but this ratio may be calculated based on the content of component (A) and the content of component (B) in the hydraulic composition. Further, the ratio may be calculated based on the mixing amount of component (A) and the mixing amount of component (B) in producing the hydraulic composition. For the hydraulic composition for steam curing of the present invention, (B)/[(A)+(B)] is 1 mass % or more and 60 mass % or less.

From the viewpoint of the centrifugal moldability and/or the strength development of a hardened product, the hydraulic composition for centrifugal molding of the present invention contains component (A) in an amount of preferably 0.001 parts by mass or more, more preferably 0.01 parts by mass or more, further preferably 0.1 parts by mass or more, further more preferably 0.4 parts by mass or more, and further more preferably 0.6 parts by mass or more; and preferably 10 parts by mass or less, more preferably 5 parts by mass or less, further preferably 3 parts by mass or less, further preferably 2 parts by mass or less, and further more preferably 1 part by mass or less, relative to 100 parts by mass of the hydraulic powder.

From the viewpoint of the centrifugal moldability and/or the strength development of a hardened product, the hydraulic composition for centrifugal molding of the present invention contains component (B) in an amount of preferably 0.0001 parts by mass or more, more preferably 0.001 parts by mass or more, further preferably 0.01 parts by mass or more, further more preferably 0.03 parts by mass or more, and further more preferably 0.05 parts by mass or more; and preferably 10 parts by mass or less, more preferably 5 parts by mass or less, further preferably 1 part by mass or less, further preferably 0.5 parts by mass or less, and further more preferably 0.35 parts by mass or less, relative to 100 parts by mass of the hydraulic powder.

From the viewpoint of the demolding property and the strength development improvement, the hydraulic composition for steam curing of the present invention contains component (A) in an amount of preferably 0.15 parts by mass or more, more preferably 0.2 parts by mass or more, further preferably 0.3 parts by mass or more, and further more preferably 0.5 parts by mass or more; and preferably 9.9 parts by mass or less, more preferably 5 parts by mass or less, further preferably 2 parts by mass or less, and further more preferably 1 part by mass or less, relative to 100 parts by mass of the hydraulic powder.

From the viewpoint of the demolding property and the strength development improvement, the hydraulic composition for steam curing of the present invention contains component (B) in an amount of preferably 0.0025 parts by mass or more, more preferably 0.01 parts by mass or more, further preferably 0.03 parts by mass or more, and further more preferably 0.05 parts by mass or more; and preferably 6 parts by mass or less, more preferably 2 parts by mass or less, further preferably 1 part by mass or less, further more preferably 0.5 parts by mass or less, and further more preferably 0.2 parts by mass or less, relative to 100 parts by mass of the hydraulic powder.

From the viewpoint of the centrifugal moldability and/or the strength development of a hardened product after centrifugal molding, the hydraulic composition of the present invention contains components (A) and (B) in total in an amount of preferably 0.1 parts by mass or more, more preferably 0.5 parts by mass or more, further preferably 0.7 parts by mass or more; and preferably 10 parts by mass or less, more preferably 5 parts by mass or less, and further preferably 2 parts by mass or less, relative to 100 parts by mass of the hydraulic powder. This content is preferable for the hydraulic composition for centrifugal molding of the present invention.

From the viewpoint of the demolding property and the strength development of a hardened product, the hydraulic composition for steam curing of the present invention contains components (A) and (B) in total in an amount of 0.25 parts by mass or more, preferably 0.4 parts by mass or more, and more preferably 0.6 parts by mass or more; and 10 parts by mass or less, preferably 5 parts by mass or less, and more preferably 2 parts by mass or less, relative to 100 parts by mass of the hydraulic powder, relative to 100 parts by mass of the hydraulic powder.

The hydraulic composition of the present invention may contain component (C), a polycarboxylic acid-based copolymer. Specific examples and preferred embodiments of (C) used in the hydraulic composition of the present invention are the same as those mentioned for the dispersant composition for hydraulic compositions of the present invention.

When the hydraulic composition of the present invention contains component (C), it contains component (C), from the viewpoint of the centrifugal moldability and/or the strength development of a hardened product, in an amount of preferably 0.01 parts by mass or more, and more preferably 0.05 parts by mass or more; and preferably 2 parts by mass or less, more preferably 1 part by mass or less, further preferably 0.5 parts by mass or less, and further more preferably 0.3 parts by mass or less, relative to 100 parts by mass of the hydraulic powder.

Further, when the hydraulic composition of the present invention contains component (C), it contains component (C), from the viewpoint of the demolding property and the strength development of a hardened product, in an amount of preferably 0.001 parts by mass or more, and more preferably 0.01 parts by mass or more; and preferably 0.5 parts by mass or less, more preferably 0.2 parts by mass or less, and further preferably 0.1 parts by mass or less, relative to 100 parts by mass of the hydraulic powder.

From the viewpoint of the centrifugal moldability and/or the strength development of a hardened product and the viewpoint of improving the fluidity of a hydraulic composition, the hydraulic composition of the present invention has a mass ratio of component (C) to component (A), (C)/(A), of preferably 0/100 or more, more preferably over 0/100, further preferably 0.05/99.95 or more, further more preferably 0.1/99.9 or more, and further more preferably 1/99 or more; and preferably 50/50 or less, more preferably 30/70 or less, and further preferably 10/90 or less.

The hydraulic composition of the present invention preferably contains an aggregate. Examples of the aggregate include aggregates selected from fine aggregates and coarse aggregates. As the fine aggregate, those defined in No. 2311 of JIS A0203-2014 are exemplified. Examples of the fine aggregate include river sand, land sand, pit sand, sea sand, lime sand, silica sand and crushed sand thereof, blast furnace slag fine aggregate, ferronickel slag fine aggregate, light-weight fine aggregate (artificial and natural), and recycled fine aggregate. Further, as the coarse aggregate, those defined in No. 2312 of JIS A0203-2014 are exemplified. Examples of the coarse aggregate include river gravel, land gravel, pit gravel, sea gravel, lime gravel, crushed stone thereof, blast furnace slag coarse aggregate, ferronickel slag coarse aggregate, light-weight coarse aggregate (artificial and natural), and recycled coarse aggregate. Different types of fine aggregate and coarse aggregate may be mixed and used, or a single type thereof may be used.

In the case that the hydraulic composition is concrete, the bulk volume pertaining to the amount of coarse aggregate to be used is preferably 50% or more, more preferably 55% or more, and further preferably 60% or more; and preferably 100% or less, more preferably 90% or less, and further preferably 80% or less, from the viewpoint of exhibiting the strength of the hydraulic composition, reducing the amount of the hydraulic powder to be used such as cement, and improving the filling property into molds and the like. The bulk volume is a ratio of volume (including voids) of coarse aggregate in 1 m$^3$ of concrete.

Further, in the case that the hydraulic composition is concrete, the amount of fine aggregate to be used is preferably 500 kg/m$^3$ or more, more preferably 600 kg/m$^3$ or more, and further preferably 700 kg/m$^3$; and preferably 1000 kg/m$^3$ or less, and more preferably 900 kg/m$^3$, from the viewpoint of improving the filling property into molds and the like.

In the case that the hydraulic composition is mortar, the amount of fine aggregate to be used is preferably 800 kg/m$^3$ or more, more preferably 900 kg/m$^3$ or more, and further preferably 1000 kg/m$^3$ or more; and preferably 2000 kg/m$^3$ or less, more preferably 1800 kg/m$^3$ or less, and further preferably 1700 kg/m$^3$ or less.

As the hydraulic composition, concrete and the like are exemplified. Especially, concrete using cement is preferred. The hydraulic composition of the present invention is useful in any field for self-leveling, refractories, plaster, light-weight or heavy-weight concrete, AE, repairing, prepacking, tremies, foundation improvement, grout and cold weather.

The hydraulic composition of the present invention may contain an early strengthening agent such as glycerin and N-methyldiethanolamine, or a chelating agent such as ethylenediaminetetraacetic acid sodium salt. From the viewpoint of the strength development after steam curing, the content of the chelating agent is preferably 0.1 parts by mass or less relative to 100 parts by mass of the hydraulic powder.

The hydraulic composition of the present invention may further contain other component. Examples thereof include an AE agent, a retarder, a foaming agent, a viscous agent, a blowing agent, a waterproofing agent, and a fluidizing agent.

[Method for Producing a Dispersant Composition for Hydraulic Compositions]

The present invention provides a method for producing a dispersant composition for hydraulic compositions, which includes mixing components (A) and (B). Specific examples and preferred embodiments of components (A) and (B) used in the method for producing a dispersant composition for hydraulic compositions of the present invention are the same as those mentioned for the dispersant composition for hydraulic compositions of the present invention.

Further, a dispersant composition for hydraulic compositions containing components (A), (B) and (C) can be produced by mixing components (A), (B) and (C). Specific examples and preferred embodiments of component (C) are the same as those mentioned for the dispersant composition for hydraulic compositions of the present invention.

In producing a liquid dispersant composition for hydraulic compositions containing water, from the viewpoint of the centrifugal moldability and/or the strength development of a hardened product and the viewpoint of improving the fluidity of a hydraulic composition, a mass ratio of component (C) to component (A), (C)/(A), is preferably 0/100 or more, more preferably over 0/100, further preferably 0.05/99.95 or more, further more preferably 0.1/99.9 or more, and further more preferably 1/99 or more; and preferably 50/50 or less, more preferably 30/70 or less, and further preferably 10/90 or less.

In producing a liquid dispersant composition for hydraulic compositions containing water, from the viewpoint of the centrifugal moldability and/or the strength development of a hardened product and the viewpoint of improving the fluidity of a hydraulic composition, components (A) and (C) are used so that a total content of components (A) and (C) in the composition is preferably 1 mass % or more, more preferably 4 mass % or more, and further preferably 7 mass % or more; and preferably 50 mass % or less, more preferably 32 mass % or less, further preferably 27 mass % or less.

The matters described for the dispersant composition for hydraulic compositions of the present invention are appropriately applicable to the method of the present invention for producing a dispersant composition for hydraulic composition.

The method of the present invention for producing a dispersant composition for hydraulic compositions is suitable as a method for producing a dispersant composition for hydraulic compositions of the present invention.

In producing a dispersant composition for hydraulic compositions for steam curing of the present invention, (B)/[(A)+(B)] is 1 mass % or more and 60 mass % or less. That is, in producing a dispersant composition for hydraulic compositions for steam curing of the present invention, components (A) and (B) are mixed so that the mixing amount of (B) relative to the total mixing amount of (A) and (B) is 1 mass % or more and 60 mass % or less. For the production method, a content of each component is read as a mixing amount thereof, and (B)/[(A)+(B)] is calculated. In producing the dispersant composition for hydraulic compositions for steam curing of the present invention, a preferred range of (B)/[(A)+(B)] is the same as the range mentioned for the dispersant composition for hydraulic compositions of the present invention.

As the method of the present invention for producing a dispersant composition for hydraulic compositions, exemplified is a method for producing a dispersant composition for hydraulic compositions, which contains component (A), component (B) and water. In this case, mixing component (A), component (B) and water may be conducted by any method as long as the performance is not deteriorated. Usable are, for example, a method including mixing an aqueous solution of component (A) heated to a freezing point or higher of component (B), and component (B) by a stirrer, and a method including dissolving components (A) and (B) in water, respectively, and mixing an aqueous solution of component (A) and an aqueous solution of component (B) with each other.

[Method for Producing a Hydraulic Composition]

The present invention provides a method for producing a hydraulic composition, which includes mixing a hydraulic powder, an aggregate, water, component (A) and component (B) with one another. This production method produces a hydraulic composition containing a hydraulic powder, an aggregate, water, component (A) and component (B).

Further, the present invention provides a method for producing a hydraulic composition, which includes mixing a hydraulic powder, an aggregate, water, component (A), component (B) and component (C). This production method produces a hydraulic composition containing a hydraulic powder, an aggregate, water, component (A), component (B) and component (C).

These production methods produce the hydraulic composition for centrifugal molding of the present invention or the hydraulic composition for steam curing of the present invention.

Specific examples and preferred embodiments of components (A) and (B) used for the methods for producing a hydraulic composition of the present invention are the same as those mentioned for the dispersant composition for hydraulic compositions of the present invention. To the method for producing a hydraulic composition, (B)/[(A)+(B)] is also applicable, but this ratio may be calculated based on the amount of component (A) and the amount of component (B) used for mixing. In the case of producing a hydraulic composition for steam curing of the present invention, (B)/[(A)+(B)] is 1 mass % or more and 60 mass % or less. That is, in the case of producing a hydraulic composition for steam curing of the present invention, components (A) and (B) are mixed so that a ratio of a mixing amount of (B) is 1 mass % or more and 60 mass % or less relative to a total mixing amount of (A) and (B). In the production method, (B)/[(A)+(B)] is calculated while the content of each component is read as the mixing amount. In the case of producing a hydraulic composition for steam curing of the present invention, a preferable range of (B)/[(A)+(B)] is the same as the range mentioned for the dispersant composition for hydraulic compositions of the present invention.

Further, specific examples and preferred embodiments of the hydraulic powder used for the methods for producing a hydraulic composition of the present invention are the same as those mentioned for the hydraulic composition of the present invention. The hydraulic powder is used so that a ratio of water/hydraulic powder is in the range mentioned for the hydraulic composition of the present invention. In the case of producing the dispersant composition for hydraulic compositions for steam curing of the present invention, the hydraulic powder is mixed so that a ratio of water/hydraulic powder is 10 mass % or more and 53 mass % or less.

Further, specific examples and preferred embodiments of the aggregate used for the methods for producing a hydraulic composition of the present invention are the same as those mentioned for the hydraulic composition of the present invention. In addition, the amount to be used of aggregate is the same as those mentioned for the hydraulic composition of the present invention.

Further, specific examples and preferred embodiments of component (C) used for the methods for producing a hydraulic composition of the present invention are the same as those mentioned for the dispersant composition for hydraulic compositions of the present invention.

The matters described for the dispersant composition for hydraulic compositions and the hydraulic composition of the present invention are appropriately applicable to the method of the present invention for producing hydraulic compositions.

In the method for producing a hydraulic composition of the present invention, from the viewpoint of the centrifugal moldability and/or the strength development of a hardened product, component (A) may be mixed, relative to 100 parts by mass of the hydraulic powder, in an amount selected from 0.001 parts by mass or more, 0.01 parts by mass or more, 0.1 parts by mass or more, 0.15 parts by mass or more, 0.2 parts by mass or more, 0.3 parts by mass or more, 0.4 parts by mass or more, 0.47 parts by mass or more, 0.5 parts by mass or more, or 0.6 parts by mass or more; and 10 parts by mass or less, 9.9 parts by mass or less, 5 parts by mass or less, 2 parts by mass or less, 1 part by mass or less, 0.9 parts by mass or less, 0.6 parts by mass or less, or 0.52 parts by mass or less. In the case of producing a hydraulic composition for centrifugal molding, component (A) is preferably mixed so as to be contained in the same amount as that of component (A) in the hydraulic composition for centrifugal molding of the present invention. In the case of producing a hydraulic composition for steam curing, component (A) is preferably mixed so as to be contained in the same amount as that of component (A) in the hydraulic composition for steam curing of the present invention.

In the method for producing a hydraulic composition of the present invention, from the viewpoint of the centrifugal moldability and/or the strength development of a hardened product, component (B) may be mixed, relative to 100 parts by mass of the hydraulic powder, in an amount selected from 0.0001 parts by mass or more, 0.001 parts by mass or more, 0.0025 parts by mass or more, 0.01 parts by mass or more, 0.03 parts by mass or more, 0.05 parts by mass or more, and 0.06 parts by mass or more; and 10 parts by mass or less, 6 parts by mass or less, 5 parts by mass or less, 2 parts by mass or less, 1 part by mass or less, further preferably 0.5 parts by mass or less, further more preferably 0.35 parts by mass or less, and 0.2 parts by mass or less. In the case of producing a hydraulic composition for centrifugal molding, component (B) is preferably mixed so as to be contained in the same amount as that of component (B) in the hydraulic composition for centrifugal molding of the present invention. In the case of producing a hydraulic composition for steam curing, component (B) is preferably mixed so as to be contained in the same amount as that of component (B) in the hydraulic composition for steam curing of the present invention.

More specifically, in the case of producing a hydraulic composition for centrifugal molding, from the viewpoint of the centrifugal moldability and/or the strength development of a hardened product, component (A) is mixed, relative to 100 parts by mass of the hydraulic powder, in an amount of preferably 0.001 parts by mass or more, more preferably 0.01 parts by mass or more, further preferably 0.1 parts by mass or more, further more preferably 0.4 parts by mass or more, and further more preferably 0.6 parts by mass or more; and preferably 10 parts by mass or less, more preferably 5 parts by mass or less, further preferably 3 parts by mass or less, further preferably 2 parts by mass or less, and further more preferably 1 part by mass or less.

Further, in the case of producing a hydraulic composition for centrifugal molding, from the viewpoint of the centrifugal moldability and/or the strength development of a hardened product, component (B) is preferably mixed, relative to 100 parts by mass of the hydraulic powder, in an amount of preferably 0.0001 parts by mass or more, more preferably 0.001 parts by mass or more, further preferably 0.01 parts by mass or more, further more preferably 0.03 parts by mass or more, and further more preferably 0.05 parts by mass or more; and preferably 10 parts by mass or less, more preferably 5 parts by mass or less, further preferably 1 part by mass or less, further preferably 0.5 parts by mass or less, and further more preferably 0.35 parts by mass or less.

Further, in the case of producing a hydraulic composition for centrifugal molding, from the viewpoint of the centrifugal moldability and/or the strength development of a hardened product after centrifugal molding, components (A) and (B) are mixed in total, relative to 100 parts by mass of the hydraulic powder, in an amount of preferably 0.1 parts by mass or more, more preferably 0.5 parts by mass or more, and further preferably 0.7 parts by mass or more; and preferably 10 parts by mass or less, more preferably 5 parts by mass or less, and further preferably 2 parts by mass or less.

Further, in the case of producing a hydraulic composition for steam curing, from the viewpoint of the demolding property and the strength development improvement, component (A) is mixed, relative to 100 parts by mass of the hydraulic powder, in an amount of preferably 0.15 parts by mass or more, more preferably 0.2 parts by mass or more, further preferably 0.3 parts by mass or more, and further more preferably 0.5 parts by mass or more; and preferably 9.9 parts by mass or less, more preferably 5 parts by mass or less, further preferably 2 parts by mass or less, and further more preferably 1 part by mass or less.

Further, in the case of producing a hydraulic composition for steam curing, from the viewpoint of the demolding property and the strength development improvement, component (B) is mixed, relative to 100 parts by mass of the hydraulic powder, in an amount of preferably 0.0025 parts by mass or more, more preferably 0.01 parts by mass or more, further preferably 0.03 parts by mass or more, and further more preferably 0.05 parts by mass or more; and preferably 6 parts by mass or less, more preferably 2 parts by mass or less, further preferably 1 part by mass or less, further more preferably 0.5 parts by mass or less, and further more preferably 0.2 parts by mass or less.

Further, in the case of producing a hydraulic composition for steam curing, from the viewpoint of the demolding property and the strength development of a hardened product, components (A) and (B) are mixed in total, relative to 100 parts by mass of the hydraulic powder, in an amount of 0.25 parts by mass or more, preferably 0.4 parts by mass or more, and more preferably 0.6 parts by mass or more; and 10 parts by mass or less, preferably 5 parts by mass or less, and more preferably 2 parts by mass or less.

When component (C) is used in the method for producing a hydraulic composition of the present invention, from the viewpoint of the centrifugal moldability and/or the strength development of a hardened product, component (C) is mixed, relative to 100 parts by mass of the hydraulic powder, in an amount of preferably 0.001 parts by mass or more, more preferably 0.01 parts by mass or more, further preferably 0.05 parts by mass or more; and preferably 2 parts by mass or less, more preferably 1 part by mass or less, further preferably 0.5 parts by mass or less, and further preferably 0.3 parts by mass or less.

In the method for producing a hydraulic composition of the present invention, from the viewpoint of the centrifugal moldability and/or the strength development of a hardened product and the viewpoint of improving the fluidity of a hydraulic composition, components (A) and (C) are used so that a mass ratio of component (C) to component (A), (C)/(A), is preferably 0/100 or more, more preferably over 0/100, further preferably 0.05/99.95 or more, further more preferably 0.1/99.9 or more, and further more preferably 1/99 or more; and preferably 50/50 or less, more preferably 30/70 or less, and further preferably 10/90 or less.

In the method for producing a hydraulic composition of the present invention, from the viewpoint of the centrifugal moldability and/or the strength development of a hardened product after centrifugal molding, components (A) and (B) in total are mixed, relative to 100 parts by mass of the hydraulic powder, in an amount of preferably 0.1 parts by mass or more, more preferably 0.5 parts by mass or more, and further preferably 0.7 parts by mass or more; and preferably 10 parts by mass or less, more preferably 5 parts by mass or less, further preferably 2 parts by mass or less, and further preferably 1 part by mass or less. This mixing amount is preferable for producing a hydraulic composition for centrifugal molding of the present invention.

In the case of producing a hydraulic composition for steam curing by the method of the present invention for producing a hydraulic composition, from the viewpoint of increasing a use frequency of a mold by a prompt development of strength, components (A) and (B) in total are mixed, relative to 100 parts by mass of the hydraulic powder, in an amount of 0.25 parts by mass or more, preferably 0.4 parts by mass or more, and more preferably 0.6 parts by mass or more; and 10 parts by mass or less, preferably 5 parts by mass or less, and more preferably 2 parts by mass or less.

In the method for producing a hydraulic composition of the present invention, from the viewpoint of smoothly mixing components (A) and (B), and a hydraulic powder such as cement, it is preferable to mix components (A) and (B) with water in advance, and mix with a hydraulic powder. For the method for producing a hydraulic composition of the present invention, usable is a dispersant composition for hydraulic compositions of the present invention, which contains water.

Further, in the method for producing a hydraulic composition of the present invention, preferred is a method of mixing a hydraulic powder such as cement with a dispersant composition for hydraulic compositions of the present invention. The dispersant composition for hydraulic compositions of the present invention may be in the form of powder or liquid, and added to the hydraulic powder so that components (A) and (B), further component (C) are contained in the above-described amounts.

Specifically, the dispersant composition for hydraulic compositions of the present invention is mixed, relative to 100 parts by mass of the hydraulic powder, in an amount of preferably 0.1 parts by mass or more, preferably 0.2 parts by mass or more, further preferably 0.3 parts by mass or more, and further more preferably 0.5 parts by mass or more; and preferably 2 parts by mass or less, more preferably 1.5 parts by mass or less, and further preferably 1.2 parts by mass or less.

The hydraulic powder, water, component (A), component (B), and a component to be used if necessary, may be mixed by a mixer such as a mortar mixer and a biaxial pug mill.

In addition, the mixing is performed for preferably 1 minute or more, and more preferably 2 minutes or more; and preferably 5 minutes or less and more preferably 3 minutes or less. In preparing the hydraulic composition, the materials or agents, and the amounts thereof explained for the hydraulic composition are applicable.

An obtained hydraulic composition is further filled into a mold, cured and hardened. As the mold, exemplified are molds for buildings, molds for concrete products and others. As a method for filling in a mold, exemplified are: a method for pouring directly from a mixer; a method for sending a hydraulic composition by pressure by means of a pump and introducing into a mold; and others.

For acceleration of hardening in curing a hydraulic composition, heat-curing may be applied, thereby causing accelerated hardening. For the heat-curing, keeping a hydraulic composition at a temperature of 40° C. or higher and 90° C. or lower enables hardening thereof to be accelerated.

[Method for Producing a Hardened Product of a Hydraulic Composition]

The present invention provides a method for producing a hardened product of a hydraulic composition, which includes the following steps.

Step 1: mixing water, a hydraulic powder, an aggregate and the above dispersant composition for hydraulic compositions for centrifugal molding of the present invention to prepare a hydraulic composition having a water/hydraulic powder ratio of 10 mass % or more and 25 mass % or less.

Step 2: filling the hydraulic composition obtained in step 1 into a mold.

Step 3: compacting the hydraulic composition filled into the mold in step 2 by applying a centrifugal force.

Step 4: setting, in the mold, the hydraulic composition compacted in step 3.

Further, the present invention provides a method for producing a hardened product of a hydraulic composition, which includes the following steps.

Step 1: mixing water, a hydraulic powder, the following (A), the following (B) and an aggregate to prepare a hydraulic composition for centrifugal molding having a water/hydraulic powder ratio of 10 mass % or more and 25 mass % or less.

Step 2: filling the hydraulic composition obtained in step 1 into a mold.

Step 3: compacting the hydraulic composition filled into the mold in step 2 by applying a centrifugal force.

Step 4: setting, in the mold, the hydraulic composition compacted in step 3.

(A) a dispersant for hydraulic powders composed of an aromatic ring-containing high-molecular compound; and (B) one or more compounds selected from compounds represented by the above general formula (B1), compounds represented by the above general formula (B2), compounds represented by the above general formula (B3) and compounds represented by the above general formula (B4).

Further, the present invention provides a method for producing a hardened product of a hydraulic composition, which includes the following steps.

Step 1: mixing water, a hydraulic powder, the following (A), the following (B), the following (C) and an aggregate to prepare a hydraulic composition having a water/hydraulic powder ratio of 10 mass % or more and 25 mass % or less.

Step 2: filling the hydraulic composition obtained in step 1 into a mold.

Step 3: compacting the hydraulic composition filled into the mold in step 2 by applying a centrifugal force.

Step 4: setting, in the mold, the hydraulic composition compacted in step 3.

(A): a dispersant for hydraulic powders composed of an aromatic ring-containing high-molecular compound.

(B) one or more compounds selected from compounds represented by the above general formula (B1), compounds represented by the above general formula (B2), compounds represented by the above general formula (B3) and compounds represented by the above general formula (B4).

(C): a polycarboxylic acid-based copolymer.

The above three production methods perform centrifugal molding, and these three production methods are hereinafter referred to as a first group of methods for producing a hardened product.

The present invention provides a method for producing a hardened product of a hydraulic composition, which includes the following steps.

Step 1': mixing water, a hydraulic powder, an aggregate and the above dispersant composition for hydraulic compositions for steam curing of the present to prepare a hydraulic composition having a water/hydraulic powder ratio of 10 mass % or more and 53 mass % or less, wherein the dispersant composition for hydraulic compositions for steam curing is mixed so that a ratio of a mixing amount of (B) is 1 mass % or more and 60 mass % or less relative to a total mixing amount of (A) and (B) and the total mixing amount of (A) and (B) is 0.25 parts by mass or more and 10 parts by mass or less relative to 100 parts by mass of the hydraulic powder.

Step 2': filling the hydraulic composition obtained in step 1' into a mold.

Step 5': steam curing, in the mold, the hydraulic composition filled into the mold in step 2'.

Further, the present invention provides a method for producing a hardened product of a hydraulic composition, which includes the following steps.

Step 1': mixing water, a hydraulic powder, the following (A), the following (B) and an aggregate to prepare a hydraulic composition for steam curing having a water/hydraulic powder ratio of 10 mass % or more and 53 mass % or less, wherein (A) and (B) are mixed so that a ratio of a mixing amount of (B) is 1 mass % or more and 60 mass % or less relative to a total mixing amount of (A) and (B) and the total mixing amount of (A) and (B) is 0.25 parts by mass or more and 10 parts by mass or less relative to 100 parts by mass of the hydraulic powder.

Step 2': filling the hydraulic composition obtained in step 1' into a mold.

Step 5': steam curing, in the mold, the hydraulic composition filled into the mold in step 2'.

(A): a dispersant for hydraulic powders composed of an aromatic ring-containing high-molecular compound.

(B) one or more compounds selected from compounds represented by the above general formula (B1), compounds represented by the above general formula (B2), compounds represented by the above general formula (B3) and compounds represented by the above general formula (B4).

Further, the present invention provides a method for producing a hardened product of a hydraulic composition, which includes the following steps.

Step 1': mixing water, a hydraulic powder, the following (A), the following (B), the following (C) and an aggregate to prepare a hydraulic composition having a water/hydraulic powder ratio of 10 mass % or more and 53 mass % or less, wherein (A) and (B) are mixed so that a ratio of a mixing amount of (B) is 1 mass % or more and 60 mass % or less relative to a total mixing amount of (A) and (B) and the total mixing amount of (A) and (B) is 0.25 parts by mass or more and 10 parts by mass or less relative to 100 parts by mass of the hydraulic powder.

Step 2': filling the hydraulic composition obtained in step 1' into a mold.

Step 5': steam curing, in the mold, the hydraulic composition filled into the mold in step 2'.

(A): a dispersant for hydraulic powders composed of an aromatic ring-containing high-molecular compound.

(B) one or more compounds selected from compounds represented by the above general formula (B1), compounds represented by the above general formula (B2), compounds represented by the above general formula (B3) and compounds represented by the above general formula (B4).

(C): a polycarboxylic acid-based copolymer.

The above three production methods perform steam curing, and these three production methods are hereinafter referred to as a second group of methods for producing a hardened product.

Specific examples and preferred embodiments of components (A) and (B) used for the methods for producing a hardened product of a hydraulic composition of the present invention are the same as those described for the dispersant composition for hydraulic compositions of the present invention. To the methods for producing a hardened product of a hydraulic composition, (B)/[(A)+(B)] is applicable, but this ratio may be calculated based on the amount of component (A) and the amount of component (B) used for mixing. That is, (B)/[(A)+(B)] in the method for producing a hardened product of a hydraulic composition is calculated while the content of each component is read as the mixing amount.

Further, specific examples and preferred embodiments of the hydraulic powder used for the methods for producing a hardened product of a hydraulic composition of the present invention are the same as those described for the hydraulic composition of the present invention.

Further, specific examples and preferred embodiments of the aggregate used for the methods for producing a hardened product of a hydraulic composition of the present invention are the same as those described for the hydraulic composition of the present invention.

Further, specific examples and preferred embodiments of component (C) used for the methods for producing a hardened product of a hydraulic composition of the present invention are the same as those described for the dispersant composition for hydraulic compositions of the present invention.

The matters described for the dispersant composition for hydraulic compositions, the hydraulic composition, and the method for producing a hydraulic composition of the present invention are appropriately applicable to the method of the present invention for producing a hardened product of a hydraulic composition.

The first group of methods for producing a hardened product of the present invention preferably includes the following step 5, in addition to steps 1 to 4.

Step 5: steam curing, in the mold, the hydraulic composition set in step 4.

The first group of methods for producing a hardened product of the present invention can include the following step 6, in addition to steps 1 to 5.

Step 6: cooling the hydraulic composition after step 5 and demolding from the mold.

The first group of methods for producing a hardened product of the present invention can include the following step 7, in addition to steps 1 to 6.

Step 7: curing a hardened product of a hydraulic composition obtained in step 6 at ordinary temperature and normal pressure.

In step 1 of the first group of methods for producing a hardened product, a method for adding a mixture containing water and the dispersant composition for hydraulic compositions for centrifugal molding of the present invention to an aggregate and a hydraulic powder and mixing is preferable in that it enables easy and uniform mixing even in producing a hydraulic composition.

Specific method for step 1 is a process of preparing a hydraulic composition by mixing a hydraulic powder and an aggregate, adding and kneading a mixture containing water and the dispersant composition for hydraulic compositions for centrifugal molding of the present invention so that the above-described mixing amounts are satisfied.

If the dispersant composition for hydraulic compositions for centrifugal molding of the present invention is not used in step 1 of the first group of methods for producing a hardened product, components (A) and (B), and further component (C) may be separately added to and mixed with water, a hydraulic powder and an aggregate.

In step 1, a preferable range of kneading amounts of water and the dispersant composition for hydraulic compositions for centrifugal molding of the present invention relative to the hydraulic powder is the same as the preferable range for the content of each component in the hydraulic composition of the present invention.

In step 1, from the viewpoint of the centrifugal moldability and/or the strength development of a hardened product, prepared is a hydraulic composition having a ratio of water/hydraulic powder of 10 mass % or more, preferably 11 mass % or more, more preferably 15 mass % or more, and further preferably 17 mass % or more; and 25 mass % or less, preferably 24 mass % or less, more preferably 23 mass % or less, and further preferably 22 mass % or less. In step 1, the hydraulic powder is mixed so that the water/hydraulic powder ratio falls within this range.

In step 2 of the first group of methods for producing a hardened product, a method for filling the hydraulic composition obtained in step 1 into a mold includes a method, which includes discharging the kneaded hydraulic composition from kneading means, and manually injecting into a mold and leveling.

In step 3 of the first group of methods for producing a hardened product, the hydraulic composition filled into the mold is compacted by applying a centrifugal force. At that time, it is preferable to change a centrifugal force at least once. In step 3, the hydraulic composition may be compacted by applying a centrifugal force that changes in stages. That is, in step 3, the hydraulic composition is compacted by changing the centrifugal force at least once; further, by applying the centrifugal force that changes in stages; and further, by applying the centrifugal force that increases in stages.

In step 3, the hydraulic composition filled into the mold is compacted preferably by a centrifugal force of 0.5 G or more. The centrifugal force for centrifugal molding is preferably 0.5 G or more; and 30 G or less, and more preferably 25 G or less. From the viewpoint of the energy cost reduction and the moldability, it is preferable to maintain, for one minute or more, the centrifugal force in the range of 15 G or more, and 30 G or less, further 25 G or less (also referred as high centrifugal force).

For compaction with a centrifugal force, a centrifugal force of, for example, 0.5 G or more and 30 G or less is applied for, preferably 5 minutes or more, more preferably 7 minutes or more, and further preferably 9 minutes or more; and preferably 40 minutes or less. From the viewpoint of smoothening a molded body by compaction, compaction with a high centrifugal force maintained at 20 G or more, for example, is conducted for preferably 1 minute or more, more preferably 3 minutes or more, and further preferably 5 minutes or more; and preferably 15 minutes or less. That is, in step 3, a centrifugal force of 0.5 G or more and 30 G or less is applied for preferably 5 minutes or more, more preferably 7 minutes or more, and further preferably 9 minute or more; and preferably 40 minutes or less, and thereby the hydraulic composition can be compacted. Further, in step 3, compaction with a centrifugal force maintained at 20 G or more may be conducted for preferably 1 minute or more, more preferably 3 minutes or more, and further preferably 5 minutes or more; and preferably 15 minutes or less.

The compaction with a centrifugal force may be conducted by dividing into stages, and the centrifugal force G is preferably increased in stages from the viewpoint of the moldability. It can be conducted under the step-by-step conditions indicated below until a desired centrifugal force is applied. For example, in the case of five stages, it is preferable to compact the hydraulic composition in step 3 under the conditions: (1) the first speed as the first stage wherein a centrifugal force of 0.5 G or more and less than 2 G is applied for over 0 minute and 15 minutes or less; (2) the second speed as the second stage wherein a centrifugal force of 2G or more and less than 5 G is applied for over 0 minute and 15 minutes or less; (3) the third speed as the third stage wherein a centrifugal force of 5G or more and less than 10 G is applied for over 0 minute and 15 minutes or less; (4) the fourth speed as the fourth stage wherein a centrifugal force of 10 G or more and less than 20 G is applied for over 0 minute and 15 minutes or less; and (5) the fifth speed as the fifth stage wherein a centrifugal force of 20 G or more and 30 G or less is applied for over 0 minute and 15 minutes or less.

Step 4 of the first group of methods for producing a hardened product is for setting the hydraulic composition obtained in step 3. Specifically, atmospheric curing is conducted for 3 to 4 hours after kneading.

Step 5 of the first group of methods for producing a hardened product is for steam curing the hardened hydraulic composition obtained in step 4 in the mold. In step 5, it is preferable to conduct steam curing at 40° C. or higher and 90° C. or lower, and more preferably to conduct steam curing at 60° C. or higher and 90° C. or lower.

Further, in step 5, it is preferable to conduct steam curing after precuring is conducted. For example, precuring is conducted wherein the ambient temperature of the mold having the hydraulic composition filled therein (hereinafter, referred to as ambient temperature) is room temperature, preferably 10° C. or higher and 40° C. or lower, and the mold is allowed to stand for 1 hour or more and 4 hours or less, and thereafter, steam curing may be conducted at the ambient temperature of 40° C. or higher and 90° C. or lower, further 60° C. or higher and 90° C. or lower.

The precuring is conducted as "presteaming" in the below-described Examples and Comparative Examples.

From the viewpoint of suppressing a strength reduction of a hardened product due to cracking, the precuring is conducted preferably for 1 hour or more.

Further, when the first group of methods for producing a hardened product includes step 6, step 5 and step 6 may be conducted in succession under the control of a series of temperatures.

Steam curing is conducted in a state where water vapor is applied around the mold having the hydraulic composition filled therein while a predetermined temperature is kept for a certain period of time. After application of water vapor, the period for steam curing may be: (1) a temperature rising period, during which the temperature is increased to a predetermined temperature; (2) a period in which a predetermined temperature is kept for a certain period of time; and (3) a temperature falling period after a predetermined temperature is kept for a certain period of time.

Specific steam curing conditions in the first group of methods for producing a hardened product are that, as step 5, the ambient temperature for the mold is increased to 60° C. or higher and 85° C. or lower by a rate of temperature rise of 10° C. or higher and 30° C. or lower per hour, the increased temperature is kept for 2 hours or more and 8 hours or less, and then, as step 6, the temperature is decreased to room temperature, for example, 20° C. by a rate of temperature drop of 5° C. or higher and 20° C. or lower per hour, and the molded body is demolded.

The rate of temperature rise is preferably 20° C. or lower per hour from the viewpoint of suppressing a strength reduction of a hardened product due to cracking.

One example of preferable conditions is that the mold having the hydraulic composition filled therein is allowed to stand at the ambient temperature being room temperature, for example, 10° C. or higher and 30° C. or lower for 3 hours (precuring), the ambient temperature is increased to 70° C. or higher and 90° C. or lower by a rate of temperature rise of 20° C. per hour, the increased temperature of 70° C. or higher and 90° C. or lower is kept for 2 hours or more and 6 hours or less, the ambient temperature is decreased to room temperature, for example, 20° C. by a rate of temperature drop of 10° C. per hour (step 5), the mold is allowed to stand at the temperature for 20 hours or more and 30 hours or less, and then the molded body is demolded (step 6).

Further, autoclave curing at about 180° C. may also be conducted.

Step 7 of the first group of methods for producing a hardened product is for curing a hardened product obtained in step 6 at ordinary temperature and normal pressure. Specifically, the hardened product is stored at 20° C. under an atmospheric pressure.

As the first group of methods for producing a hardened product of the present invention, exemplified is a method for producing a hardened product of a hydraulic composition, which includes steps 1 to 6, wherein the period from the start of preparation of the hydraulic composition to the demolding in step 6 is 8 hours or more and 30 hours or less. In the above, the start of preparing the hydraulic composition is the timing when the hydraulic composition and water are in contact with each other for the first time.

In the first group of methods for producing a hardened product of the present invention, a mass ratio of component (C) to component (A), (C)/(A), is preferably 0/100 or more, more preferably over 0/100, further preferably 0.05/99.95 or more, further more preferably 0.1/99.9 or more, further more preferably 1/99 or more; and preferably 50/50 or less, more preferably 30/70 or less, and further preferably 10/90 or less.

A hardened product of a hydraulic composition obtained by the first group of methods for producing a hardened product of the present invention can be used as a centrifugally-molded concrete product, specific examples of which include a pile, a pole, and Hume pipe. A hardened product of a hydraulic composition obtained by the first group of methods for producing a hardened product of the present invention is excellent in initial strength, and generates a decreased amount of sludge at the time of production, thereby reducing the amount of waste products at a production site of the product. Furthermore, it is excellent in compacting, and thus the product has less unevenness on the inner surface and the end surface, is excellent in surface appearance, and has a smooth inner surface of the product, thereby avoiding failures during pile driving and failures of a cutting device during pile installation by inner excavation.

In the second group of methods for producing a hardened product of the present invention, step 1' can be carried out in the same manner as for step 1 of the first group of methods for producing a hardened product of the present invention.

A preferable embodiment of step 1' can be selected from preferable embodiments of step 1. However, the hydraulic composition prepared in step 1' has properties suitable for steam curing. Specifically, it is a hydraulic composition wherein a water/hydraulic powder ratio is 10 mass % or more and 53 mass % or less, and the total content of components (A) and (B) is 0.25 parts by mass or more and 10 parts by mass or less relative to 100 parts by mass of the hydraulic powder.

If the dispersant composition for hydraulic composition for steam curing of the present invention is not used in step 1' of the second group of methods for producing a hardened product, components (A) and (B), and further component (C) may be separately added to and mixed with water, a hydraulic powder and an aggregate.

In step 1', components (A) and (B) are mixed so that a ratio of the mixing amount of component (B) relative to the total mixing amount of components (A) and (B), that is (B)/[(A)+(B)], is 1 mass % or more and 60 mass % or less, and the total mixing amount of components (A) and (B) is 0.25 parts by mass or more and 10 parts by mass or less relative to 100 parts by mass of the hydraulic powder. A preferable range of (B)/[(A)+(B)] in step 1' is the same as the range described for the dispersant composition for hydraulic compositions of the present invention.

Further, in step 1', from the viewpoint of the demolding property and the strength development improvement of a concrete product, the hydraulic composition is prepared so that a ratio of water/hydraulic powder is 10 mass % or more, preferably 18 mass % or more, preferably 20 mass % or more, more preferably 25 mass % or more, further preferably 30 mass % or more, and 53 mass % or less, preferably 45 mass % or less, more preferably 40 mass % or less, and further preferably 35 mass % or less. In step 1', the hydraulic powder is mixed so that the ratio of water/hydraulic powder falls within this range.

In the second group of methods for producing a hardened product of the present invention, step 2' can be carried out in the same manner as for step 2 of the first group of methods for producing a hardened product of the present invention. A mold used in step 2' has properties suitable for steam curing.

In the second group of methods for producing a hardened product of the present invention, steam curing of step 5' can be carried out in the same manner as for step 5 of the first group of methods for producing a hardened product of the present invention. However, specific conditions for pre-steaming, temperature rise, temperature keeping, or temperature drop may be changed.

In the second group of methods for producing a hardened product of the present invention, steam curing in step 5' is carried out preferably so that, for example, a temperature of 10° C. or higher and 40° C. or lower is kept for 0.2 hours or more and 4 hours or less, the ambient temperature is increased by a rate of temperature rise of 20° C. or higher and 100° C. or lower per hour, and the increased temperature of 50° C. or higher and 70° C. or lower is maintained for 2 hours or more.

When (B)/[(A)+(B)] in step 1' is 3 mass % or more and 7 mass % or less, the precuring of steam curing in step 5' in the second group of methods for producing a hardened product of the present invention is carried out at preferably 10° C. or higher and 40° C. or lower, for preferably 0.2 hours or more, and more preferably 0.3 hours or more; and 4 hours or less, more preferably 3.5 hours or less, further preferably 2.5 hours or less, and further more preferably 0.7 hours or less.

Further, when (B)/[(A)+(B)] in step 1' is 15 mass % or more and 25 mass % or less, the precuring of steam curing in step 5' in the second group of methods for producing a hardened product of the present invention is carried out at preferably 10° C. or higher and 40° C. or lower, for preferably 0.2 hours or more, more preferably 0.3 hours or more, further preferably 0.5 hours or more, further more preferably 0.7 hours or more, and further more preferably 1.5 hours or more; and preferably 4 hours or less, more preferably 3 hours or less, and further preferably 2.5 hours or less.

The second group of methods for producing a hardened product of the present invention may include the following step 6'.

Step 6': cooling the hydraulic composition after step 5' and demolding from the mold.

In the second group of methods for producing a hardened product of the present invention, step 6' may be carried out in the same manner as for step 6 of the first group of methods for producing a hardened product of the present invention.

The second group of methods for producing a hardened product of the present invention may include the following step 7'.

Step 7': curing the hardened product of a hydraulic composition obtained in step 6' at ordinary temperature and normal pressure.

In the second group of methods for producing a hardened product of the present invention, step 7' can be carried out in the same manner as for step 7 of the first group of methods for producing a hardened product of the present invention.

In the second group of methods for producing a hardened product of the present invention, a mass ratio of component (C) to component (A), (C)/(A), is preferably 0/100 or more, more preferably over 0/100, further preferably 0.05/99.95 or more, further more preferably 0.1/99.9 or more, and further more preferably 1/99 or more; and preferably 50/50 or less, more preferably 30/70 or less, and further preferably 10/90 or less.

A hardened product of a hydraulic composition obtained by the second group of methods for producing a hardened product of the present invention can be used as large-sized concrete products. Specifically, exemplified are concrete products selected from a curtain wall, a box culvert and an L-shaped retaining wall. A curtain wall is a product for constructing, for example, a building or a wall; and a box culvert and an L-shaped retaining wall are a product for constructing, for example, a waterway or a road.

In addition to the above, the present invention discloses use of a composition containing components (A) and (B) as a dispersant for hydraulic composition for centrifugal molding.

Further, the present invention discloses use of, as a dispersant for hydraulic composition for steam curing, a composition containing components (A) and (B), wherein a content ratio of (B) relative to a total content of (A) and (B) is 1 mass % or more and 60 mass % or less.

The present invention discloses use of, as a hydraulic composition for centrifugal molding, a composition containing a dispersant composition for hydraulic compositions for centrifugal molding of the present invention, a hydraulic powder, an aggregate and water, wherein a ratio of water/hydraulic powder is 10 mass % or more and 25 mass % or less.

Further, the present invention discloses use of, as a hydraulic composition for centrifugal molding, a composition containing component (A), component (B), a hydraulic powder, an aggregate and water, wherein a ratio of water/hydraulic powder is 10 mass % or more and 25 mass % or less.

Further, the present invention discloses use of, as a hydraulic composition for steam curing, a composition containing a dispersant composition for hydraulic compositions for steam curing of the present invention, a hydraulic powder, an aggregate and water, wherein a ratio of water/hydraulic powder is 10 mass % or more and 53 mass % or less, and a total content of components (A) and (B) is 0.25 parts by mass or more and 10 parts by mass or less relative to 100 parts by mass of the hydraulic powder.

Further, the present invention discloses use of, as a hydraulic composition for steam curing, a composition containing component (A), component (B), a hydraulic powder, an aggregate and water, wherein a ratio of water/hydraulic powder is 10 mass % or more and 53 mass % or less, a content ratio of component (B) relative to the total content of components (A) and (B) is 1 mass % or more and 60 mass % or less, and the total content of components (A) and (B) is 0.25 parts by mass or more and 10 parts by mass or less relative to 100 parts by mass of the hydraulic powder.

The matters described for the dispersant composition for hydraulic compositions, the hydraulic composition, the method for producing a dispersant composition for hydraulic compositions, the method for producing a hydraulic composition, and the method for producing a hardened product of a hydraulic composition of the present invention are appropriately applicable to these uses.

Further, the present invention discloses a composition containing components (A) and (B), which is used for a dispersant for a hydraulic composition for centrifugal molding.

Further, the present invention discloses a composition, used for a dispersant for a hydraulic composition for steam curing, containing components (A) and (B), wherein a content ratio of component (B) relative to a total content of components (A) and (B) is 1 mass % or more and 60 mass % or less.

Further, the present invention discloses a composition, used for a hydraulic composition for centrifugal molding, containing the dispersant composition for hydraulic compositions for centrifugal molding of the present invention, a hydraulic powder, an aggregate and water, wherein a ratio of water/hydraulic powder is 10 mass % or more and 25 mass % or less.

Further, the present invention discloses a composition, used for a hydraulic composition for centrifugal molding, containing component (A), component (B), a hydraulic powder, an aggregate and water, wherein a ratio of water/hydraulic powder is 10 mass % or more and 25 mass % or less.

Further, the present invention discloses a composition, used for a hydraulic composition for steam curing, containing the dispersant composition for hydraulic compositions for steam curing of the present invention, a hydraulic powder, an aggregate and water, wherein a ratio of water/hydraulic powder is 10 mass % or more and 53 mass % or less, and a total content of components (A) and (B) is 0.25 parts by mass or more and 10 parts by mass or less relative to 100 parts by mass of the hydraulic powder.

Further, the present invention discloses a composition, used for a hydraulic composition for steam curing, containing component (A), component (B), a hydraulic powder, an aggregate and water, wherein a ratio of water/hydraulic powder is 10 mass % or more and 53 mass % or less, a content ratio of component (B) relative a total content of components (A) and (B) is 1 mass % or more and 60 mass % or less, and the total content of components (A) and (B) is 0.25 parts by mass or more and 10 parts by mass or less relative to 100 parts by mass of the hydraulic powder.

The matters described for the dispersant composition for hydraulic compositions, the hydraulic composition, the method for producing a dispersant composition for hydraulic compositions, the method for producing a hydraulic composition, and the method for producing a hardened product of a hydraulic composition of the present invention are appropriately applicable to these compositions.

Hereinafter, embodiments of the present invention are exemplified. The matters described for the dispersant composition for hydraulic compositions, the hydraulic composition, the method for producing a dispersant composition for hydraulic compositions, the method for producing a hydraulic composition, and the method for producing a hardened product of a hydraulic composition of the present invention are appropriately applicable to these embodiments.

<1>

A dispersant composition for hydraulic compositions for centrifugal molding, containing:

(A) a dispersant for hydraulic powders composed of an aromatic ring-containing high-molecular compound; and
(B) one or more compounds selected from compounds represented by the following general formula (B1), compounds represented by the following general formula (B2), compounds represented by the following general formula (B3) and compounds represented by the general formula (B4) (hereinafter, referred to as compound (B4)),

[Chemical Formula 5]

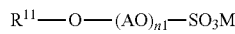 (B1)

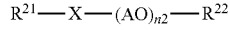 (B2)

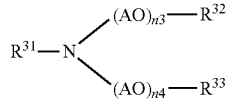 (B3)

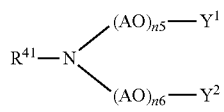 (B4)

wherein $R^{11}$, $R^{21}$, $R^{31}$ and $R^{41}$ each independently represent a hydrocarbon group having a carbon number of 4 or more and 27 or less;
$R^{22}$ represents a hydrogen atom or an alkyl group having a carbon number of 1 or more and 3 or less;
$R^{32}$ and $R^{33}$ are the same or different, and each represents a hydrogen atom or an alkyl group having a carbon number of 1 or more and 3 or less;

X represents O or COO;
AO represents an alkyleneoxy group having a carbon number of 2 or more and 4 or less;
$n_1$ represents an average number of moles of added AO and is 1 or more and 200 or less;
$n_2$ represents an average number of moles of added AO and is 1 or more and 200 or less;
$n_3$ and $n_4$ are the same or different, and each represents an average number of moles of added AO and is 0 or more, and the total of $n_3$ and $n_4$ is 1 or more and 200 or less;
$Y^1$ and $Y^2$ are the same or different, and each represents a hydrogen atom or $SO_3M$, and at least one of $Y^1$ and $Y^2$ is $SO_3M$;
$n_5$ and $n_6$ are the same or different; each represents an average number of moles of added AO and is 0 or more; the total of $n_5$ and $n_6$ is 1 or more and 200 or less; when $n_5$ is 0, $Y^1$ is a hydrogen atom; and when $n_6$ is 0, $Y^2$ is a hydrogen atom; and
M is a counter ion.

<2>

A dispersant composition for hydraulic compositions for steam curing, containing components (A) and (B), wherein a content ratio of (B) is 1 mass % or more and 60 mass % or less relative to a total content of (A) and (B).

<3>

The dispersant composition for hydraulic compositions described in <1> or <2>, wherein component (A) is a dispersant for hydraulic powders composed of a high-molecular compound having an aromatic ring-containing monomer unit.

The dispersant composition for hydraulic compositions signifies a dispersant composition for hydraulic compositions for centrifugal molding or a dispersant composition for hydraulic compositions for steam curing, and this applies hereinafter.

<4>

The dispersant composition for hydraulic compositions described in any of <1> to <3>, wherein the aromatic ring-containing monomer unit of component (A) is one or more monomer units selected from a benzene ring-containing monomer unit, a naphthalene ring-containing monomer unit and a triazine ring-containing monomer unit.

<5>

The dispersant composition for hydraulic compositions described in any of <1> to <4>, wherein component (A) is a dispersant for hydraulic powders composed of a high-molecular compound having a naphthalene ring-containing monomer unit.

<6>

The dispersant composition for hydraulic compositions described in <5>, wherein component (A) is a formaldehyde naphthalenesulfonate condensate or a salt thereof.

<7>

The dispersant composition for hydraulic compositions described in <6>,
wherein the formaldehyde naphthalenesulfonate condensate or the salt thereof has a weight average molecular weight, measured by a gel permeation chromatography (GPC) under the following conditions, of preferably 200,000 or less, more preferably 100,000 or less, further preferably 80,000 or less, further more preferably 50,000 or less, and further more preferably 30,000 or less; and preferably 1,000 or more, more preferably 3,000 or more, further preferably 4,000 or more, and further more preferably 5,000 or more.

[GPC Condition]
Column: G4000SWXL+G2000SWXL (Tosoh Corporation)
Eluent: 30 mM $CH_3COONa/CH_3CN=6/4$ Flow rate: 0.7 ml/min
Detection: UV 280 nm
Sample size: 0.2 mg/ml
Standard substance: in terms of sodium polystyrene sulfonate (monodispersed sodium polystyrene sulfonate: molecular weight, 206, 1800, 4000, 8000, 18000, 35000, 88000, 780000) manufactured by Nishio Kogyo Kabushiki Kaisha
Detector: UV-8020 (Tosoh Corporation)

<8>

The dispersant composition for hydraulic compositions described in any of <1> to <4>, wherein component (A) is one or more dispersants for hydraulic compositions selected from a phenol-based dispersant, a lignin-based dispersant, a melamine-based dispersant and a styrene sulfonate-based dispersant.

<9>

The dispersant composition for hydraulic compositions described in any of <1> to <8>, wherein the hydrocarbon group of $R^{11}$ in the general formula (B1) is a group selected from an alkyl group, an alkenyl group, an aralkyl group, an aryl group, and an aryl group having a substituent.

<10>

The dispersant composition for hydraulic compositions described in any of <1> to <9>, wherein the hydrocarbon group of $R^{11}$ in the general formula (B1) is a group selected from an alkyl group, an alkenyl group and an aryl group having a substituent, preferably a group selected from an alkenyl group and an aryl group having a substituent.

<11>

The dispersant composition for hydraulic compositions described in <10>, wherein the alkyl group is an aliphatic alkyl group, preferably a linear aliphatic alkyl group.

<12>

The dispersant composition for hydraulic compositions described in <10>, wherein the alkenyl group is an aliphatic alkenyl group, preferably a linear aliphatic alkenyl group.

<13>

The dispersant composition for hydraulic compositions described in <10>, wherein the aryl group having a substituent is: (1) an aryl group wherein a hydrogen atom of an aromatic ring is substituted by a hydrocarbon group; further, (2) an aryl group wherein one, two or three hydrogen atoms of an aromatic ring are substituted by a hydrocarbon group; further, (3) a group selected from an alkyl group-substituted phenyl group having a carbon number of preferably 1 or more and further preferably 2 or more, and preferably 10 or less and further preferably 8 or less, a benzyl group-substituted phenyl group and a styrenated phenyl group; and further, (4) a group selected from a benzyl group-substituted phenyl group and a styrenated phenyl group.

<14>

The dispersant composition for hydraulic compositions described in <10>, wherein $R^{11}$ in the general formula (B1) is an alkyl group.

<15>

The dispersant composition for hydraulic compositions described in <10>, wherein $R^{11}$ in the general formula (B1) is an alkenyl group.

<16>

The dispersant composition for hydraulic compositions described in <10>, wherein $R^{11}$ in the general formula (B1) is an aryl group having a substituent.

<17>

The dispersant composition for hydraulic compositions described in any of <1> to <16>, wherein the carbon number of $R^{11}$ in the general formula (B1) is preferably 8 or more, more preferably 12 or more, and further preferably 16 or more; and preferably 22 or less, more preferably 20 or less, and further preferably 18 or less.

<18>

The dispersant composition for hydraulic compositions described in any of <1> to <17>, wherein $R^{11}$ in the general formula (B1) is a group selected from a decyl group, a lauryl group, a myristyl group, a palmityl group, a stearyl group, a behenyl group, an isostearyl group, and an oleyl group; preferably a group selected from a lauryl group, a myristyl group, a palmityl group, a stearyl group, a behenyl group, an isostearyl group, and an oleyl group; and more preferably a group selected from a lauryl group, a myristyl group, a palmityl group, a stearyl group, and an oleyl group.

<19>

The dispersant composition for hydraulic compositions described in any of <1> to <17>, wherein $R^{11}$ in the general formula (B1) is a group selected from a decyl group, a lauryl group, a myristyl group, a palmityl group, a stearyl group, a behenyl group, an isostearyl group, an oleyl group, a tribenzyl phenyl group, and a distyrenated phenyl group; preferably a group selected from a lauryl group, a myristyl group, a palmityl group, a stearyl group, a behenyl group, an isostearyl group, an oleyl group, a tribenzyl phenyl group, and a distyrenated phenyl group; more preferably a group selected from a lauryl group, a myristyl group, a palmityl group, a stearyl group, an oleyl group, a tribenzyl phenyl group, and a distyrenated phenyl group; and further more preferably a group selected from an oleyl group, a stearyl group, a distyrenated phenyl group, and a tribenzyl phenyl group.

<20>

The dispersant composition for hydraulic compositions described in any of <1> to <19>, wherein AO in the general formula (B1) is one or more groups selected from an alkyleneoxy group having 2 carbon atoms and an alkyleneoxy group having 3 carbon atoms, or AO includes an alkyleneoxy group having 2 carbon atoms.

<21>

The dispersant composition for hydraulic compositions described in any of <1> to <20>, wherein $n_1$ in the general formula (B1) is preferably 10 or more, and more preferably 20 or more; and preferably 60 or less, and more preferably 40 or less.

<22>

The dispersant composition for hydraulic compositions described in any of <1> to <21>, wherein $R^{11}$ in the general formula (B1) is an aryl group having a substituent and $n_1$ is preferably 10 or more, more preferably 15 or more, and further preferably 25 or more; and preferably 65 or less, more preferably 50 or less, further preferably 40 or less, and further more preferably 35 or less.

<23>

The dispersant composition for hydraulic compositions described in any of <1> to <21>, wherein $R^{11}$ in the general formula (B1) is an alkenyl group and $n_1$ is preferably 5 or more, more preferably 8 or more, and further preferably 9 or more; and preferably 65 or less, more preferably 50 or less, further preferably 40 or less, further more preferably 35 or less, further more preferably 25 or less, furthermore preferably 20 or less, and further more preferably 12 or less.

<24>

The dispersant composition for hydraulic compositions described in any of <1> to <21>, wherein $R^{11}$ in the general formula (B1) is an alkyl group and $n_1$ is preferably 15 or more, and more preferably 20 or more; and preferably 55 or less, and more preferably 30 or less.

<25>
The dispersant composition for hydraulic compositions described in any of <1> to <24>, wherein M in the general formula (B1) is an ion selected from a hydrogen ion, an alkali metal ion, an alkaline earth metal ion (½ atom) and an ammonium ion.

<26>
The dispersant composition for hydraulic compositions described in <25>, wherein M in the general formula (B1) is an ammonium ion.

<27>
The dispersant composition for hydraulic compositions described in <25>, wherein M in the general formula (B1) is an alkali metal ion, preferably an alkali metal ion selected from a sodium ion and a potassium ion.

<28>
The dispersant composition for hydraulic compositions described in any of <1> to <27>, wherein compound (B1) is one or more compounds selected from polyoxyethylene alkenyl ether sulfuric esters or salts thereof, and polyoxyethylene substituted aryl ether sulfuric esters or salts thereof.

<29>
The dispersant composition for hydraulic compositions described in any of <1> to <22>, wherein the hydrocarbon group of $R^{21}$ in the general formula (B2) is an alkyl group, an alkenyl group, an aralkyl group, an aryl group, and an aryl group having a substituent.

<30>
The dispersant composition for hydraulic compositions described in <29>, wherein the hydrocarbon group of $R^{21}$ in the general formula (B2) is a group selected from an alkyl group, an alkenyl group, and an aryl group having a substituent, and preferably a group selected from an alkenyl group and an aryl group having a substituent.

<31>
The dispersant composition for hydraulic compositions described in <30>, wherein the alkyl group is an aliphatic alkyl group, preferably a linear aliphatic alkyl group.

<32>
The dispersant composition for hydraulic compositions described in <30>, wherein the alkenyl group is an aliphatic alkenyl group, preferably a linear aliphatic alkenyl group.

<33>
The dispersant composition for hydraulic compositions described in <30>, wherein the aryl group having a substituent is: (1) an aryl group wherein a hydrogen atom of an aromatic ring is substituted by a hydrocarbon group; further, (2) an aryl group wherein one, two or three hydrogen atoms of an aromatic ring are substituted by a hydrocarbon group; further, (3) a group selected from an alkyl group-substituted phenyl group having a carbon number of preferably 1 or more and further preferably 2 or more, and preferably 10 or less and further preferably 8 or less, a benzyl group-substituted phenyl group and a styrenated phenyl group; and further, (4) a group selected from a benzyl group-substituted phenyl group and a styrenated phenyl group.

<34>
The dispersant composition for hydraulic compositions described in <30>, wherein $R^{21}$ in the general formula (B2) is an alkyl group.

<35>
The dispersant composition for hydraulic compositions described in <30>, wherein $R^{21}$ in the general formula (B2) is an alkenyl group.

<36>
The dispersant composition for hydraulic compositions described in <30>, wherein $R^{21}$ in the general formula (B2) is an aryl group having a substituent.

<37>
The dispersant composition for hydraulic compositions described in any of <1> to <36>, wherein the carbon number of $R^{21}$ in the general formula (B2) is preferably 8 or more, more preferably 12 or more, and further preferably 16 or more; and preferably 22 or less, more preferably 20 or less, and further preferably 18 or less.

<38>
The dispersant composition for hydraulic compositions described in any of <1> to <37>, wherein $R^{21}$ in the general formula (B2) is a group selected from a decyl group, a lauryl group, a myristyl group, a palmityl group, a stearyl group, a behenyl group, an isostearyl group, and an oleyl group; preferably a group selected from a lauryl group, a myristyl group, a palmityl group, a stearyl group, a behenyl group, an isostearyl group, and an oleyl group; and more preferably a group selected from a lauryl group, a myristyl group, a palmityl group, a stearyl group, and an oleyl group.

<39>
The dispersant composition for hydraulic compositions described in any of <1> to <37>, wherein $R^{21}$ in the general formula (B2) is a group selected from a decyl group, a lauryl group, a myristyl group, a palmityl group, a stearyl group, a behenyl group, an isostearyl group, an oleyl group, and a distyrenated phenyl group; preferably a group selected from a lauryl group, a myristyl group, a palmityl group, a stearyl group, a behenyl group, an isostearyl group, an oleyl group, and a distyrenated phenyl group; more preferably a group selected from a lauryl group, a myristyl group, a palmityl group, a stearyl group, an oleyl group, and a distyrenated phenyl group.

<40>
The dispersant composition for hydraulic compositions described in any of <1> to <39>, wherein X in the general formula (B2) is O.

<41>
The dispersant composition for hydraulic compositions described in any of <1> to <40>, wherein AO in the general formula (B2) is one or more groups selected from an alkyleneoxy group having 2 carbon atoms and an alkyleneoxy group having 3 carbon atoms, or AO includes an alkyleneoxy group having 2 carbon atoms.

<42>
The dispersant composition for hydraulic compositions described in any of <1> to <41>, wherein n2 in the general formula (B2) is preferably 10 or more, and more preferably 20 or more; and preferably 60 or less, and more preferably 40 or less.

<43>
The dispersant composition for hydraulic compositions described in any of <1> to <41>, wherein $R^{21}$ in the general formula (B2) is an aryl group having a substituent and $n_2$ is preferably 10 or more; and preferably 25 or less, and more preferably 15 or less.

<44>
The dispersant composition for hydraulic compositions described in any of <1> to <41>, wherein $R^{21}$ in the general formula (B2) is an alkyl group and $n_2$ is preferably 1 or more; and preferably 5 or less.

The dispersant composition for hydraulic compositions described in any of <1> to <41>, wherein $R^{21}$ in the general formula (B2) is an alkenyl group and $n_2$ is preferably 5 or more, more preferably 8 or more, and further preferably 10 or more; and preferably 65 or less, more preferably 50 or

<46>

The dispersant composition for hydraulic compositions described in any of <1> to <45>, wherein $R^{22}$ in the general formula (B2) is a hydrogen atom.

<47>

The dispersant composition for hydraulic compositions described in any of <1> to <46>, wherein compound (B2) is one or more compounds selected from a polyoxyethylene alkyl ether, a polyoxyethylene alkenyl ether, a polyoxyethylene alkyl ester and a polyoxyethylene substituted aryl ether.

<48>

The dispersant composition for hydraulic compositions described in any of <1> to <47>, wherein the hydrocarbon group of $R^{31}$ in the general formula (B3) is a group selected from an alkyl group, an alkenyl group, an aralkyl group, an aryl group and an aryl group having a substituent.

<49>

The dispersant composition for hydraulic compositions described in <48>, wherein the hydrocarbon group of $R^{31}$ in the general formula (B3) is a group selected from an alkyl group and an alkenyl group.

<50>

The dispersant composition for hydraulic compositions described in <48>, wherein the alkyl group is an aliphatic alkyl group, preferably a linear aliphatic alkyl group.

<51>

The dispersant composition for hydraulic compositions described in <48>, wherein the alkenyl group is an aliphatic alkenyl group, preferably a linear aliphatic alkenyl group.

<52>

The dispersant composition for hydraulic compositions described in <48>, wherein $R^{31}$ in the general formula (B3) is an alkyl group.

<53>

The dispersant composition for hydraulic compositions described in <48>, wherein $R^{31}$ in the general formula (B3) is an alkenyl group.

<54>

The dispersant composition for hydraulic compositions described in any of <1> to <53>, wherein the carbon number of $R^{31}$ in the general formula (B3) is preferably 8 or more, more preferably 12 or more, and further preferably 16 or more; and preferably 22 or less, more preferably 20 or less, and further preferably 18 or less.

<55>

The dispersant composition for hydraulic compositions described in any of <1> to <54>, wherein $R^{31}$ in the general formula (B3) is a group selected from a decyl group, a lauryl group, a myristyl group, a palmityl group, a stearyl group, a behenyl group, an isostearyl group and an oleyl group; preferably a group selected from a lauryl group, a myristyl group, a palmityl group, a stearyl group, a behenyl group, an isostearyl group, and an oleyl group; and more preferably a group selected from a lauryl group, a myristyl group, a palmityl group, a stearyl group, and an oleyl group.

<56>

The dispersant composition for hydraulic compositions described in any of <1> to <55>, wherein AO in the general formula (B3) is one or more groups selected from an alkyleneoxy group having 2 carbon atoms and an alkyleneoxy group having 3 carbon atoms, or AO includes an alkyleneoxy group having 2 carbon atoms.

<57>

The dispersant composition for hydraulic compositions described in any of <1> to <56>, wherein the total of $n_3$ and $n_4$ in the general formula (B3) is preferably 10 or more, and more preferably 20 or more; and preferably 60 or less and more preferably 40 or less.

<58>

The dispersant composition for hydraulic compositions described in any of <1> to <57>, wherein $R^{32}$ and $R^{33}$ in the general formula (B3) are each a hydrogen atom.

<59>

The dispersant composition for hydraulic compositions described in any of <1> to <58>, wherein compound (B3) is one or more compounds selected from polyoxyalkylene alkylamines.

<60>

The dispersant composition for hydraulic compositions described in any of <1> to <59>, wherein the hydrocarbon group of $R^{41}$ in the general formula (B4) is a group selected from an alkyl group, an alkenyl group, an aralkyl group, an aryl group, and an aryl group having a substituent.

<61>

The dispersant composition for hydraulic compositions described in <60>, wherein the hydrocarbon group of $R^{41}$ in the general formula (B4) is a group selected from an alkyl group and an alkenyl group.

<62>

The dispersant composition for hydraulic compositions described in <61>, wherein the alkyl group is an aliphatic alkyl group, preferably a linear aliphatic alkyl group.

<63>

The dispersant composition for hydraulic compositions described in <61>, wherein the alkenyl group is an aliphatic alkenyl group, preferably a linear aliphatic alkenyl group.

<64>

The dispersant composition for hydraulic compositions described in <61>, wherein $R^{41}$ in the general formula (B4) is an alkyl group.

<65>

The dispersant composition for hydraulic compositions described in <61>, wherein $R^{41}$ in the general formula (B4) is an alkenyl group.

<66>

The dispersant composition for hydraulic compositions described in any of <1> to <65>, wherein the carbon number of $R^{41}$ in the general formula (B4) is preferably 8 or more, more preferably 12 or more, and further preferably 16 or more; and preferably 22 or less, more preferably 20 or less, and further preferably 18 or less.

<67>

The dispersant composition for hydraulic compositions described in any of <1> to <66>, wherein $R^{41}$ in the general formula (B4) is a group selected from a decyl group, a lauryl group, a myristyl group, a palmityl group, a stearyl group, a behenyl group, an isostearyl group, and an oleyl group; preferably a group selected from a lauryl group, a myristyl group, a palmityl group, a stearyl group, a behenyl group, an isostearyl group, and an oleyl group; and more preferably a group selected from a lauryl group, a myristyl group, a palmityl group, a stearyl group, and an oleyl group.

<68>

The dispersant composition for hydraulic compositions described in any of <1> to <67>, wherein AO in the general formula (B4) is one or more groups selected from an alkyleneoxy group having 2 carbon atoms and an alkyleneoxy group having 3 carbon atoms, or AO includes an alkyleneoxy group having 2 carbon atoms.

<69>
The dispersant composition for hydraulic compositions described in any of <1> to <68>, wherein $Y^1$ and $Y^2$ in the general formula (B4) are the same or different, each represents a hydrogen atom or $SO_3M$, and at least one of $Y^1$ and $Y^2$ is $SO_3M$, and wherein M is a counter ion, and is an ion selected from a hydrogen ion, an alkali metal ion, an alkaline earth metal ion (½ atom) and an ammonium ion.
<70>
The dispersant composition for hydraulic compositions described in any of <1> to <69>, wherein M of $SO_3M$ is an ammonium ion.
<71>
The dispersant composition for hydraulic compositions described in any of <1> to <69>, wherein M of $SO_3M$ is an alkali metal ion, preferably an alkali metal ion selected from a sodium ion and a potassium ion.
<72>
The dispersant composition for hydraulic compositions described in any of <1> to <71>, wherein the total of $n_5$ and $n_6$ in the general formula (B4) is preferably 20 or more, and more preferably 50 or more; and preferably 150 or less, more preferably 100 or less.
<73>
The dispersant composition for hydraulic compositions described in any of <1> to <72>, wherein compound (B4) is one or more compounds selected from sulfuric esters of aliphatic amine alkylene adduct.
<74>
The dispersant composition for hydraulic compositions described in any of <1> to <73>, wherein component (B) is one or more compounds belonging to compound (B1), compound (B2), compound (B3), and
compound (B4).
<75>
The dispersant composition for hydraulic compositions described in any of <1> to <74>, wherein component (B) is one or more compounds selected from compound (B1), compound (B2) and compound (B3).
<76>
The dispersant composition for hydraulic compositions described in any of <1> to <75>, wherein component (B) is one or more compounds selected from compound (B1).
<77>
The dispersant composition for hydraulic compositions described in any of <1> to <75>, wherein, as component (B), one or more compounds selected from compound (B1), compound (B2) and compound (B3), and further one or more compounds selected from compound (B1) are contained.
<78>
The dispersant composition for hydraulic compositions described in any of <1> to <77>, wherein the dispersant composition for hydraulic compositions contains, in a solid content thereof, component (A) in an amount of preferably 1 mass % or more, more preferably 3 mass % or more, and further preferably 5 mass % or more; and preferably 99 mass % or less, more preferably 97 mass % or less, and further preferably 95 mass % or less.
<79>
The dispersant composition for hydraulic compositions described in any of <1> to <78>, wherein the dispersant composition for hydraulic compositions contains, in the solid content thereof, component (B) in an amount of preferably 2 mass % or more, more preferably 5 mass % or more, and further preferably 7 mass % or more; and preferably 90 mass % or less, more preferably 80 mass % or less, and further preferably 70 mass % or less.
<80>
The dispersant composition for hydraulic compositions described in any of <1> to <79>, wherein a content ratio of component (B) is preferably 3 mass % or more, more preferably 5 mass % or more, further preferably 10 mass % or more, and further more preferably 20 mass %; and preferably 60 mass % or less, more preferably 50 mass % or less, further preferably 40 mass % or less, and further more preferably 30 mass % or less, relative to the total content of component (A) and component (B).
<81>
The dispersant composition for hydraulic compositions described in any of <1> to <80>, wherein component (A) is a high-molecular compound having a naphthalene ring-containing monomer unit and a molar ratio of the total amount of component (B) relative to the naphthalene ring-containing monomer unit in component (A) is preferably 0.2% or more, more preferably 0.5% or more, further preferably 0.8% or more, further more preferably 1.5% or more, and further more preferably 5% or more; and preferably 50% or less, more preferably 45% or less, further preferably 30% or less, further more preferably 20% or less, further more preferably 15% or less, further more preferably 10% or less, and further more preferably 8% or less (note that those reciting <8> are excluded).
<82>
The dispersant composition for hydraulic compositions described in any of <1> to <80>, wherein component (A) is a high-molecular compound having a naphthalene ring-containing monomer unit and a molar ratio of the total amount of component (B) relative to the naphthalene ring-containing monomer unit in component (A) is preferably 16.1% or more, more preferably 30.1% or more; and 50% or less (note that those reciting <8> are excluded).
<83>
The dispersant composition for hydraulic compositions described in any of <1> to <80>, wherein component (A) is a high-molecular compound having a naphthalene ring-containing monomer unit, component (B) is a compound wherein $R^{11}$ in the general formula (B) is an aryl group having a substituent, and a molar ratio of the total amount of component (B) relative to the naphthalene ring-containing monomer unit in component (A) is preferably 1.5% or more, and more preferably 2% or more; and preferably 7% or less, more preferably 6% or less, further preferably 5% or less, further more preferably 4.5% or less, and further more preferably 3% or less (note that those reciting <8> are excluded).
<84>
The dispersant composition for hydraulic compositions described in any of <1> to <80>, wherein component (A) is a high-molecular compound having a naphthalene ring-containing monomer unit, component (B) is a compound wherein $R^{11}$ in the general formula (B) is an alkenyl group, and a molar ratio of the total amount of component (B) relative to the naphthalene ring-containing monomer unit in component (A) is preferably 1.5% or more, more preferably 3% or more, further preferably 4% or more, and further more preferably 6.5% or more; and preferably 9% or less, and more preferably 8% or less (note that those reciting <8> are excluded).
<85>
The dispersant composition for hydraulic compositions described in any of <1> to <80>, wherein component (A) is a high-molecular compound having a naphthalene ring-containing monomer unit, component (B) is a compound wherein $R^{11}$ in the general formula (B) is an alkyl group having a carbon number of 16 or more and 18 or less, and a molar ratio of the total amount of component (B) relative to the naphthalene ring-containing monomer unit in component (A) is preferably 0.5% or more, more preferably 1% or more, further preferably 2% or more, further more preferably 3.5% or more, and further more preferably 5% or more; and preferably 45% or less, more preferably 40% or less, further preferably 25% or less, further more preferably 15% or less, and further more preferably 10% or less (note that those reciting <8> are excluded).

<86>

The dispersant composition for hydraulic compositions described in any of <1> to <80>, wherein component (A) is a high-molecular compound having a naphthalene ring-containing monomer unit, component (B) is a compound wherein $R^{11}$ in the general formula (B) is an alkyl group having a carbon number of 6 or more and 10 or less, and a molar ratio of the total amount of component (B) relative to the naphthalene ring-containing monomer unit in component (A) is preferably 0.3% or more, more preferably 0.5% or more, and further preferably 1.5% or more; and preferably 7% or less, more preferably 6% or less and further preferably 3% or less (note that those reciting <8> are excluded).

<87>

The dispersant composition for hydraulic compositions described in any of <1> to <86>, containing (C) a polycarboxylic acid-based copolymer (hereinafter, referred to as component (C)).

<88>

The dispersant composition for hydraulic compositions described in <87>, wherein component (C) is a copolymer containing a monomer (C1) represented by the following general formula (C1) and a monomer represented by the following general formula (C2) as constituent monomers (hereinafter, referred to copolymer (C))

[Chemical Formula 6]

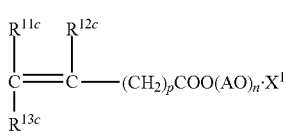

(C1)

wherein $R^{11c}$ and $R^{12c}$ may be the same or different, and they are a hydrogen atom or a methyl group;

$R^{13c}$ is a hydrogen atom or $-COO(AO)_n \cdot X^1$;

$X^1$ is an alkyl group having a carbon number of 1 or more and 4 or less;

AO is a group selected from an ethyleneoxy group and a propyleneoxy group;

n' is an average number of moles of added AO and is 1 or more and 300 or less; and p is 0 or more and 2 or less.

[Chemical Formula 7]

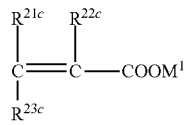

(C2)

wherein $R^{21c}$, $R^{22c}$ and $R^{23c}$ may be the same or different, and they are a hydrogen atom, a methyl group or $(CH_2)_r COOM^2$, $(CH_2)_r COOM^2$ may form an anhydride with $COOM^1$ or other $(CH_2)_r COOM^2$, and in that case, and $M^1$ or $M^2$ is not present in those groups;

$M^1$ and $M^2$ may be the same or different, and they are a hydrogen atom, an alkali metal, an alkaline earth metal (½ atom), an alkylammonium group or a substituted alkylammonium group; and r is 0 or more and 2 or less.

<89>

The dispersant composition for hydraulic compositions described in <88>, wherein $R^{11c}$ in the general formula (C1) is a hydrogen atom.

<90>

The dispersant composition for hydraulic compositions described in <88> or <89>, wherein $R^{12C}$ in the general formula (C1) is a methyl group.

<91>

The dispersant composition for hydraulic compositions described in any of <88> to <90>, wherein $R^{13c}$ in the general formula (C1) is a hydrogen atom.

<92>

The dispersant composition for hydraulic compositions described in any of <88> to <91>, wherein $X^1$ in the general formula (C1) is a methyl group.

<93>

The dispersant composition for hydraulic compositions described in any of <88> to <92>, wherein AO in the general formula (C1) is an ethyleneoxy group or AO contains an ethyleneoxy group.

<94>

The dispersant composition for hydraulic compositions described in any of <88> to <93>, wherein n' in the general formula (C1) is preferably 100 or more, and more preferably 110 or more; and preferably 200 or less, and more preferably 150 or less.

<95>

The dispersant composition for hydraulic compositions described in any of <88> to <93>, wherein n' in the general formula (C1) is preferably 5 or more, more preferably 20 or more, and further preferably 40 or more; and preferably 200 or less, more preferably 150 or less, further preferably 100 or less, further more preferably 80 or less, and further more preferably 50 or less.

<96>

The dispersant composition for hydraulic compositions described in any of <88> to <95>, wherein p in the general formula (C1) is 0.

<97>

The dispersant composition for hydraulic compositions described in any of <88> to <96>, wherein $R^{21c}$ in the general formula (C2) is a hydrogen atom.

<98>
The dispersant composition for hydraulic compositions described in any of <88> to <97>, wherein $R^{22c}$ in the general formula (C2) is a methyl group.
<99>
The dispersant composition for hydraulic compositions described in any of <88> to <98>, wherein $R^{23c}$ in the general formula (C2) is a hydrogen atom.
<100>
The dispersant composition for hydraulic compositions described in any of <88> to <99>, wherein $M^1$ and $M^2$ in the general formula (C2) are each a hydrogen atom.
<101>
The dispersant composition for hydraulic compositions described in any of <88> to <100>, wherein r of $(CH_2)_r$ $COOM^2$ in the general formula (C2) is 1.
<102>
The dispersant composition for hydraulic compositions described in any of <88> to <101>, wherein the total amount of monomers (C1) and (C2) among the constituent monomers of the copolymer (C) is 90 mass % or more, preferably 92 mass % or more, and more preferably 95 mass % or more; and 100 mass % or less, or equivalent to 100 mass %.
<103>
The dispersant composition for hydraulic compositions described in any of <88> to <102>, wherein a ratio of monomer (C2) relative to the total of monomers (C1) and (C2) in copolymer (C) is preferably 80 mol % or more and more preferably 90 mol % or more; and preferably 98 mol % or less and more preferably 97 mol % or less.
<104>
The dispersant composition for hydraulic compositions described in any of <88> to <102>, wherein a ratio of monomer (C2) relative to the total of monomers (C1) and (C2) in copolymer (C) is preferably 60 mol % or more and more preferably 75 mol % or more; and preferably 90 mol % or less, more preferably 80 mol % or less, and further preferably 77 mol % or less.
<105>
The dispersant composition for hydraulic compositions described in any of <87> to <104>, wherein the dispersant composition for hydraulic compositions contains, in the solid content thereof, component (C) in an amount of preferably 1 mass % or more, more preferably 3 mass % or more, and further preferably 5 mass % or more; and preferably 30 mass % or less, more preferably 20 mass % or less, and further preferably 15 mass % or less.
<106>
The dispersant composition for hydraulic compositions described in any of <87> to <105>, wherein the mass ratio of component (C) to component (A), (C)/(A), is preferably 0/100 or more, more preferably over 0/100, further preferably 0.05/99.95 or more, further more preferably 0.1/99.9 or more, and further more preferably 1/99 or more; and preferably 50/50 or less, more preferably 30/70 or less, and further preferably 10/90 or less.
<107>
The dispersant composition for hydraulic compositions described in any of <87> to <106>, wherein the total content of components (A) and (C) in the composition is preferably 1 mass % or more, more preferably 4 mass % or more, and further preferably 7 mass % or more; and preferably 50 mass % or less, more preferably 32 mass % or less, and further preferably 27 mass % or less.
<108>
The dispersant composition for hydraulic compositions described in any of <1> to <107>, containing cement dispersant, a water-soluble high-molecular compound, an air entraining agent, a cement wetting agent, an expansive additive, a waterproofing agent, a retarder, a set accelerating agent, a viscous agent, a coagulant, a drying shrinkage reducing agent, a strength enhancement agent, a hardening accelerator, an antiseptic agent and an antifoaming agent (excluding those corresponding to component (A), component (B) or component (C)).
<109>
The dispersant composition for hydraulic compositions described in any of <1> to <108>, wherein the composition is in the form of a liquid or a solid.
<110>
The dispersant composition for hydraulic compositions described in any of <1> to <109>, wherein the composition is in the form of a liquid and contains water.
<111>
The dispersant composition for hydraulic compositions described in <110>, wherein the content of water in the composition is preferably 10 mass % or more, more preferably 30 mass % or more, and further preferably 50 mass % or more; and preferably 90 mass % or less, and more preferably 70 mass % or less.
<112>
The dispersant composition for hydraulic compositions described in <110> or <111>, wherein the content of component (A) in the composition is preferably 1 mass % or more, more preferably 4 mass % or more, and further preferably 7 mass % or more; and preferably 50 mass % or less, more preferably 32 mass % or less, and further preferably 27 mass % or less.
<113>
The dispersant composition for hydraulic compositions described in any of <110> to <112>, wherein the content of component (B) in the composition is preferably 1 mass % or more, more preferably 4 mass % or more, and further preferably 7 mass % or more; and preferably 60 mass % or less, more preferably 50 mass % or less, and further preferably 32 mass % or less.
<114>
The dispersant composition for hydraulic compositions described in any of <110> to <113>, wherein the total content of components (A) and (B) in the composition is preferably 10 mass % or more, more preferably 20 mass % or more, and further preferably 30 mass % or more; and preferably 90 mass % or less, more preferably 70 mass % or less, and further preferably 50 mass % or less.
<115>
A hydraulic composition for centrifugal molding, containing the dispersant composition for hydraulic compositions described in any of the above <1> to <114>, a hydraulic powder, an aggregate, and water, wherein a ratio of water/hydraulic powder is 10 mass % or more and 25 mass % or less.
<116>
A hydraulic composition for centrifugal molding, containing component (A), component (B), a hydraulic powder, an aggregate and water, wherein a ratio of water/hydraulic powder is 10 mass % or more and 25 mass % or less.
<117>
The hydraulic composition for centrifugal molding described in <115> or <116>, wherein a ratio of water/hydraulic powder is 10 mass % or more, preferably 12 mass % or more, more preferably 15 mass % or more; and 25 mass % or less, preferably 20 mass % or less.

<118>

The hydraulic composition for centrifugal molding described in any of <115> to <117>, wherein the composition contains component (A) in an amount of preferably 0.001 parts by mass or more, more preferably 0.01 parts by mass or more, further preferably 0.1 parts by mass or more, further more preferably 0.4 parts by mass or more, and further more preferably 0.6 parts by mass or more; and preferably 10 parts by mass or less, more preferably 5 parts by mass or less, further preferably 3 parts by mass or less, further preferably 2 parts by mass or less, and further more preferably 1 part by mass or less, relative to 100 parts by mass of the hydraulic powder.

<119>

The hydraulic composition for centrifugal molding described in any of <115> to <118>, wherein the composition contains component (B) in an amount of preferably 0.0001 parts by mass or more, more preferably 0.001 parts by mass or more, further preferably 0.01 parts by mass or more, further more preferably 0.03 parts by mass or more, and further more preferably 0.05 parts by mass or more; and preferably 10 parts by mass or less, more preferably 5 parts by mass or less, further preferably 1 part by mass or less, further preferably 0.5 parts by mass or less, and further more preferably 0.35 parts by mass or less, relative to 100 parts by mass of the hydraulic powder.

<120>

The hydraulic composition for centrifugal molding described in any of <115> to <119>, wherein the composition contains components (A) and (B) in total in an amount of preferably 0.1 parts by mass or more, more preferably 0.5 parts by mass or more, and further preferably 0.7 parts by mass or more; and preferably 10 parts by mass or less, more preferably 5 parts by mass or less, and further preferably 2 parts by mass or less, relative to 100 parts by mass of the hydraulic powder.

<121>

A hydraulic composition for steam curing, containing the dispersant composition for hydraulic compositions described in any of <1> to <114>, a hydraulic powder, an aggregate and water, wherein a ratio of water/hydraulic powder is 10 mass % or more and 53 mass % or less, and a total content of (A) and (B) is 0.25 parts by mass or more and 10 parts by mass or less relative to 100 parts by mass of the hydraulic powder.

<122>

A hydraulic composition for steam curing, containing component (A), component (B), a hydraulic powder, an aggregate and water, wherein a ratio of water/hydraulic powder is 10 mass % or more and 53 mass % or less; a content ratio of component (B) relative to a total content of components (A) and (B) is 1 mass % or more, preferably 3 mass % or more, more preferably 5 mass % or more, further preferably 10 mass % or more, and further more preferably 20 mass %; and 60 mass % or less, preferably 50 mass % or less, more preferably 40 mass % or less, further preferably 30 mass % or less; and the total content of components (A) and (B) is 0.25 parts by mass or more and 10 parts by mass or less relative to 100 parts by mass of the hydraulic powder.

<123>

The hydraulic composition for steam curing described in <121> or <122>, wherein a ratio of water/hydraulic powder is preferably 20 mass % or more, more preferably 25 mass % or more, and further preferably 30 mass % or more; and preferably 45 mass % or less, more preferably 40 mass % or less, and further preferably 35 mass % or less.

<124>

The hydraulic composition for steam curing described in any of <121> to <123>, wherein the composition contains component (A) in an amount of preferably 0.15 parts by mass or more, more preferably 0.2 parts by mass or more, further preferably 0.3 parts by mass or more, and further more preferably 0.5 parts by mass or more; and preferably 9.9 parts by mass or less, more preferably 5 parts by mass or less, further preferably 2 parts by mass or less, and further more preferably 1 part by mass or less, relative to 100 parts by mass of the hydraulic powder.

<125>

The hydraulic composition for steam curing described in any of <121> to <124>, wherein the composition contains component (B) in an amount of preferably 0.0025 parts by mass or more, more preferably 0.01 parts by mass or more, further preferably 0.03 parts by mass or more, and further more preferably 0.05 parts by mass or more; and preferably 6 parts by mass or less, more preferably 2 parts by mass or less, further preferably 1 part by mass or less, further more preferably 0.5 parts by mass or less, and further more preferably 0.2 parts by mass or less, relative to 100 parts by mass of the hydraulic powder.

<126>

The hydraulic composition for steam curing described in any of <121> to <125>, wherein the composition contains components (A) and (B) in total in an amount of 0.25 parts by mass or more, more preferably 0.4 parts by mass or more, and further preferably 0.6 parts by mass or more; and 10 parts by mass or less, preferably 5 parts by mass or less, and more preferably 2 parts by mass or less relative to 100 parts by mass of the hydraulic powder.

<127>

The hydraulic composition described in any of <115> to <126>, wherein the hydraulic powder is a hydraulic powder selected from cement and gypsum; preferably cement; more preferably cement selected from ordinary portland cement, belite cement, moderate heat cement, early strength cement, ultra early strength cement, and sulfate resisting cement; or cement prepared by adding, to cement, a powder having a pozzolanic action and/or potential hydraulicity, or cement prepared by adding a calcium carbonate powder to cement.

The hydraulic composition used herein signifies a hydraulic composition for centrifugal molding or a hydraulic composition for steam curing, and the same applies hereinafter.

<128>

The hydraulic composition described in any of <115> to <127>, containing component (C), a polycarboxylic acid-based copolymer.

<129>

The hydraulic composition described in <128>, wherein the composition contains component (C) in an amount of preferably 0.01 parts by mass or more, and more preferably 0.05 parts by mass or more; and preferably 2 parts by mass or less, more preferably 1 part by mass or less, further preferably 0.5 parts by mass or less, further more preferably 0.3 parts by mass or less relative to 100 parts by mass of the hydraulic powder.

<130>

The hydraulic composition described in <128> or <129>, wherein the composition contains component (C) in an amount of preferably 0.001 parts by mass or more, and more preferably 0.01 parts by mass or more; and preferably 0.5 parts by mass or less, more preferably 0.2 parts by mass or less, and further preferably 0.1 parts by mass or less relative to 100 parts by mass of the hydraulic powder.

<131>
The hydraulic composition described in any of <128> to <130>, wherein a mass ratio of component (C) to component (A), (C)/(A), is preferably 0/100 or more, more preferably over 0/100, further preferably 0.05/99.95, further more preferably 0.1/99.9 or more, and further more preferably 1/99 or more; and preferably 50/50 or less, more preferably 30/70 or less, and further preferably 10/90 or less.

<132>
The hydraulic composition described in any of <115> to <131>, wherein the aggregate is selected from a fine aggregate and a coarse aggregate.

<133>
The hydraulic composition described in <132>, wherein the fine aggregate is a fine aggregate defined in No. 2311 of JIS A0203-2014, and further a fine aggregate selected from river sand, land sand, pit sand, sea sand, lime sand, silica sand and crushed sand thereof, blast furnace slag fine aggregate, ferronickel slag fine aggregate, light-weight fine aggregate (artificial and natural), and recycled fine aggregate.

<134>
The hydraulic composition described in <132> or <133>, wherein the coarse aggregate is a coarse aggregate defined in No. 2312 of JIS A0203-2014, and further a coarse aggregate selected from river gravel, land gravel, pit gravel, sea gravel, lime gravel, crushed stone thereof, blast furnace slag coarse aggregate, ferronickel slag coarse aggregate, light-weight coarse aggregate (artificial and natural), and recycled coarse aggregate.

<135>
The hydraulic composition described in any of <115> to <134>, wherein the hydraulic composition is concrete, and the amount to be used of the coarse aggregate is, in terms of the bulk volume, preferably 50% or more, more preferably 55% or more, and further preferably 60% or more; and preferably 100% or less, more preferably 90% or less, and further preferably 80% or less.

<136>
The hydraulic composition described in <135>, wherein the amount to be used of fine aggregate is preferably 500 kg/m$^3$ or more, more preferably 600 kg/m$^3$ or more, and further preferably 700 kg/m$^3$; and preferably 1000 kg/m$^3$ or less, and more preferably 900 kg/m$^3$.

<137>
The hydraulic composition described in <135> or <136>, wherein the composition is concrete using cement.

<138>
The hydraulic composition described in any of <115> to <133>, wherein the hydraulic composition is mortar, and the amount to be used of fine aggregate is preferably 800 kg/m$^3$ or more, more preferably 900 kg/m$^3$ or more, and further preferably 1000 kg/m$^3$ or more; and preferably 2000 kg/m$^3$ or less, more preferably 1800 kg/m$^3$ or less, and further preferably 1700 kg/m$^3$ or less.

<139>
The hydraulic composition described in any of <115> to <138>, wherein the composition is for self-leveling, refractories, plaster, light-weight or heavy-weight concrete, AE, repairing, prepacking, tremies, foundation improvement, grout and cold weather.

<140>
The hydraulic composition described in any of <115> to <139>, wherein the composition contains one or more components selected from an AE agent, a retarder, a foaming agent, a viscous agent, a blowing agent, a waterproofing agent, and a fluidizing agent (excluding those corresponding to component (A), component (B) or component (C)).

<141>
The hydraulic composition described in any of <115> to <140>, wherein the composition contains one or more selected from an early strengthening agent and a chelating agent.

<142>
The hydraulic composition described in any of <115> to <141>, wherein the content of the chelating agent is 0.1 parts by mass or less relative to 100 parts by mass of the hydraulic powder.

The matters described for the dispersant composition for hydraulic compositions of the above <1> to <114> are applicable to these hydraulic compositions.

<143>
A method for producing a dispersant composition for hydraulic compositions, which includes mixing components (A) and (B).

The dispersant composition for hydraulic compositions used herein signifies a dispersant composition for hydraulic compositions for centrifugal molding or a dispersant composition for hydraulic compositions for steam curing, and the same applies hereinafter.

<144>
A method for producing a dispersant composition for hydraulic compositions, which includes mixing components (A), (B) and (C).

<145>
The method for producing a dispersant composition for hydraulic compositions described in <144>, wherein the dispersant composition for hydraulic compositions contains water, and a mass ratio of component (C) to component (A), (C)/(A), is preferably 0/100 or more, more preferably over 0/100, further preferably 0.05/99.95 or more, further more preferably 0.1/99.9 or more, and further more preferably 1/99 or more; and preferably 50/50 or less, more preferably 30/70 or less, and further preferably 10/90 or less.

<146>
The method for producing a dispersant composition for hydraulic compositions described in <144> or <145>, wherein the dispersant composition for hydraulic compositions contains water, and components (A) and (C) are used so that a total content of components (A) and (C) in the composition is preferably 1 mass % or more, more preferably 4 mass % or more, and further preferably 7 mass % or more; and preferably 50 mass % or less, more preferably 32 mass % or less, and further preferably 27 mass % or less.

<147>
The method for producing a dispersant composition for hydraulic compositions described in <143> to <146>, wherein the dispersant composition for hydraulic compositions described in any of <1> to <114> is produced.

<148>
The method for producing a dispersant composition for hydraulic compositions described in <143> to <147>, wherein a dispersant composition for hydraulic compositions containing component (A), component (B) and water is produced.

<149>
The method for producing a dispersant composition for hydraulic compositions described in <143> to <148>, wherein the method includes mixing an aqueous solution of component (A) heated to a freezing point or higher of component (B), and component (B) by a stirrer.

<150>

The method for producing a dispersant composition for hydraulic compositions described in <143> to <148>, wherein the method includes dissolving components (A) and (B) in water, respectively, and mixing an aqueous solution of component (A) and an aqueous solution of component (B).

<151>

The method for producing a dispersant composition for hydraulic compositions described in <143> to <150>, wherein the dispersant composition for hydraulic compositions is a dispersant composition for hydraulic compositions for centrifugal molding.

<152>

The method for producing a dispersant composition for hydraulic compositions described in <143> to <150>, wherein the dispersant composition for hydraulic compositions is a dispersant composition for hydraulic compositions for steam curing, and components (A) and (B) are mixed so that a ratio of a mixing amount of (B) relative to a total mixing amount of (A) and (B) is 1 mass % or more, preferably 3 mass % or more, more preferably 5 mass % or more, further preferably 10 mass % or more, and further more preferably 20 mass %; and 60 mass % or less, preferably 50 mass % or less, more preferably 40 mass % or less, and further preferably 30 mass % or less.

The matters described for the dispersant composition for hydraulic compositions of the above <1> to <114> and the hydraulic composition of the above <115> to <142> are appropriately applicable to these methods for producing a dispersant composition for hydraulic compositions.

<153>

A method for producing a hydraulic composition, which includes mixing a hydraulic powder, an aggregate, water, component (A) and component (B).

The hydraulic composition used herein signifies a hydraulic composition for centrifugal molding or a hydraulic composition for steam curing, and the same applies hereinafter.

<154>

A method for producing a hydraulic composition, which includes mixing a hydraulic powder, an aggregate, water, component (A), component (B), and component (C).

<155>

The method for producing a hydraulic composition described in <154>, wherein component (C) is mixed in an amount of preferably 0.001 parts by mass or more, more preferably 0.01 parts by mass or more, and further preferably 0.05 parts by mass or more; and preferably 2 parts by mass or less, more preferably 1 part by mass or less, further preferably 0.5 parts by mass or less, and further more preferably 0.3 parts by mass or less relative to 100 parts by mass of the hydraulic powder.

<156>

The method for producing a hydraulic composition described in <154> or <155>, wherein a mass ratio of component (C) to component (A), (C)/(A), is preferably 0/100 or more, more preferably over 0/100, further preferably 0.05/99.95 or more, further more preferably 0.1/99.9 or more, and further more preferably 1/99 or more; and preferably 50/50 or less, more preferably 30/70 or less, and further preferably 10/90 or less.

<157>

The method for producing a hydraulic composition described in any of <153> to <156>, wherein component (A) is mixed, relative to 100 parts by mass of the hydraulic powder, in an amount selected from 0.001 parts by mass or more, 0.01 parts by mass or more, 0.1 parts by mass or more, 0.15 parts by mass or more, 0.2 parts by mass or more, 0.3 parts by mass or more, 0.4 parts by mass or more, 0.47 parts by mass or more, 0.5 parts by mass or more, or 0.6 parts by mass or more; and 10 parts by mass or less, 9.9 parts by mass or less, 5 parts by mass or less, 2 parts by mass or less, 1 part by mass or less, 0.9 parts by mass or less, 0.6 parts by mass or less, or 0.52 parts by mass or less.

<158>

The method for producing a hydraulic composition described in any of <153> to <157>, wherein component (B) is mixed, relative to 100 parts by mass of the hydraulic powder, in an amount selected from 0.0001 parts by mass or more, 0.001 parts by mass or more, 0.0025 parts by mass or more, 0.01 parts by mass or more, 0.03 parts by mass or more, 0.05 parts by mass or more, or 0.06 parts by mass or more; and 10 parts by mass or less, 6 parts by mass or less, 5 parts by mass or less, 2 parts by mass or less, 1 part by mass or less, further preferably 0.5 parts by mass or less, further more preferably 0.35 parts by mass or less, or 0.2 parts by mass or less.

<159>

The method for producing a hydraulic composition described in any of <153> to <158>, wherein components (A) and (B) are mixed in total, relative to 100 parts by mass of the hydraulic powder, in an amount of preferably 0.1 parts by mass or more, more preferably 0.5 parts by mass or more, and further preferably 0.7 parts by mass or more; and preferably 10 parts by mass or less, more preferably 5 parts by mass or less, and further preferably 2 parts by mass or less.

<160>

The method for producing a hydraulic composition described in any of <153> to <159>, wherein the method includes mixing components (A) and (B) with water in advance, and mixing with a hydraulic powder.

<161>

The method for producing a hydraulic composition described in any of <153> to <160>, wherein the method includes mixing a hydraulic powder and the dispersant composition for hydraulic compositions described in any of <1> to <114>.

<162>

The method for producing a hydraulic composition described in <161>, wherein the dispersant composition for hydraulic compositions is in the form of a liquid or a solid.

<163>

The method for producing a hydraulic composition described in <161> or <162>, wherein the dispersant composition for hydraulic compositions is a water-containing liquid.

<164>

The method for producing a hydraulic composition described in any of <161> to <163>, wherein the dispersant composition for hydraulic compositions is mixed, relative to 100 parts by mass of the hydraulic powder, in an amount of preferably 0.1 parts by mass or more, more preferably 0.2 parts by mass or more, further preferably 0.3 parts by mass or more, and further more preferably 0.5 parts by mass or more; and preferably 2 parts by mass or less, more preferably 1.5 parts by mass or less, and further preferably 1.2 parts by mass or less.

<165>

The method for producing a hydraulic composition described in any of <153> to <164>, wherein the obtained hydraulic composition is further filled into a mold, cured and hardened.

<166>

The method for producing a hydraulic composition described in <165>, wherein the mold is a mold for a building or a mold for a concrete product.

<167>

The method for producing a hydraulic composition described in <165> or <166>, wherein the hydraulic composition is filled into a mold by a method for pouring the hydraulic composition directly from a mixer or a method for sending the hydraulic composition by pressure by means of a pump and introducing it into a mold.

<168>

The method for producing a hydraulic composition described in any of <165> to <167>, wherein the hydraulic composition is cured by heating, and further the hydraulic composition is kept at a temperature of 40° C. or higher and 90° C. or lower for heat-curing.

<169>

The method for producing a hydraulic composition described in any of <153> to <168>, wherein the hydraulic composition is a hydraulic composition for centrifugal molding, and component (A) is mixed, relative to 100 parts by mass of the hydraulic powder, in an amount of preferably 0.001 parts by mass or more, more preferably 0.01 parts by mass or more, further preferably 0.1 parts by mass or more, further more preferably 0.4 parts by mass or more, and further more preferably 0.6 parts by mass or more; and preferably 10 parts by mass or less, more preferably 5 parts by mass or less, further preferably 3 parts by mass or less, further preferably 2 parts by mass or less, and further more preferably 1 part by mass or less.

<170>

The method for producing a hydraulic composition described in any of <153> to <169>, wherein the hydraulic composition is a hydraulic composition for centrifugal molding, and component (B) is mixed, relative to 100 parts by mass of the hydraulic powder, in an amount of preferably 0.0001 parts by mass or more, more preferably 0.001 parts by mass or more, further preferably 0.01 parts by mass or more, further more preferably 0.03 parts by mass or more, and further more preferably 0.05 parts by mass or more; and preferably 10 parts by mass or less, more preferably 5 parts by mass or less, further preferably 1 part by mass or less, further preferably 0.5 parts by mass or less, and further more preferably 0.35 parts by mass or less.

<171>

The method for producing a hydraulic composition described in any of <153> to <170>, wherein the hydraulic composition is a hydraulic composition for centrifugal molding, a ratio of water/hydraulic powder in the hydraulic composition is 10 mass % or more and 25 mass % or less, and components (A) and (B) are mixed in total, relative to 100 parts by mass of the hydraulic powder, in an amount of preferably 0.1 parts by mass or more, more preferably 0.5 parts by mass or more, and further preferably 0.7 parts by mass or more; and preferably 10 parts by mass or less, more preferably 5 parts by mass or less, and further preferably 2 parts by mass or less.

<172>

The method for producing a hydraulic composition described in any of <153> to <168>, wherein the hydraulic composition is a hydraulic composition for steam curing, a ratio of water/hydraulic powder in the hydraulic composition is 10 mass % or more and 53 mass % or less, and components (A) and (B) are mixed so that a mixing amount of (B) relative to a total mixing amount of (A) and (B) is 1 mass % or more, preferably 3 mass % or more, more preferably 5 mass % or more, further preferably 10 mass % or more, and further more preferably 20 mass %; and 60 mass % or less, preferably 50 mass % or less, more preferably 40 mass % or less, and further preferably 30 mass % or less.

<173>

The method for producing a hydraulic composition described in any of <153> to <168> and <172>, wherein the hydraulic composition is a hydraulic composition for steam curing, a ratio of water/hydraulic powder in the hydraulic composition is 10 mass % or more and 53 mass % or less, and component (A) is mixed, relative to 100 parts by mass of the hydraulic powder, in an amount of preferably 0.15 parts by mass or more, more preferably 0.2 parts by mass or more, further preferably 0.3 parts by mass or more, and further more preferably 0.5 parts by mass or more; and preferably 9.9 parts by mass or less, more preferably 5 parts by mass or less, further preferably 2 parts by mass or less, and further more preferably 1 part by mass or less.

<174>

The method for producing a hydraulic composition described in any of <153> to <168>, <172> and <173>, wherein the hydraulic composition is a hydraulic composition for steam curing, a ratio of water/hydraulic powder in the hydraulic composition is 10 mass % or more and 53 mass % or less, and component (B) is mixed, relative to 100 parts by mass of the hydraulic powder, in an amount of preferably 0.0025 parts by mass or more, more preferably 0.01 parts by mass or more, further preferably 0.03 parts by mass or more, and further more preferably 0.05 parts by mass or more; and preferably 6 parts by mass or less, more preferably 2 parts by mass or less, further preferably 1 part by mass or less, further more preferably 0.5 parts by mass or less, and further more preferably 0.2 parts by mass or less.

<175>

The method for producing a hydraulic composition described in any of <153> to <168> and <171> to <174>, wherein the hydraulic composition is a hydraulic composition for steam curing, a ratio of water/hydraulic powder in the hydraulic composition is 10 mass % or more and 53 mass % or less, and components (A) and (B) are mixed in total, relative to 100 parts by mass of the hydraulic powder, in an amount of 0.25 parts by mass or more, preferably 0.4 parts by mass or more, and more preferably 0.6 parts by mass or more; and 10 parts by mass or less, preferably 5 parts by mass or less, and more preferably 2 parts by mass or less.

The matters described for the dispersant composition for hydraulic compositions of the above <1> to <114>, the hydraulic composition of the above <115> to <142>, and the method for producing a dispersant composition for hydraulic compositions of the above <143> to <152> are appropriately applicable to these methods for producing a hydraulic composition.

<176>

A method for producing a hardened product of a hydraulic composition, which includes the following steps.

Step 1: mixing water, a hydraulic powder, an aggregate and the dispersant composition for hydraulic compositions for centrifugal molding described in any of those of <1> to <114> describing the dispersant compositions for hydraulic compositions for centrifugal molding to prepare a hydraulic composition having a water/hydraulic powder ratio of 10 mass % or more and 25 mass % or less.

Step 2: filling the hydraulic composition obtained in step 1 into a mold.

Step 3: compacting the hydraulic composition filled into the mold in step 2 by applying a centrifugal force.

Step 4: setting, in the mold, the hydraulic composition compacted in step 3.

<177>
A method for producing a hardened product of a hydraulic composition, which includes the following steps.
Step 1: mixing water, a hydraulic powder, component (A) component (B) and an aggregate to prepare a hydraulic composition for centrifugal molding.
Step 2: filling the hydraulic composition obtained in step 1 into a mold.
Step 3: compacting the hydraulic composition filled into the mold in step 2 by applying a centrifugal force.
Step 4: setting, in the mold, the hydraulic composition compacted in step 3.

<178>
A method for producing a hardened product of a hydraulic composition, which includes the following steps.
Step 1: mixing water, a hydraulic powder, component (A), component (B), component (C) and an aggregate to prepare a hydraulic composition having a water/hydraulic powder ratio of 10 mass % or more and 25 mass % or less.
Step 2: filling the hydraulic composition obtained in step 1 into a mold.
Step 3: compacting the hydraulic composition filled into the mold in step 2 by applying a centrifugal force.
Step 4: setting, in the mold, the hydraulic composition compacted in step 3.

<179>
The method for producing a hardened product of a hydraulic composition described in any of <176> to <178>, wherein step 1 is to add, to an aggregate and a hydraulic powder, and mix a mixture containing water and the dispersant composition for hydraulic compositions for centrifugal molding; or a mixture containing water and components (A) and (B).

<180>
The method for producing a hardened product of a hydraulic composition described in any of <176> to <179>, wherein step 1 is a process of preparing a hydraulic composition by mixing a hydraulic powder and an aggregate, adding and kneading a mixture containing water and the dispersant composition for hydraulic compositions for centrifugal molding or a mixture containing water and components (A) and (B).

<181>
The method for producing a hardened product of a hydraulic composition described in any of <176> to <180>, wherein step 1 is to prepare a hydraulic composition having a water/hydraulic powder ratio of 10 mass % or more, preferably 11 mass % or more, more preferably 12 mass % or more, further preferably 15 mass % or more, and further more preferably 17 mass % or more; and 25 mass % or less, preferably 24 mass % or less, more preferably 23 mass % or less, further preferably 22 mass % or less, and further more preferably 20 mass % or less.

<182>
The method for producing a hardened product of a hydraulic composition described in any of <176> to <181>, wherein, in step 3, the centrifugal force is changed at least once for compacting the hydraulic composition, and further the hydraulic composition is compacted by applying gradually changing centrifugal forces.

<183>
The method for producing a hardened product of a hydraulic composition described in any of <176> to <182>, wherein, in step 3, the hydraulic composition filled into the mold is compacted by a centrifugal force of 0.5 G or more.

<184>
The method for producing a hardened product of a hydraulic composition described in any of <176> to <183>, wherein, in step 3, the centrifugal forces for centrifugal molding is preferably 0.5 G or more and 30 G or less, more preferably 25 G or less.

<185>
The method for producing a hardened product of a hydraulic composition described in any of <176> to <184>, wherein, in step 3, the centrifugal force is maintained within the range of 15 G or more and 30 G or less, further 25 G or less for 1 minute or more.

<186>
The method for producing a hardened product of a hydraulic composition described in any of <176> to <185>, wherein, in step 3, the hydraulic composition is compacted by applying a centrifugal force of 0.5 G or more and 30 G or less for preferably 5 minutes or more, more preferably 7 minutes of more, and further preferably 9 minutes or more; and preferably 40 minutes or less.

<187>
The method for producing a hardened product of a hydraulic composition described in any of <176> to <186>, wherein, in step 3, the compaction with a centrifugal force maintained at 20 G or more is carried out for preferably 1 minute or more, more preferably 3 minutes or more, and further preferably 5 minutes or more; and preferably 15 minutes or less.

<188>
The method for producing a hardened product of a hydraulic composition described in any of <176> to <187>, wherein, in step 3, the compaction with a centrifugal force is carried out by a method of increasing in stages the centrifugal force G.

<189>
The method for producing a hardened product of a hydraulic composition described in <188>, wherein the hydraulic composition is compacted in step 3 under the conditions: (1) a first speed as the first stage wherein a centrifugal force of 0.5 G or more and less than 2 G is applied for over 0 minute and 15 minutes or less; (2) a second speed as the second stage wherein a centrifugal force of 2G or more and less than 5 G is applied for over 0 minute and 15 minutes or less; (3) a third speed as the third stage wherein a centrifugal force of 5G or more and less than 10 G is applied for over 0 minute and 15 minutes or less; (4) a fourth speed as the fourth stage wherein a centrifugal force of 10 G or more and less than 20 G is applied for over 0 minute and 15 minutes or less; and (5) a fifth speed as the fifth stage wherein a centrifugal force of 20 G or more and 30 G or less is applied for over 0 minute and 15 minutes or less.

<190>
The method for producing a hardened product of a hydraulic composition described in any of <176> to <189>, wherein, in step 4, the hydraulic composition obtained in step 3 is subjected to atmospheric curing for 3 to 4 hours after kneading.

<191>
The method for producing a hardened product of a hydraulic composition described in any of <176> to <190>, which includes the following step 5 after step 4. Step 5: steam curing, in the mold, the hydraulic composition set in step 4.

<192>
The method for producing a hardened product of a hydraulic composition described in <191>, wherein, in step 5, steam curing is carried out at 40° C. or higher, and preferably 60° C. or higher; and 90° C. or lower.
<193>
The method for producing a hardened product of a hydraulic composition described in <191> or <192>, wherein, in step 5, precuring is conducted to allow to stand at 10° C. or higher and 40° C. or lower for 1 hour or more and 4 hours or less, and then steam curing is conducted at 60° C. or higher and 90° C. or lower.
<194>
The method for producing a hardened product of a hydraulic composition described in any of <191> to <193>, which includes the following step 6 after step 5. Step 6: cooling the hydraulic composition after step 5 and demolding from the mold.
<195>
The method for producing a hardened product of a hydraulic composition described in <194>, wherein the method includes step 6, and steps 5 and 6 are conducted in succession under the control of a series of temperatures.
<196>
The method for producing a hardened product of a hydraulic composition described in <194> or <195>, wherein, in step 5, the ambient temperature for the mold is increased to 60° C. or higher and 85° C. or lower by a rate of temperature rise of 10° C. or higher and 30° C. or lower per hour, the increased temperature is kept for 2 hours or more and 8 hours or less, and then, in step 6, the temperature is decreased to room temperature, for example, 20° C. by a rate of temperature drop of 5° C. or higher and 20° C. or lower per hour, and the molded body is demolded.
<197>
The method for producing a hardened product of a hydraulic composition described in any of <194> to <196>, wherein, in step 5, the mold having the hydraulic composition filled therein is allowed to stand at an ambient temperature of 10° C. or higher and 30° C. or lower for 3 hours, the ambient temperature is increased to 70° C. or higher and 90'C or lower by a rate of temperature rise of 20° C. per hour, the increased temperature of 70° C. or higher and 90° C. or lower is kept for 2 hours or more and 6 hours or less, the ambient temperature is decreased to room temperature, for example, 20° C. by a rate of temperature drop of 10° C. per hour, the mold is allowed to stand at the temperature for 20 hours or more and 30 hours or less, and then the molded body is demolded.
<198>
The method for producing a hardened product of a hydraulic composition described in any of <194> to <197>, wherein autoclave curing is conducted at about 180° C.
<199>
The method for producing a hardened product of a hydraulic composition described in any of <194> to <198>, wherein the method includes steps 1 to 6 and the period from the start of preparation of the hydraulic composition to the demolding in step 6 is 8 hours or more and 30 hours or less.
<200>
The method for producing a hardened product of a hydraulic composition described in any of <194> to <199>, which includes the following step 7 after step 6. Step 7: curing the hardened product of a hydraulic composition obtained in step 6 at ordinary temperature and normal pressure.
<201>
The method for producing a hardened product of a hydraulic composition described in <200>, wherein, in step 7, the hardened product of a hydraulic composition obtained in step 6 is stored at 20° C. under an atmospheric pressure.
<202>
The method for producing a hardened product of a hydraulic composition described in any of <176> to <201>, wherein the obtained hardened product of a hydraulic composition is a centrifugally molded concrete product, further a centrifugally molded concrete product selected from piles, poles, and Hume pipes.
<203>
A method for producing a hardened product of a hydraulic composition, which includes the following steps.
Step 1': mixing water, a hydraulic powder, an aggregate and a dispersant composition for hydraulic compositions for steam curing described in any of those of <2> to <114> describing the dispersant compositions for hydraulic compositions for steam curing to prepare a hydraulic composition having a water/hydraulic powder ratio of 10 mass % or more and 53 mass % or less, wherein the dispersant composition for hydraulic compositions for steam curing is mixed so that a ratio of a mixing amount of (B) is 1 mass % or more and 60 mass % or less relative to a total mixing amount of (A) and (B) and the total mixing amount of (A) and (B) is 0.25 parts by mass or more and 10 parts by mass or less relative to 100 parts by mass of the hydraulic powder.
Step 2': filling the hydraulic composition obtained in step 1' into a mold.
Step 5': steam curing, in the mold, the hydraulic composition filled into the mold in step 2'.
<204>
A method for producing a hardened product of a hydraulic composition, which includes the following steps.
Step 1': mixing water, a hydraulic powder, component (A), component (B) and an aggregate to prepare a hydraulic composition for steam curing having a water/hydraulic powder ratio of 10 mass % or more and 53 mass % or less, wherein (A) and (B) are mixed so that a ratio of a mixing amount of (B) is 1 mass % or more and 60 mass % or less relative to a total mixing amount of (A) and (B) and the total mixing amount of (A) and (B) is 0.25 parts by mass or more and 10 parts by mass or less relative to 100 parts by mass of the hydraulic powder.
Step 2': filling the hydraulic composition obtained in step 1' into a mold.
Step 5': steam curing, in the mold, the hydraulic composition filled into the mold in step 2'.
<205>
A method for producing a hardened product of a hydraulic composition, which includes the following steps.
Step 1': mixing water, a hydraulic powder, component (A), component (B), component (C) and an aggregate to prepare a hydraulic composition having a water/hydraulic powder ratio of 10 mass % or more and 53 mass % or less, wherein (A) and (B) are mixed so that a ratio of a mixing amount of (B) is 1 mass % or more and 60 mass % or less relative to a total mixing amount of (A) and (B) and the total amount of (A) and (B) is 0.25 parts by mass or more and 10 parts by mass or less relative to 100 parts by mass of the hydraulic powder.
Step 2': filling the hydraulic composition obtained in step 1' into a mold
Step 5': steam curing, in the mold, the hydraulic composition filled into the mold in step 2'.
<206>
The method for producing a hardened product of a hydraulic composition described in any of <203> to <205>, wherein, in step 1', a mixture containing water and the dispersant composition for hydraulic compositions for steam curing or a mixture containing water and components (A) and (B) is added to and mixed with an aggregate and a hydraulic powder.

<207>

The method for producing a hardened product of a hydraulic composition described in any of <203> to <206>, wherein, in step 1', the hydraulic composition is prepared by mixing a hydraulic powder and an aggregate, adding and kneading a mixture containing water and the dispersant composition for hydraulic compositions for steam curing or a mixture containing water and components (A) and (B).

<208>

The method for producing a hardened product of a hydraulic composition described in any of <203> to <207>, wherein, in step 1', the hydraulic composition is prepared so that a water/hydraulic powder ratio is 10 mass % or more, preferably 18 mass % or more, preferably 20 mass % or more, more preferably 25 mass % or more, and further preferably 30 mass % or more; and 53 mass % or less, preferably 45 mass % or less, more preferably 40 mass % or less, and further preferably 35 mass % or less.

<209>

The method for producing a hardened product of a hydraulic composition described in any of <203> to <208>, wherein, in step 5', steam curing is carried out at 40° C., and preferably 60° C. or higher, and 90° C. or lower.

<210>

The method for producing a hardened product of a hydraulic composition described in any of <203> to <209>, wherein, in step 5', precuring is conducted to allow to stand at 10° C. or higher and 40° C. or lower for 0.2 hours or more and 4 hours or less, the ambient temperature is increased by a rate of temperature rise of 20° C. or higher and 100° C. or lower per hour, and steam curing is conducted while the increased temperature of 50° C. or higher and 70° C. or lower is kept for 2 hours or more.

<211>

The method for producing a hardened product of a hydraulic composition described in any of <203> to <210>, wherein the ratio of mixing amount of component (B) relative to the total mixing amount of components (A) and (B) in step 1' is 3 mass % or more and 7 mass % or less; and the precuring of steam curing in step 5' is conducted at 10° C. or higher and 40° C. or lower for preferably 0.2 hours or more, and more preferably 0.3 hours or more; and preferably 4 hours or less, more preferably 3.5 hours or less, further preferably 2.5 hours or less, and further more preferably 0.7 hours or less.

<212>

The method for producing a hardened product of a hydraulic composition described in any of <203> to <210>, wherein the ratio of mixing amount of component (B) relative to the total mixing amount of components (A) and (B) in step 1' is 15 mass % or more and 25 mass % or less; and the precuring of steam curing in step 5' is conducted at 10° C. or higher and 40° C. or lower for preferably 0.2 hours or more, more preferably 0.3 hours or more, further preferably 0.5 hours or more, further more preferably 0.7 or more, and further more preferably 1.5 hours or more; and preferably 4 hours or less, more preferably 3 hours or less, and further preferably 2.5 hours or less.

<213>

The method for producing a hardened product of a hydraulic composition described in any of <203> to <212>, wherein the obtained hardened product of a hydraulic composition is a concrete product selected from a curtain wall, a box culvert and an L-shaped retaining wall.

<214>

The method for producing a hardened product of a hydraulic composition described in any of <203> to <213>, which includes the following step 6' after step 5' Step 6': cooling the hydraulic composition after step 5 and demolding from the mold.

<215>

The method for producing a hardened product of a hydraulic composition described in <214>, wherein the method includes step 6', and steps 5' and 6' are conducted in succession under the control of a series of temperatures.

<216>

The method for producing a hardened product of a hydraulic composition described in <214> or <215>, wherein, in step 5', the ambient temperature for the mold is increased by a rate of temperature rise of 10° C. or higher and 30° C. or lower per hour, the increased temperature is kept for 2 hours or more and 8 hours or less, and then, in step 6', the temperature is decreased to room temperature, for example, 20° C. by a rate of temperature drop of 5° C. or higher and 20° C. or lower per hour, and the molded body is demolded.

<217>

The method for producing a hardened product of a hydraulic composition described in any of <214> to <216>, wherein, in step 5', the mold having the hydraulic composition filled therein is allowed to stand at an ambient temperature of 10° C. or higher and 30° C. or lower for 3 hours, the ambient temperature is increased to 70° C. or higher and 90° C. or lower by a rate of temperature rise of 20° C. per hour, the increased temperature of 70° C. or higher and 90° C. or lower is kept for 2 hours or more and 6 hours or less, the ambient temperature is decreased to room temperature, for example, 20° C. by a rate of temperature drop of 10° C. per hour, the mold is allowed to stand at the temperature for 20 hours or more and 30 hours or less, and then the molded body is demolded.

<218>

The method for producing a hardened product of a hydraulic composition described in any of <214> to <217>, wherein autoclave curing is conducted at about 180° C.

<219>

The method for producing a hardened product of a hydraulic composition described in any of <214> to <218>, which includes the following step 7' after step 6' Step 7': curing the hardened product of a hydraulic composition obtained in step 6' at ordinary temperature and normal pressure.

<220>

The method for producing a hardened product of a hydraulic composition described in <219>, wherein, in step 7', the hardened product obtained in step 6' is stored at 20° C. under an atmospheric pressure.

<221>

The method for producing a hardened product of a hydraulic composition described in any of <176> to <220>, wherein, in step 2 or step 2', a method for filling the hydraulic composition obtained in step 1 or step 1' into a mold is a method for discharging the kneaded hydraulic composition from kneading means, and manually injecting into a mold and leveling.

<222>

The method for producing a hardened product of a hydraulic composition described in any of <176> to <221>, wherein components (A) and (C) are used so that a mass ratio of component (C) and component (A), (C)/(A), is preferably 0/100 or more, more preferably over 0/100, further preferably 0.05/99.95 or more, further more preferably 0.1/99.9 or more, and furthermore preferably 1/99 or more; and preferably 50/50 or less, more preferably 30/70 or less, and further preferably 10/90 or less.

The matters described for the dispersant composition hydraulic compositions of the above <1> to <114>, the hydraulic composition of the above <115> to <142>, the method for producing a dispersant composition for hydraulic compositions of the above <143> to <152>, and the method for producing a hydraulic composition of the above <153> to <175> are appropriately applicable to the method for producing a hardened product of a hydraulic composition.

<223>

Use of a composition containing components (A) and (B), preferably the dispersant composition for hydraulic compositions described in any of the above <1> to <114>, as a dispersant for hydraulic compositions for centrifugal molding.

<224>

Use of a composition, preferably the dispersant composition for hydraulic compositions described in any of the above <1> to <114>, as a dispersant for hydraulic compositions for steam curing, wherein the composition contains components (A) and (B) and a content ratio of (B) relative to a total content of (A) and (B) is 1 mass % or more and 60 mass % or less.

<225>

Use of a composition, as a hydraulic composition for centrifugal molding, wherein the composition contains the dispersant composition for hydraulic compositions described in any of the above <1> to <114>, a hydraulic powder, an aggregate and water, and the a water/hydraulic powder ratio is 10 mass % or more and 25 mass % or less.

<226>

Use of a composition, as a hydraulic composition for centrifugal molding, wherein the composition contains component (A), component (B), a hydraulic powder, an aggregate and water, and a water/hydraulic powder ratio is 10 mass % or more and 25 mass % or less.

<227>

Use of a composition, as a hydraulic composition for steam curing, wherein the composition contains the dispersant composition for hydraulic compositions described in any of the above <1> to <114>, a hydraulic powder, an aggregate and water, and a water/hydraulic powder ratio is 10 mass % or more and 53 mass % or less and a total content of components (A) and (B) is 0.25 parts by mass or more and 10 parts by mass or less relative to 100 parts by mass of the hydraulic powder.

<228>

Use of a composition, as a hydraulic composition for steam curing, wherein the composition contains component (A), component (B), a hydraulic powder, an aggregate and water, a water/hydraulic powder ratio is 10 mass % or more and 53 mass % or less, a content ratio of (B) relative to a total content of (A) and (B) is 1 mass % or more and 60 mass % or less, and the total content of (A) and (B) is 0.25 parts by mass or more and 10 parts by mass or less relative to 100 parts by mass of the hydraulic powder.

The matters described for the dispersant composition for hydraulic compositions of the above <1> to <114>, the hydraulic composition of the above <115> to <142>, the method for producing a dispersant composition for hydraulic compositions of the above <143> to <152>, the method for producing a hydraulic composition of the above <153> to <175>, and the method for producing a hardened product of a hydraulic composition of the above <176> to <222> are appropriately applicable to these uses.

<229>

A composition for use in a dispersant for hydraulic compositions for centrifugal molding, the composition containing components (A) and (B), preferably the dispersant composition for hydraulic compositions described in any of the above <1> to <114>.

<230>

A composition for use in a dispersant for hydraulic compositions for steam curing, the composition containing components (A) and (B), wherein a content ratio of (B) relative to a total content of (A) and (B) is 1 mass % or more and 60 mass % or less, preferably the dispersant composition for hydraulic compositions described in any of the above <1> to <114>.

<231>

A composition for use in a hydraulic composition for centrifugal molding, the composition containing the dispersant composition for hydraulic compositions of the above <1> to <114>, a hydraulic powder, an aggregate and water, wherein a water/hydraulic powder ratio is 10 mass % or more and 25 mass % or less, preferably the hydraulic composition described in any of the above <115> to <142>.

<232>

A composition for use in a hydraulic composition for centrifugal molding, the composition containing component (A), component (B), a hydraulic powder, an aggregate and water, wherein a water/hydraulic powder ratio is 10 mass % or more and 25 mass % or less, preferably the hydraulic composition described in any of <115> to <142>.

<233>

A composition for use in a hydraulic composition for steam curing, the composition containing the dispersant composition for hydraulic compositions of the above <1> to <114>, a hydraulic powder, an aggregate and water, wherein a water/hydraulic powder ratio is 10 mass % or more and 53 mass % or less, and a total content of components (A) and (B) is 0.25 parts by mass or more and 10 parts by mass or less relative to 100 parts by mass of the hydraulic powder, preferably the hydraulic composition described in any of <114> to <142>.

<234>

A composition for use in a hydraulic composition for steam curing, the composition containing component (A), component (B), a hydraulic powder, an aggregate and water, wherein a water/hydraulic powder ratio is 10 mass % or more and 53 mass % or less, a content ratio of (B) relative to a total content of (A) and (B) is 1 mass % or more and 60 mass % or less, and the total content of (A) and (B) is 0.25 parts by mass or more and 10 parts by mass or less relative to 100 parts by mass of the hydraulic powder, preferably the hydraulic composition described in any of <115> to <142>.

The matters described for the dispersant composition for hydraulic compositions of the above <1> to <114>, the hydraulic composition of the above <115> to <142>, the method for producing a dispersant composition for hydraulic compositions of the above <143> to <152>, the method for producing a hydraulic composition of the above <153> to <175>, and the method for producing a hardened product of a hydraulic composition of the above <176> to <222> are appropriately applicable to these compositions.

EXAMPLES

Example 1 and Comparative Example 1

(1) Concrete Formulation

Concrete formulation is shown in Table 1. In Table 1, W/(C+P) is a ratio of water/hydraulic powder.

TABLE 1

| W/(C + P) | Unit amount (kg/m³) | | | | |
|---|---|---|---|---|---|
| (mass %) | W | C | P | S | G |
| 18.7 | 125 | 600 | 65 | 595 | 1100 |

Components in the table are as follows.
W: water from public water supply system in Wakayama
C: early strength portland cement (mixture of two types: early strength portland cement manufactured by Taiheiyo Cement Corporation/early strength portland cement manufactured by Sumitomo Osaka Cement Co., Ltd=1/1, mass ratio), density: 3.14 g/cm³
P: high-strength admixture (gypsum based)
S: fine aggregate, crushed sand
G: coarse aggregate, crushed stone W in Table 1 contains a component selected from components (A) to (C) used in Table 2, and the amounts of these components are very small relative to concrete formulation. Thus, they are incorporated into the amount of W, and then, W/(C+P) was calculated.

Components (A) to (C) in Table 2 are as follows.

[Component (A)]
NSF: sodium salt of a formaldehyde naphthalenesulfonate condensate, weight average molecular weight: 15000
This NSF was prepared based on Example of JP-A 48-11737.

[Component (B)]
AES (30): polyoxyethylene (30) oleyl ether ammonium sulfate
AES (60): polyoxyethylene (60) oleyl ether ammonium sulfate
AE (30): polyoxyethylene (30) oleyl ether
AE (60): polyoxyethylene (60) oleyl ether
Amite (20): polyoxyethylene (20) stearyl amine ether Numbers in parentheses for components (B) indicate an average number of moles of added ethylene oxide (the same applies to the following Examples and Comparative Examples).

[Component (C)]
PCE: copolymer of methacrylic acid/methoxy polyethylene glycol monomethacrylate (average number of moles of added ethylene oxide of 120)=95/5 (molar ratio), weight average molecular weight: 20000

This PCE was prepared based on Production Example 12 of JP-A 8-12397.

(2) Method for Preparing Concrete for Centrifugal Molding

Dispersant compositions containing components (A), (B) and (C) and water were prepared to satisfy their added amounts in Table 2. A dispersant composition was added to water (W) as a material for concrete formulation in Table 1, and kneaded with other materials for concrete formulation by a biaxial pug mill for 4 minutes, thereby preparing concrete for centrifugal molding. The added amount is equal to a mixing amount of each component (the same applies to the following Examples and Comparative Examples).

(3) Moldability 15 kg of concrete for centrifugal molding was placed in a centrifugal molding mold (inner diameter: 20 cm×height: 30 cm), and centrifugally compacted by the first speed of 1 G for 3 minutes, the second speed of 3 G for 3 minutes, the third speed of 9 G for 2 minutes, and the fourth speed of 25 G for 3 minutes. Thereafter, steam curing including pre-steaming at 20° C. for 3 hours; temperature rise of 20° C. per hour; keeping at 70° C. for 6 hours; and then cooling, was conducted.

After being demolded, the hardened product was measured for the thickness (mm) of concrete at 4 positions of each of the upper and lower parts thereof (8 positions in total), and evaluated according to the following standard.

AA: The difference between the maximum value and the minimum value of the thickness at the 8 positions was less than 3 mm A: The difference between the maximum value and the minimum value of the thickness at the 8 positions was 3 mm or more and 5 mm or less (in a state where the paste layer on the inner surface was soft and accumulated in a small amount on the lower part)

C: The difference between the maximum value and the minimum value of the thickness at the 8 positions was over 5 mm (in a state where the shape of the product was not able to be retained due to considerable droop or rock pocket)

(4) Compressive Strength

A compressive area was obtained from an average of thicknesses of the hardened product, which was used for evaluation of moldability. The same hardened product was used to measure a compressive stress thereof 7 days after the kneading in accordance with JIS A 1108. A compressive strength was calculated by the equation, compressive strength=compressive stress/compressive area. The evaluation on compressive strength was not conducted on some of Comparative Examples having "C" for moldability evaluation.

Results thereof are shown in Table 2.

TABLE 2

| | | Component (A) | | Component (B) | | Component (C) | | Total added amount (part by mass) | (B)/[(A) + (B)] (mass %) | Molar ratio of (B)/ naphthalene ring (%) | Compressive strength (N/mm²) | Moldability |
|---|---|---|---|---|---|---|---|---|---|---|---|---|
| | | Type | Added amount (part by mass) | Type | Added amount (part by mass) | Type | Added amount (part by mass) | | | | | |
| Examples | 1-1 | NSF | 0.85 | AES (30) | 0.05 | — | — | 0.90 | 5.6 | 0.85 | 131 | AA |
| | 1-2 | | 0.72 | | 0.08 | — | — | 0.80 | 10.0 | 1.60 | 133 | AA |
| | 1-3 | | 0.66 | | 0.17 | — | — | 0.83 | 20.5 | 3.70 | 133 | AA |
| | 1-4 | | 0.56 | | 0.14 | — | — | 0.70 | 20.0 | 3.59 | 135 | AA |
| | 1-5 | | 0.49 | | 0.21 | — | — | 0.70 | 30.0 | 6.16 | 136 | AA |
| | 1-6 | | 0.45 | | 0.3 | — | — | 0.75 | 40.0 | 9.58 | 134 | AA |

TABLE 2-continued

|  |  | Component (A) | | Component (B) | | Component (C) | | Total added amount (part by mass) | (B)/[(A) + (B)] (mass %) | Molar ratio of (B)/ naphthalene ring (%) | Compressive strength (N/mm$^2$) | Moldability |
|---|---|---|---|---|---|---|---|---|---|---|---|---|
|  |  | Type | Added amount (part by mass) | Type | Added amount (part by mass) | Type | Added amount (part by mass) | | | | | |
|  | 1-7 |  | 0.38 |  | 0.37 | — | — | 0.75 | 49.3 | 14.00 | 131 | AA |
|  | 1-8 |  | 0.49 | AES (60) | 0.21 |  |  | 0.70 | 30.0 | 3.45 | 135 | AA |
|  | 1-9 |  | 0.80 | AE (30) | 0.20 | — | — | 1.0 | 20.0 | 3.81 | 131 | AA |
|  | 1-10 |  | 0.63 | AE (60) | 0.27 | — | — | 0.90 | 30.0 | 3.57 | 132 | AA |
|  | 1-11 |  | 0.56 | Amite (20) | 0.19 | — | — | 0.75 | 25.3 | 7.15 | 132 | AA |
|  | 1-12 |  | 0.38 | AES (30) | 0.12 | PCE | 0.10 | 0.60 | 24.0 | 4.54 | 135 | AA |
|  | 1-13 |  | 0.35 | AES (60) | 0.18 | PCE | 0.07 | 0.60 | 34.0 | 4.15 | 136 | AA |
| Comparative Examples | 1-1 | NSF | 1.5 | — | — | — | — | 1.5 | 0 | — | 65.2 | C (rock pockets) |
|  | 1-2 |  | 2.5 | — | — | — | — | 2.5 | 0 | — | 120 | AA |
|  | 1-3 |  | 3.0 | — | — | — | — | 3.0 | 0 | — | 116 | A |
|  | 1-4 | — | — | — | — | PCE | 0.50 | 0.50 | — | — | not measured | C |
|  | 1-5 | — | — |  |  |  | 1.0 | 1.0 | — | — | not measured | C |
|  | 1-6 | NSF | 0.45 | — | — | PCE | 0.15 | 0.60 | 0 | — | not measured | C (not kneable) |
|  | 1-7 | — | — | AES (30) | 0.15 | — | — | 0.15 | 100 | — | not measured | C |
|  | 1-8 | — | — |  | 0.83 | — | — | 0.83 | 100 | — | not measured | C |

In Table 2, the added amount is an added amount of each component in terms of solid content relative to 100 parts by mass of the total of cement (C) and high strength admixture (P).

Further, in Table 2, the total added amount is an added amount of the total of components (A), (B) and (C) in terms of solid content relative to 100 parts by mass of the total of cement (C) and high strength admixture (P).

Further, in Table 2, (B)/[(A)+(B)] is a ratio (mass %) of a content of component (B) relative to the total content of components (A) and (B) in the dispersant composition (the same applies to the following Examples and Comparative Examples).

Further, in Table 2, a molar ratio of (B)/naphthalene ring is a molar ratio (%) of the total amount of component (B) relative to a naphthalene ring-containing monomer unit in component (A) (the same applies to the following Examples and Comparative Examples).

From results of Table 2, it is understood that combined use of components (A) and (B) of the present invention provides a good centrifugal moldability and an improvement in the strength of the hardened product after centrifugal molding.

Example 2 and Comparative Example 2

(1) Mortar Formulation

Mortar formulation is shown in Table 3.

TABLE 3

| W/C | Unit amount (g/batch) | | |
|---|---|---|---|
| (mass %) | W | C | S |
| 35 | 140 | 400 | 700 |

Components in the table are as follows.
W: water from public water supply system in Wakayama
C: "PCB-40" manufactured by Nghi Son Cement Corporation (Vietnam)
S: fine aggregate (pit sand from Joyo area, particles having a particle size of 3.5 mm or more were removed)

W in Table 3 contains components selected from components (A) and (B) used in Tables 5 and 6, and amounts of these components were very small relative to mortar formulation. Thus, they are incorporated into the amount of W and W/C was calculated.

Components (A) and (B) in Tables 5 and 6 are as follows.
[Component (A)]
 NSF: sodium salt of a formaldehyde naphthalenesulfonate condensate, weight average molecular weight: 15000
 This NSF was prepared based on Example of JP-A 48-11737.
[Component (B)]
 Components (B) shown in Table 4 were used. B'-1 is a comparative compound of component (B), but included in Table 4 for convenience.

(2) Method for Preparing Mortar

Dispersant compositions containing components (A) and (B) and water were prepared to satisfy their added amounts in Tables 5 and 6. Temperatures of raw materials for mortar formulation and the temperature of working environment (room temperature) were both set to 30° C.

Into a mortar mixer (universal mixing stirrer, model: 5DM-03-γ manufactured by Dalton Corporation), a cement (C) and a fine aggregate (S) were fed and dry-mixed for 10 seconds at a low speed rotation (63 rpm) of the mortar mixer, and the mixing water (W) was added. The mixing water (W) contained a dispersant composition and an antifoaming agent. Then, the mixture was subjected to main kneading for 120 seconds at a low speed rotation (63 rpm) of the mortar mixer, so that a mortar was prepared.

As the antifoaming agent, Foamlex 797 (manufactured by Nicca Chemical Co., Ltd.) was added in an amount of 3 mass % relative to component (B).

(3) Fluidity

In accordance with the test method of JIS R 5201, the flow of the prepared mortar was measured. Added amounts of components (A) and (B) were adjusted so that the mortar flow was 180 to 200 mm.

(4) Strength

Mortar obtained by kneading was filled into a mold with an inner diameter of 50 mm×a height of 100 mm, hardened by a production method including steam curing, and the strength of the hardened product of the obtained mortar was tested in accordance with JIS A 1108 "Method of test for compressive strength of concrete."

In obtaining a hardened product, steam curing was conducted after presteaming was conducted for a predetermined period shown in Tables 5 and 6. A presteaming period is a period from addition of mixing water (W) to a mortar mixer at the setting temperature (30° C. for this case) to the start of temperature rise for steam curing. The presteaming was carried out by filling a hydraulic composition into a mold and allowing the mortar-filled mold to stand at the setting temperature (30° C. for this case). The same applies to the following Examples and Comparative Examples.

Steam curing was carried out at a humidity setting of 100% by use of a thermo-hygrostat "PR-3J" manufactured by Espec Corporation.

Temperature rise for steam curing was conducted for 0.5 hours from 30° C. to 70° C., which were setting temperatures for the thermo-hygrostat. Next, steam curing was conducted for 3.5 hours at a constant temperature of 70° C., which was a setting temperature for the thermo-hygrostat. Temperature drop for steam curing was conducted for 0.5 hours from 70° C. to 30° C., which were setting temperatures for the thermo-hygrostat. After the setting temperature of the thermo-hygrostat reached 30° C., the hardened product was demolded and, immediately, the strength thereof was measured.

TABLE 4

| | Component (B) | |
|---|---|---|
| Mark | Type | Carbon No.* |
| B-1 | Polyoxyethylene (7) oleyl ether | 18 |
| B-2 | Polyoxyethylene (9) oleyl ether | 18 |
| B-3 | Polyoxyethylene (13.5) oleyl ether | 18 |

TABLE 4-continued

| | Component (B) | |
|---|---|---|
| Mark | Type | Carbon No.* |
| B-4 | Polyoxyethylene (30) oleyl ether | 18 |
| B-5 | Polyoxyethylene (60) oleyl ether | 18 |
| B-6 | Polyoxyethylene (7) oleyl ether ammonium sulfate | 18 |
| B-7 | Polyoxyethylene (9) oleyl ether ammonium sulfate | 18 |
| B-8 | Polyoxyethylene (13.5) oleyl ether ammonium sulfate | 18 |
| B-9 | Polyoxyethylene (30) oleyl ether ammonium sulfate | 18 |
| B-10 | Polyoxyethylene (60) oleyl ether ammonium sulfate | 18 |
| B-11 | Polyoxyethylene (11) stearyl ether ammonium sulfate | 18 |
| B-12 | Polyoxyethylene (50) stearyl ether ammonium sulfate | 18 |
| B-13 | Polyoxyethylene (20) stearyl amine ether ammonium sulfate | 18 |
| B-14 | Polyoxyethylene (100) stearyl amine ether ammonium sulfate | 18 |
| B-15 | Polyoxyethylene (4) lauryl ether ammonium sulfate | 12 |
| B-16 | Polyoxyethylene (23) lauryl ether ammonium sulfate | 12 |
| B-17 | Polyoxyethylene (5) decyl ether ammonium sulfate | 10 |
| B-18 | Polyoxyethylene (11) 2-ethyl hexyl ether ammonium sulfate | 8 |
| B-19 | Polyoxyethylene (13) distyrenated phenyl ether ammonium sulfate | 22 |
| B-20 | Polyoxyethylene (19) distyrenated phenyl ether ammonium sulfate | 22 |
| B-21 | Polyoxyethylene (30) distyrenated phenyl ether ammonium sulfate | 22 |
| B-22 | Polyoxyethylene (64) distyrenated phenyl ether ammonium sulfate | 22 |
| B-23 | Polyoxyethylene (14) tribenzyl phenyl ether ammonium sulfate | 27 |
| B-24 | Polyoxyethylene (13) distyrenated phenyl ether | 22 |
| B-25 | Polyoxyethylene (19) distyrenated phenyl ether | 22 |
| B-26 | Butyl diglycol | 4 |
| B'-1 | Methyl diglycol | 1 |

*Carbon number: carbon number of $R^{11}$, $R^{21}$, $R^{31}$ or $R^{41}$ in general formulas (B1) to (B4)

TABLE 5

| | | Component (A) | | Component (B) | | (B)/[(A) + (B)] (mass %) | Molar ratio of (B)/ naphthalene ring (%) | Total added amount (part by mass) | Mortar flow (mm) | Curing condition | Pre-steaming time (hr.) | Compressive strength (MPa) | Compressive strength ratio(%) |
|---|---|---|---|---|---|---|---|---|---|---|---|---|---|
| | | Type | Added amount (part by mass) | Type | Added amount (part by mass) | | | | | | | | |
| Examples | 2-1 | NSF | 0.496 | B-1 | 0.124 | 20 | 10.5 | 0.62 | 188 | steam | 2.0 | 16.8 | 130 |
| | 2-2 | NSF | 0.496 | B-2 | 0.124 | 20 | 9.1 | 0.62 | 190 | steam | 2.0 | 19.8 | 153 |
| | 2-3 | NSF | 0.496 | B-3 | 0.124 | 20 | 7.0 | 0.62 | 192 | steam | 2.0 | 20.5 | 159 |
| | 2-4 | NSF | 0.480 | B-4 | 0.120 | 20 | 3.8 | 0.60 | 192 | steam | 2.0 | 16.8 | 130 |
| | 2-5 | NSF | 0.480 | B-5 | 0.120 | 20 | 2.1 | 0.60 | 194 | steam | 2.0 | 15.4 | 119 |
| | 2-6 | NSF | 0.496 | B-6 | 0.124 | 20 | 8.8 | 0.62 | 192 | steam | 2.0 | 24.4 | 189 |
| | 2-7 | NSF | 0.496 | B-7 | 0.124 | 20 | 7.8 | 0.62 | 194 | steam | 2.0 | 28.5 | 221 |
| | 2-8 | NSF | 0.496 | B-8 | 0.124 | 20 | 6.2 | 0.62 | 195 | steam | 2.0 | 27.0 | 209 |
| | 2-9 | NSF | 0.480 | B-9 | 0.120 | 20 | 3.6 | 0.60 | 192 | steam | 2.0 | 24.2 | 188 |
| | 2-10 | NSF | 0.480 | B-10 | 0.120 | 20 | 2.0 | 0.60 | 194 | steam | 2.0 | 22.8 | 177 |
| | 2-11 | NSF | 0.496 | B-11 | 0.124 | 20 | 7.0 | 0.62 | 190 | steam | 2.0 | 27.5 | 213 |
| | 2-12 | NSF | 0.480 | B-12 | 0.120 | 20 | 2.3 | 0.60 | 194 | steam | 2.0 | 23.4 | 181 |
| | 2-13 | NSF | 0.496 | B-13 | 0.124 | 20 | 4.8 | 0.62 | 192 | steam | 2.0 | 27.7 | 215 |
| | 2-14 | NSF | 0.480 | B-14 | 0.120 | 20 | 1.3 | 0.60 | 191 | steam | 2.0 | 24.4 | 189 |
| | 2-15 | NSF | 0.512 | B-15 | 0.128 | 20 | 12.7 | 0.64 | 188 | steam | 2.0 | 21.4 | 166 |
| | 2-16 | NSF | 0.512 | B-16 | 0.128 | 20 | 4.6 | 0.64 | 189 | steam | 2.0 | 25.1 | 195 |
| | 2-17 | NSF | 0.528 | B-17 | 0.132 | 20 | 12.3 | 0.66 | 185 | steam | 2.0 | 19.4 | 150 |
| | 2-18 | NSF | 0.576 | B-18 | 0.144 | 20 | 8.3 | 0.72 | 188 | steam | 2.0 | 15.2 | 118 |
| | 2-19 | NSF | 0.496 | B-19 | 0.124 | 20 | 6.1 | 0.62 | 191 | steam | 2.0 | 28.2 | 219 |
| | 2-20 | NSF | 0.496 | B-20 | 0.124 | 20 | 4.8 | 0.62 | 192 | steam | 2.0 | 28.8 | 223 |
| | 2-21 | NSF | 0.496 | B-21 | 0.124 | 20 | 3.5 | 0.62 | 192 | steam | 2.0 | 30.0 | 233 |
| | 2-22 | NSF | 0.496 | B-22 | 0.124 | 20 | 1.9 | 0.62 | 194 | steam | 2.0 | 26.7 | 207 |
| | 2-23 | NSF | 0.496 | B-23 | 0.124 | 20 | 5.5 | 0.62 | 190 | steam | 2.0 | 28.7 | 222 |
| | 2-24 | NSF | 0.496 | B-24 | 0.124 | 20 | 6.9 | 0.62 | 188 | steam | 2.0 | 21.7 | 168 |
| | 2-25 | NSF | 0.496 | B-25 | 0.124 | 20 | 5.3 | 0.62 | 186 | steam | 2.0 | 21.4 | 166 |
| | 2-26 | NSF | 0.656 | B-26 | 0.164 | 20 | 24.2 | 0.82 | 188 | steam | 2.0 | 13.7 | 106 |

TABLE 5-continued

|  |  | Component (A) | | Component (B) | | (B)/[(A) + (B)] (mass %) | Molar ratio of (B)/ naphthalene ring (%) | Total added amount (part by mass) | Mortar flow (mm) | Curing condition | Pre-steaming time (hr.) | Compressive strength (MPa) | Compressive strength ratio(%) |
|---|---|---|---|---|---|---|---|---|---|---|---|---|---|
|  |  | Type | Added amount (part by mass) | Type | Added amount (part by mass) | | | | | | | | |
| Comparative Examples | 2-1 | NSF | 0.660 | — | — | 0 | 0.0 | 0.66 | 190 | steam | 2.0 | 12.9 | 100 |
| | 2-2 | NSF | 0.656 | B-1 | 0.164 | 20 | 29.1 | 0.82 | 189 | steam | 2.0 | 12.8 | 99 |

TABLE 6

|  |  | Component (A) | | Component (B) | | (B)/[(A) + (B)] (mass %) | Molar ratio of (B)/ naphthalene ring (%) | Total added amount (part by mass) | Mortar flow (mm) | Curing condition | Pre-steaming time (hr.) | Compressive strength (MPa) | Compressive strength ratio(%) |
|---|---|---|---|---|---|---|---|---|---|---|---|---|---|
|  |  | Type | Added amount (part by mass) | Type | Added amount (part by mass) | | | | | | | | |
| Examples | 2-11 | NSF | 0.496 | B-11 | 0.124 | 20 | 7.0 | 0.62 | 190 | steam | 2.0 | 27.5 | 213 |
| | 2-27 | NSF | 0.558 | B-11 | 0.062 | 10 | 3.1 | 0.62 | 188 | steam | 2.0 | 23.1 | 179 |
| | 2-28 | NSF | 0.589 | B-11 | 0.031 | 5 | 1.5 | 0.62 | 182 | steam | 2.0 | 21.8 | 169 |
| | 2-29 | NSF | 0.647 | B-11 | 0.013 | 2 | 0.6 | 0.66 | 185 | steam | 2.0 | 16.5 | 128 |
| | 2-30 | NSF | 0.420 | B-11 | 0.180 | 30 | 12.0 | 0.60 | 192 | steam | 2.0 | 25.0 | 194 |
| | 2-31 | NSF | 0.390 | B-11 | 0.260 | 40 | 18.6 | 0.65 | 190 | steam | 2.0 | 19.4 | 150 |
| | 2-32 | NSF | 0.400 | B-11 | 0.400 | 50 | 27.9 | 0.80 | 192 | steam | 2.0 | 16.4 | 127 |
| | 2-33 | NSF | 0.480 | B-11 | 0.720 | 60 | 41.8 | 1.20 | 184 | steam | 2.0 | 15.2 | 118 |
| | 2-19 | NSF | 0.496 | B-19 | 0.124 | 20 | 6.1 | 0.62 | 191 | steam | 2.0 | 28.2 | 219 |
| | 2-34 | NSF | 0.558 | B-19 | 0.062 | 10 | 2.7 | 0.62 | 188 | steam | 2.0 | 28.8 | 223 |
| | 2-35 | NSF | 0.608 | B-19 | 0.032 | 5 | 1.3 | 0.64 | 192 | steam | 2.0 | 26.2 | 203 |
| | 2-36 | NSF | 0.647 | B-19 | 0.013 | 2 | 0.4 | 0.66 | 192 | steam | 2.0 | 19.4 | 150 |
| Comparative Examples | 2-1 | NSF | 0.660 | — | — | 0 | 0.0 | 0.66 | 190 | steam | 2.0 | 12.9 | 100 |
| | 2-3 | NSF | 0.480 | B-11 | 1.120 | 70 | 65.3 | 1.60 | 181 | steam | 2.0 | 13.3 | 103 |

In Tables 5 and 6, the added amount is an added amount of each component in terms of solid content relative to 100 parts by mass of cement (C).

Further, in Tables 5 and 6, the total added amount is an added amount of the total of components (A) and (B) in terms of solid content relative to 100 parts by mass of cement (C).

Further, in Tables 5 and 6, the compressive strength ratio is a relative value when the compressive strength of Comparative Example 2-1 was taken as 100%.

Example 3 and Comparative Example 3

Mortar was prepared in the same manner as in Example 2 by changing the mortar formulation as shown in Table 7, and the fluidity and the strength were evaluated. Results are shown in Table 8.

TABLE 7

| W/C (mass %) | Unit amount (g/batch) | | |
|---|---|---|---|
| | W | C | S |
| 35 | 140 | 400 | 700 |
| 40 | 160 | 400 | 700 |
| 45 | 180 | 400 | 700 |
| 50 | 200 | 400 | 700 |
| 55 | 220 | 400 | 700 |

TABLE 8

|  |  | W/C (mass %) | Component (A) | | Component (B) | | (B)/[(A) + (B)] (mass %) | Molar ratio of (B)/ naphthalene ring (%) | Total added amount (part by mass) | Mortar flow (mm) | Curing condition | Pre-steaming time (hr.) | Compressive strength (MPa) | Compressive strength ratio (%) |
|---|---|---|---|---|---|---|---|---|---|---|---|---|---|---|
|  |  | | Type | Added amount (part by mass) | Type | Added amount (part by mass) | | | | | | | | |
| Comparative Example | 2-1 | 35 | NSF | 0.660 | — | — | 0 | 0.0 | 0.66 | 190 | steam | 2.0 | 12.9 | 100 |
| Example | 2-28 | 35 | NSF | 0.589 | B-11 | 0.031 | 5 | 1.5 | 0.62 | 182 | steam | 2.0 | 21.8 | 169 |
| Example | 2-34 | 35 | NSF | 0.558 | B-19 | 0.062 | 10 | 2.7 | 0.62 | 188 | steam | 2.0 | 28.8 | 223 |

TABLE 8-continued

| | W/C (mass %) | Component (A) Type | Added amount (part by mass) | Component (B) Type | Added amount (part by mass) | (B)/[(A) + (B)] (mass %) | Molar ratio of (B)/ naphthalene ring (%) | Total added amount (part by mass) | Mortar flow (mm) | Curing condition | Pre-steaming time (hr.) | Compressive strength (MPa) | Compressive strength ratio (%) |
|---|---|---|---|---|---|---|---|---|---|---|---|---|---|
| Comparative Example 3-1 | 40 | NSF | 0.560 | — | — | 0 | 0.0 | 0.56 | 192 | steam | 2.0 | 12.6 | 100 |
| Example 3-1 | 40 | NSF | 0.513 | B-11 | 0.027 | 5 | 1.5 | 0.54 | 188 | steam | 2.0 | 17.6 | 140 |
| Example 3-2 | 40 | NSF | 0.486 | B-19 | 0.054 | 10 | 2.7 | 0.54 | 185 | steam | 2.0 | 19.2 | 152 |
| Comparative Example 3-2 | 45 | NSF | 0.440 | — | — | 0 | 0.0 | 0.44 | 191 | steam | 2.0 | 12.5 | 100 |
| Example 3-3 | 45 | NSF | 0.399 | B-11 | 0.021 | 5 | 1.5 | 0.42 | 193 | steam | 2.0 | 14.2 | 114 |
| Example 3-4 | 45 | NSF | 0.378 | B-19 | 0.042 | 10 | 2.7 | 0.42 | 192 | steam | 20 | 15.1 | 121 |
| Comparative Example 3-3 | 50 | NSF | 0.280 | — | — | 0 | 0.0 | 0.28 | 185 | steam | 2.0 | 11.8 | 100 |
| Example 3-5 | 50 | NSF | 0.257 | B-11 | 0.013 | 5 | 1.5 | 0.27 | 187 | steam | 2.0 | 12.6 | 107 |
| Example 3-6 | 50 | NSF | 0.243 | B-19 | 0.027 | 10 | 2.7 | 0.27 | 189 | steam | 2.0 | 12.8 | 108 |
| Test Example 3-1 | 55 | NSF | 0.220 | — | — | 0 | 0.0 | 0.22 | 185 | steam | 2.0 | 10.4 | 100 |
| Test Example 3-2 | 55 | NSF | 0.209 | B-11 | 0.011 | 5 | 1.5 | 0.22 | 190 | steam | 2.0 | 10.4 | 100 |
| Test Example 3-3 | 55 | NSF | 0.198 | B-19 | 0.022 | 10 | 2.7 | 0.22 | 192 | steam | 2.0 | 10.4 | 100 |
| Test Example 3-4 | 55 | NSF | 0.176 | B-19 | 0.044 | 10 | 6.1 | 0.22 | 198 | steam | 2.0 | 10.3 | 99 |

In Table 8, the added amount is an added amount of each component in terms of solid content relative to 100 parts by mass of cement (C).

Further, in Table 8, the total added amount is an added amount of the total of components (A) and (B) in terms of solid content relative to 100 parts by mass of cement (C).

Further, in Table 8, the compressive strength ratio is a relative value regarding each W/C, when the compressive strength of Comparative Example or Test Example 3-1 was taken as 100%.

When W/C was 55 mass %, the total added amount of components (A) and (B) for obtaining a predetermined mortar flow was 0.22 parts by mass. In this case, even combined use of components (A) and (B) did not change the compressive strength in comparison with the case where only component (A) was added. In addition, for mortar formulation with W/C being 55 mass %, when components (A) and (B) were added in total in amount of 0.27 parts by mass, material segregation was generated and fine aggregates (sand) were settled in the lower layer of the hardened product. This prevented accurate measurement.

Meanwhile, when W/C was 35 mass %, 45 mass % or 50 mass %, the total added amount of components (A) and (B) to provide a predetermined mortar flow had to be 0.25 parts by mass or more. In this case, it is understood that combined use of components (A) and (B) increased the compressive strength. In addition, for mortar formulation with W/C being 35 mass %, when components (A) and (B) were added in total in an amount of 0.22 parts by mass, no fluidity was developed and a hardened product for strength measurement could not be produced.

Example 4 and Comparative Example 4

Mortar was prepared in the same manner as in Example 2 by changing the types of cement as shown in Table 9, and the fluidity and the strength were evaluated. In some examples, temperature of raw materials for mortar formulation, temperatures of working environment, and temperatures at the start of temperature rise and at the end of temperature drop for steam curing were changed to 20° C. Results are shown in Table 9.

TABLE 9

| | Type of cement | Temp.* (° C.) | Component (A) Type | Added amount (part by mass) | Component (B) Type | Added amount (part by mass) | [(A) + (B)] (mass %) | Molar ratio of (B)/ naphtha- lene ring (%) | Total added amount (part by mass) | Mortar flow (mm) | Curing condition | Pre-steaming time (hr.) | Compressive strength (MPa) | Compressive strength ratio (%) |
|---|---|---|---|---|---|---|---|---|---|---|---|---|---|---|
| Comparative Example 4-1 | Thai | 30 | NSF | 0.440 | — | — | 0 | 0.0 | 0.44 | 192 | steam | 2.0 | 22.1 | 100 |
| Example 4-1 | Thai | 30 | NSF | 0.418 | B-11 | 0.022 | 5 | 1.5 | 0.44 | 191 | steam | 2.0 | 28.3 | 128 |
| Comparative Example 4-2 | Vietnam | 20 | NSF | 0.540 | — | — | 0 | 0.0 | 0.54 | 188 | steam | 2.0 | 13.2 | 100 |
| Example 4-2 | Vietnam | 20 | NSF | 0.513 | B-11 | 0.027 | 5 | 1.5 | 0.54 | 192 | steam | 2.0 | 18.3 | 139 |

TABLE 9-continued

| | Type of cement | Temp.* (° C.) | Component (A) Type | Component (A) Added amount (part by mass) | Component (B) Type | Component (B) Added amount (part by mass) | (B)/ [(A) + (B)] (mass %) | Molar ratio of (B)/ naphthalene ring (%) | Total added amount (part by mass) | Mortar flow (mm) | Curing condition | Pre-steaming time (hr.) | Compressive strength (MPa) | Compressive strength ratio (%) |
|---|---|---|---|---|---|---|---|---|---|---|---|---|---|---|
| Comparative Example 4-3 | Malaysia | 30 | NSF | 0.570 | — | — | 0 | 0.0 | 0.57 | 186 | steam | 2.0 | 16.4 | 100 |
| Example 4-3 | Malaysia | 30 | NSF | 0.523 | B-11 | 0.027 | 5 | 1.5 | 0.55 | 188 | steam | 2.0 | 22.1 | 135 |
| Comparative Example 4-4 | Indonesia | 30 | NSF | 0.600 | — | — | 0 | 0.0 | 0.60 | 195 | steam | 2.0 | 14.3 | 100 |
| Example 4-4 | Indonesia | 30 | NSF | 0.551 | B-11 | 0.029 | 5 | 1.5 | 0.58 | 193 | steam | 2.0 | 23.7 | 166 |
| Comparative Example 2-1 | Vietnam | 30 | NSF | 0.660 | — | — | 0 | 0.0 | 0.66 | 190 | steam | 2.0 | 12.9 | 100 |
| Example 2-28 | Vietnam | 30 | NSF | 0.589 | B-11 | 0.031 | 5 | 1.5 | 0.62 | 182 | steam | 2.0 | 21.8 | 169 |
| Comparative Example 4-5 | China | 20 | NSF | 0.800 | — | — | 0 | 0.0 | 0.80 | 188 | steam | 2.0 | 10.1 | 100 |
| Example 4-5 | China | 20 | NSF | 0.798 | B-11 | 0.042 | 5 | 1.5 | 0.84 | 192 | steam | 2.0 | 22.9 | 227 |

*Temperature: temperatures of raw materials for mortar formulation and working environments (room temperature) Types of cement in Table 9 are described below.
Cement of Vietnam: "PCB-40" manufactured by Nghi Son Cement Corporation
Cement of Thai: "Type 1" manufactured by The Siam Cement Public Company Ltd.
Cement of Malaysia: "OPC" manufactured by Lafarge Malaysia Berhad
Cement of Indonesia: "OPC" manufactured by PT Semen Indonesia (persero) Tbk
Cement of China: "52.5" manufactured by Anhui Conch Cement Company Limited In Table 9, the added amount is an added amount of each component in terms of solid content relative to 100 parts by mass of cement (C).

Further, in Table 9, the total added amount is an added amount of the total of components (A) and (B) in terms of solid content relative to 100 parts by mass of cement (C).

Further, in Table 9, the compressive strength ratio is a relative value regarding each cement, when the compressive strength of Comparative Example was taken as 100%.

Example 5 and Comparative Example 5

Mortar was prepared in the same manner as in Example 2 by changing the mortar formulation as shown in Table 10 and also changing the presteaming period and the period up to demolding as shown in Tables 11 and 12; and the fluidity and the strength right after demolding (indicated as "Right after demolding" in the tables) were evaluated. Results are shown in Tables 11 and 12. In Table 11, the strength exhibited 28 days later (indicated as "28 days later" in the table) is also shown. The period up to demolding is a period from the addition of mixing water (W) to the removal of the hardened product from the mold. Further, 28-day strength is a strength measured 28 days after the addition of mixing water (W) after the process including demolding 24 hours after the addition of the mixing water (W) and curing in water in a constant-temperature water bath at 30° C. In the case of "no steam" in the table, curing was conducted at the setting temperature (30° C.) from the addition of mixing water (W) to the strength measurement (24 hours later)

TABLE 10

| W/C | Unit amount (g/batch) | | |
|---|---|---|---|
| (mass %) | W | C | S |
| 35 | 140 | 400 | 700 |

TABLE 11

| | W/C (mass %) | Component (A) Type | Component (A) Added amount (part by mass) | Component (B) Type | Component (B) Added amount (part by mass) | (B)/ [(A) + (B)] (mass %) | Molar ratio of (B)/ naphthalene ring (%) | Total added amount (part by mass) | Mortar flow (mm) | Curing condition | Pre-steaming time (hr.) | Time till demolding (hr.) | Right after demolding Measured value (MPa) | Right after demolding Compressive strength ratio (%) | 28 days later Measured value (MPa) | 28 days later Compressive strength ratio (%) |
|---|---|---|---|---|---|---|---|---|---|---|---|---|---|---|---|---|
| Comparative Example 5-1 | 35 | NSF | 0.660 | — | — | 0 | 0.0 | 0.66 | 190 | steam | 3.0 | 7.0 | 21.7 | 100 | 37.1 | 100 |
| Example 5-1 | 35 | NSF | 0.589 | B-11 | 0.031 | 5 | 1.5 | 0.62 | 182 | steam | 3.0 | 7.0 | 33.1 | 153 | 64.0 | 173 |

TABLE 11-continued

| | | W/C (mass %) | Component (A) | | Component (B) | | (B)/[(A) + (B)] (mass %) | Molar ratio of (B)/ naphtha- lene ring (%) | Total added amount (part by mass) | Mor- tar flow (mm) | Curing con- dition | Pre- steam- ing time (hr.) | Time till de- mold- ing (hr.) | Compressive strength | | | |
|---|---|---|---|---|---|---|---|---|---|---|---|---|---|---|---|---|---|
| | | | | | | | | | | | | | | Right after demolding | | 28 days later | |
| | | | Type | Added amount (part by mass) | Type | Added amount (part by mass) | | | | | | | | Meas- ured value (MPa) | Com- pressive strength ratio (%) | Meas- ured value (MPa) | Com- pressive strength ratio (%) |
| Com- par- ative Exam- ple | 2-1 | 35 | NSF | 0.660 | — | — | 0 | 0.0 | 0.66 | 190 | steam | 2.0 | 6.0 | 12.9 | 100 | 27.5 | 100 |
| Exam- ple | 2-28 | 35 | NSF | 0.589 | B-11 | 0.031 | 5 | 1.5 | 0.62 | 182 | steam | 2.0 | 6.0 | 21.8 | 169 | 41.8 | 152 |
| Com- par- ative Exam- ple | 5-2 | 35 | NSF | 0.660 | — | — | 0 | 0.0 | 0.66 | 190 | steam | 1.0 | 5.0 | 9.7 | 100 | 32.9 | 100 |
| Exam- ple | 5-2 | 35 | NSF | 0.589 | B-11 | 0.031 | 5 | 1.5 | 0.62 | 182 | steam | 1.0 | 5.0 | 16.3 | 168 | 37.3 | 113 |
| Com- par- ative Exam- ple | 5-3 | 35 | NSF | 0.660 | — | — | 0 | 0.0 | 0.66 | 190 | steam | 0.5 | 4.5 | 8.7 | 100 | 37.9 | 100 |
| Exam- ple | 5-3 | 35 | NSF | 0.589 | B-11 | 0.031 | 5 | 1.5 | 0.62 | 182 | steam | 0.5 | 4.5 | 15.8 | 182 | 40.1 | 106 |
| Com- par- ative Exam- ple | 5-4 | 35 | NSF | 0.660 | — | — | 0 | 0.0 | 0.66 | 190 | no steam | (24) | 24.0 | 28.4 | 100 | 72.1 | 100 |
| Com- par- ative Exam- ple | 5-5 | 35 | NSF | 0.589 | B-11 | 0.031 | 5 | 1.5 | 0.62 | 182 | no steam | (24) | 24.0 | 29.6 | 104 | 75.2 | 104 |

TABLE 12

| | | W/C (mass %) | Component (A) | | Component (B) | | (B)/[(A) + (B)] (mass %) | Molar ratio of (B)/ naphthalene ring (%) | Total added amount (part by mass) | Mor- tar flow (mm) | Curing con- dition | Pre- steaming time (hr.) | Time till de- molding (hr.) | Com- pressive strength (right after de- molding) (MPa) | Com- pressive strength ratio (%) |
|---|---|---|---|---|---|---|---|---|---|---|---|---|---|---|---|
| | | | Type | Added amount (part by mass) | Type | Added amount (part by mass) | | | | | | | | | |
| Com- parative Example | 5-1 | 35 | NSF | 0.660 | — | — | 0 | 0.0 | 0.66 | 190 | steam | 3.0 | 7.0 | 21.7 | 100 |
| Example | 5-5 | 35 | NSF | 0.496 | B-11 | 0.124 | 20 | 7.0 | 0.62 | 182 | steam | 3.0 | 7.0 | 35.4 | 163 |
| Com- parative Example | 2-1 | 35 | NSF | 0.660 | — | — | 0 | 0.0 | 0.66 | 190 | steam | 2.0 | 6.0 | 12.9 | 100 |
| Example | 5-6 | 35 | NSF | 0.496 | B-11 | 0.124 | 20 | 7.0 | 0.62 | 190 | steam | 2.0 | 6.0 | 27.5 | 213 |
| Com- parative Example | 5-2 | 35 | NSF | 0.660 | — | — | 0 | 0.0 | 0.66 | 190 | steam | 1.0 | 5.0 | 9.7 | 100 |
| Example | 5-7 | 35 | NSF | 0.496 | B-11 | 0.124 | 20 | 7.0 | 0.62 | 182 | steam | 1.0 | 5.0 | 17.6 | 181 |
| Com- parative Example | 5-3 | 35 | NSF | 0.660 | — | — | 0 | 0.0 | 0.66 | 190 | steam | 0.5 | 4.5 | 8.7 | 100 |
| Example | 5-8 | 35 | NSF | 0.496 | B-11 | 0.124 | 20 | 7.0 | 0.62 | 182 | steam | 0.5 | 4.5 | 15.6 | 179 |
| Com- parative Example | 5-4 | 35 | NSF | 0.660 | — | — | 0 | 0.0 | 0.66 | 190 | no steam | (24) | 24.0 | 28.4 | 100 |
| Example | 5-6 | 35 | NSF | 0.496 | B-11 | 0.124 | 20 | 7.0 | 0.62 | 182 | no steam | (24) | 24.0 | 29.4 | 104 |

In Tables 11 and 12, the added amount is an added amount of each component in terms of solid content relative to 100 parts by mass of cement (C).

Further, in Tables 11 and 12, the total added amount is an added amount of the total of components (A) and (B) in terms of solid content relative to 100 parts by mass of cement (C).

Further, in Tables 11 and 12, the compressive strength ratio is a relative value regarding each presteaming period, when the compressive strength of Comparative Example was taken as 100%.

It is understood that, in the case of no steam curing, addition of components (A) and (B) in predetermined amounts hardly changes the compressive strength while in the case of steam curing, addition of components (A) and (B) in predetermined amounts increases the compressive strength. The same is true in the compressive strength after 28 days. In general, it is common knowledge to those skilled in the art that, when steam curing is conducted, 28-day strength is reduced in comparison with a case where steam curing is not conducted.

Example 6 and Comparative Example 6

Mortar was prepared in the same manner as in Example 2 by replacing a portion of cement in the mortar formulation of Example 2 with fly ash, and the fluidity and the strength were evaluated. Replacement rates with fly ash are shown in Table 13. In Table 13, FA is an abbreviation for fly ash. As fly ash, fly ash original powder from China was used. Results are shown in Table 14.

TABLE 13

| Fly ash replacement ratio (%) | W/(C + FA) (mass %) | Unit amount (g/batch) | | | |
|---|---|---|---|---|---|
| | | W | C | FA | S |
| 0 | 35 | 140 | 400 | 0 | 700 |
| 10 | 35 | 140 | 360 | 40 | 700 |
| 20 | 35 | 140 | 320 | 80 | 700 |

Further, in Table 14, the total added amount is an added amount of the total of components (A) and (B) in terms of solid content relative to 100 parts by mass of cement (C).

Further, in Table 14, the compressive strength ratio is a relative value regarding each fly ash replacement rate, when the compressive strength of Comparative Example was taken as 100%.

From the results of Table 14, it is understood that even when a portion of cement is replaced with fly ash, the present invention enables the strength improvement.

Example 7 and Comparative Example 7

(1) Mortar Formulation
Mortar formulation is shown in Table 15.

TABLE 15

| W/C | Unit amount (g/batch) | | |
|---|---|---|---|
| (mass %) | W | C | S |
| 23.8 | 142.8 | 600 | 857 |

Components in the table are as follows.
W: water from public water supply system in Wakayama
C: "PCT-40" manufactured by Nghi Son Cement Corporation (Vietnam)
S: fine aggregate (pit sand from Joyo area, particles having a particle size of 3.5 mm or more were removed)
W in Table 15 contains none of components selected from components (A), (B) and (C) used in Table 17.
Components (A), (B) and (C) in Table 17 are as follows.
[Component (A)]
  NSF: sodium salt of a formaldehyde naphthalenesulfonate condensate, weight average molecular weight: 15000
  This NSF was prepared based on Example of JP-A 48-11737.
[Component (B)]
  Components (B) shown in Table 16 were used.
[Component (C)]
  PCE (A): polycarboxylic acid-based dispersant, AQUPOL MAR502(S) manufactured by AK Chemtech Co., Ltd.

TABLE 14

| | | Fly ash replacement ratio (%) | Component (A) | | Component (B) | | (B)/[(A) + (B)] (mass %) | Molar ratio of (B)/ naphthalene ring (%) | Total added amount (part by mass) | Mortar flow (mm) | Curing condition | Presteaming time (hr.) | Compressive strength (MPa) | Compressive strength ratio (%) |
|---|---|---|---|---|---|---|---|---|---|---|---|---|---|---|
| | | | Type | Added amount (part by mass) | Type | Added amount (part by mass) | | | | | | | | |
| Comparative Example | 6-1 | 0 | NSF | 0.600 | — | — | 0 | 0.0 | 0.60 | 180 | steam | 2.0 | 16.5 | 100 |
| Example | 6-1 | 0 | NSF | 0.570 | B-19 | 0.030 | 5 | 1.3 | 0.60 | 188 | steam | 2.0 | 26.8 | 162 |
| Comparative Example | 6-2 | 10 | NSF | 0.600 | — | — | 0 | 0.0 | 0.60 | 166 | steam | 2.0 | 14.9 | 100 |
| Example | 6-2 | 10 | NSF | 0.570 | B-19 | 0.030 | 5 | 1.3 | 0.60 | 176 | steam | 2.0 | 19.6 | 132 |
| Comparative Example | 6-3 | 20 | NSF | 0.600 | — | — | 0 | 0.0 | 0.60 | 173 | steam | 2.0 | 12.2 | 100 |
| Example | 6-3 | 20 | NSF | 0.570 | B-19 | 0.030 | 5 | 1.3 | 0.60 | 173 | steam | 2.0 | 14.5 | 119 |

In Table 14, the added amount is an added amount of each component in terms of solid content relative to 100 parts by mass of cement (C).

PCE (B): methacrylic acid/methoxy polyethylene glycol (23) methacrylate=73/27 (molar ratio), prepared based on Production Example 11 of JP-A 8-12397

PCE (C): acrylic acid/methoxy polyethylene glycol (23) acrylate=77/23 (molar ratio), prepared based on Production Example 11 of JP-A 8-12397

PCE (D): polycarboxylic acid-based dispersant, AQUALOC HW-80 manufactured by Nippon Shokubai Co., Ltd.

(2) Method for Preparing Mortar

Temperatures of raw materials for mortar formulation and the temperature of working environment (room temperature) were both set to 30° C.

Into a mortar mixer (universal mixing stirrer, model: 5DM-03-γ manufactured by Dalton Corporation), a cement (C) and a fine aggregate (S) were fed and dry-mixed for 10 seconds at a low speed rotation (63 rpm) of the mortar mixer, and the mixing water (W) containing components (A), (B) and (C), an antifoaming agent, and water (W) at 30° C. was added. Then, the mixture was subjected to main kneading for 180 seconds at a low speed rotation (63 rpm) of the mortar mixer, so that a mortar was prepared.

As the antifoaming agent, Foamlex 797 (manufactured by Nicca Chemical Co., Ltd.) was added in an amount of 3 mass % relative to component (B).

Temperature rise for steam curing was conducted for 45 minutes from 30° C. to 75° C., which were setting temperatures for the thermo-hygrostat. Steam curing was conducted for 2.5 hours at a constant temperature of 75° C., which was a setting temperature for the thermo-hygrostat. Temperature drop for steam curing was conducted for 45 minutes from 75° C. to 30° C., which were setting temperatures for the thermo-hygrostat. Immediately after the setting temperature of the thermo-hygrostat reached 30° C., the strength was measured.

TABLE 16

| Component (B) | | |
|---|---|---|
| Mark | Type | Carbon No.* |
| B-27 | Polyoxyethylene (50) stearyl ether | 18 |
| B-28 | Polyoxyethylene (19) lauryl ether ammonium sulfate | 12 |
| B-29 | Polyoxyethylene (20) stearyl amine ether | 18 |

TABLE 17

| | | Component (A) | | Component (B) | | Component (C) | | (B)/ [(A)+(B)] (mass %) | Molar ratio of (B)/ naphthalene ring (%) | Total added amount* (part by mass) | Other additive | | Mortar flow (mm) | Compressive strength (MPa) | Compressive strength ratio (%) |
|---|---|---|---|---|---|---|---|---|---|---|---|---|---|---|---|
| | | Type | Added amount (part by mass) | Type | Added amount (part by mass) | Type | Added amount (part by mass) | | | | Type | Added amount (part by mass) | | | |
| Comparative Examples | 7-1 | NSF | 1.400 | — | — | — | — | 0 | 0.0 | 1.40 | — | — | 157 | 27.1 | 100 |
| | 7-2 | NSF | 0.180 | — | — | PCE(A) | 0.300 | — | — | 0.48 | — | — | not kneable, thus not measureable | | |
| Examples | 7-1 | NSF | 0.180 | B-27 | 0.120 | PCE(A) | 0.300 | 40 | 6.5 | 0.60 | — | — | 235 | 49.1 | 181 |
| | 7-2 | NSF | 0.180 | B-27 B-28 | 0.060 0.060 | PCE(A) | 0.300 | 20 | 11.2 | 0.60 | — | — | 198 | 50.2 | 185 |
| | 7-3 | NSF | 0.180 | B-29 | 0.120 | PCE(A) | 0.300 | 40 | 14.1 | 0.60 | — | — | 169 | 49.4 | 182 |
| | 7-4 | NSF | 0.180 | B-29 | 0.120 | PCE(B) | 0.300 | 40 | 14.1 | 0.60 | — | — | 141 | 44.6 | 164 |
| | 7-5 | NSF | 0.180 | B-29 | 0.120 | PCE(C) | 0.300 | 40 | 14.1 | 0.60 | — | — | 99 | 50.4 | 186 |
| | 7-6 | NSF | 0.180 | B-29 | 0.120 | PCE(D) | 0.300 | 40 | 14.1 | 0.60 | — | — | 105 | 51.9 | 192 |
| | 7-7 | NSF | 0.180 | B-29 | 0.090 | PCE(A) | 0.300 | 30 | 9.0 | 0.60 | — | — | 194 | 39.6 | 146 |
| | 7-8 | NSF | 0.180 | B-29 | 0.090 | PCE(A) | 0.300 | 30 | 9.0 | 0.60 | glycerin | 0.05 | 127 | 41.4 | 153 |
| | 7-9 | NSF | 0.180 | B-29 | 0.090 | PCE(A) | 0.300 | 30 | 9.0 | 0.60 | glycerin EDTA-4Na | 0.05 0.02 | 145 | 45.4 | 168 |
| | 7-10 | NSF | 0.210 | B-29 | 0.090 | PCE(A) | 0.300 | 30 | 9.0 | 0.60 | N-methyl-diethanolamine | 0.02 | 166 | 57.4 | 212 |

(3) Fluidity

In accordance with the test method of JIS R 5201, the flow of the prepared mortar was measured. Results are shown in Table 17.

In Examples, components (A) to (C) were added in total in an amount of 0.60 parts by mass relative to 100 parts by mass of cement.

(4) Strength

The mortar was hardened by a production method including steam curing, and the strength of the hardened product of the obtained mortar was tested in accordance with JIS A 1108 "Method of test for compressive strength of concrete."

Steam curing for obtaining the hardened product was conducted after a predetermined period of presteaming. The presteaming was conducted at 30° C. for 3 hours.

Steam curing was carried out at a humidity setting of 100% by use of a thermo-hygrostat "PR-3J" manufactured by Espec Corporation.

In Table 17, the added amount is an added amount of each component in terms of solid content relative to 100 parts by mass of cement (C).

Further, in Table 17, the total added amount is an added amount of the total of components (A), (B) and (C) in terms of solid content relative to 100 parts by mass of cement (C).

Further, in Table 17, the compressive strength ratio is a relative value when the compressive strength of Comparative Example 7-1 was taken as 100%.

When NSF as component (A) and PCE as component (C) are used in combination, the viscosity increases if component (B) is not added. Therefore, as shown in Comparative Example 7-2, even combined use of components (A) and (C) did not develop the fluidity of the hydraulic composition, without component (B).

Example 8 and Comparative Example 8

Concrete for centrifugal molding was prepared in the same manner as in Example 1 according to the concrete formulation of Table 18 by using components (A) and (B) in Table 19, and the moldability for centrifugal molding and the compressive strength were evaluated in the same manner as in Example 1. Results are shown in Table 19.

TABLE 18

| W/(C + P) (mass %) | Unit amount (kg/m³) | | | | |
|---|---|---|---|---|---|
| | W | C | P | S | G |
| 18.7 | 125 | 600 | 65 | 595 | 1100 |

$$R^{11}-O-(AO)_{n1}-SO_3M \quad (B1)$$

$$R^{21}-X-(AO)_{n2}-R^{22} \quad (B2)$$

(B3)

(B4)

TABLE 19

| | | Component (A) | | Component (B) | | Total added amount (part by mass) | (B)/[(A) + (B)] (mass %) | Molar ratio of (B)/ naphthalene ring (%) | Compressive strength (MPa) | Moldability |
|---|---|---|---|---|---|---|---|---|---|---|
| | | Type | Added amount (part by mass) | Type | Added amount (part by mass) | | | | | |
| Example | 8-1 | NSF | 0.98 | B-19 | 0.02 | 1.00 | 2.0 | 0.5 | 130 | A |
| | 8-2 | NSF | 0.85 | B-19 | 0.05 | 0.90 | 5.6 | 1.4 | 131 | AA |
| | 8-3 | NSF | 0.72 | B-19 | 0.08 | 0.80 | 10.0 | 2.7 | 133 | AA |
| | 8-4 | NSF | 0.66 | B-19 | 0.17 | 0.70 | 20.5 | 6.3 | 136 | AA |
| | 8-5 | NSF | 0.49 | B-19 | 0.21 | 0.70 | 30.0 | 10.5 | 138 | AA |
| | 8-6 | NSF | 0.66 | B-20 | 0.17 | 0.70 | 20.5 | 5.0 | 137 | AA |
| | 8-7 | NSF | 0.66 | B-21 | 0.17 | 0.70 | 20.5 | 3.6 | 134 | AA |
| | 8-8 | NSF | 0.66 | B-22 | 0.17 | 0.65 | 20.5 | 1.9 | 136 | AA |
| | 8-9 | NSF | 0.98 | B-9 | 0.02 | 1.00 | 2.0 | 0.3 | 130 | A |
| | 8-10 | NSF | 0.85 | B-13 | 0.05 | 0.90 | 5.6 | 1.1 | 131 | AA |
| | 8-11 | NSF | 0.66 | B-13 | 0.17 | 0.80 | 20.5 | 4.9 | 133 | AA |
| Comparative Examples | 8-1 | NSF | 1.5 | — | — | 1.50 | — | — | 69.4 | C |
| | 8-2 | NSF | 2.5 | — | — | 2.50 | — | — | 124 | AA |

In Table 19, the added amount is an added amount of each component in terms of solid content relative to 100 parts by mass of cement (C).

Further, in Table 19, the total added amount is an added amount of the total of components (A) and (B) in terms of solid content relative to 100 parts by mass of cement (C).

The invention claimed is:

1. A method for producing a hardened product of a hydraulic composition, the method comprising:
   mixing water, a hydraulic powder, a dispersant composition, and an aggregate to prepare a hydraulic composition;
   filling the hydraulic composition into a mold; and
   steam curing, in the mold, the hydraulic composition filled into the mold;
   wherein:
   the dispersant composition comprises (A), (B) and optionally (C):
   (A) a formaldehyde naphthalenesulfonate condensate or a salt thereof;
   (B) one or more compounds selected from compounds represented by formula (B1), compounds represented by formula (B2), compounds represented by formula (B3), and compounds represented by formula (B4);

wherein:
$R^{11}$, $R^{21}$, $R^{31}$ and $R^{41}$ each independently represent a hydrocarbon group having a carbon number of 4 or more and 27 or less;
$R^{22}$ represents a hydrogen atom or an alkyl group having a carbon number of 1 or more and 3 or less;
$R^{32}$ and $R^{33}$ are the same or different, and each represents a hydrogen atom or an alkyl group having a carbon number of 1 or more and 3 or less;
X represents O or COO;
AO represents an alkyleneoxy group having a carbon number of 2 or more and 4 or less;
$n_1$ represents an average number of moles of added AO and is 1 or more and 200 or less;
$n_2$ represents an average number of moles of added AO and is 1 or more and 200 or less;
$n_3$ and $n_4$ are the same or different, and each represents an average number of moles of added AO and is 0 or more, and the total of $n_3$ and $n_4$ is 1 or more and 200 or less;
$Y^1$ and $Y^2$ are the same or different, and each represents a hydrogen atom or $SO_3M$, and at least one of $Y^1$ and $Y^2$ is $SO_3M$;
$n_5$ and $n_6$ are the same or different, and each represents an average number of moles of added AO and is 0 or more, and the total of $n_5$ and $n_6$ is 1 or more and 200 or less; when $n_5$ is 0, $Y^1$ is a hydrogen atom; and when $n_6$ is 0, $Y^2$ is a hydrogen atom; and
M is a counter ion; and (C) a polycarboxylic acid-based copolymer;
the hydraulic composition has a water/hydraulic powder ratio of 10 mass % or more and 53 mass % or less;
a total amount of (A) and (B) in the hydraulic composition is 025 parts by mass or more and 10 parts by mass or less relative to 100 parts by mass of the hydraulic powder;
the dispersant composition comprises (A) and (B) so that an amount of (B) is 1 mass % or more and 60 mass % or less relative to a total amount of (A) and (B); and
the dispersant composition comprises (C) in an amount of 30 mass % or less based on solid content.

2. The method according to claim 1, wherein the dispersant composition comprises (A) and (C) so that a mass ratio of (C) to (A), (C)/(A) is over 0/100 and 50/50 or less.

3. The method according to claim 1, wherein the dispersant composition comprises (C) in an amount of 1 mass % or more and 30 mass % or less based on solid content.

4. The method according to claim 1, wherein (B) comprises one or more compounds selected from compounds represented by formula (B1), compounds represented by formula (B2), and compounds represented by formula (B3).

5. The method according to claim 1, wherein the dispersant composition comprises (A) in an amount of 1 mass % or more and 99 mass % or less based on solid content.

6. The method according to claim 1, wherein the dispersant composition comprises (B) in an amount of 2 mass % or more and 90 mass % or less based on solid content.

7. The method according to claim 1, wherein:
the dispersant composition is in the form of a liquid comprising water; and
the dispersant composition comprises (A) in an amount of 1 mass % or more and 50 mass % or less.

8. The method according to claim 1, wherein:
the dispersant composition is in the form of a liquid comprising water; and
the dispersant composition comprises (B) in an amount of 1 mass % or more and 60 mass % or less.

9. The method according to claim 1, wherein (A) is present in the hydraulic composition in an amount of 0.15 parts by mass or more and 9.9 parts by mass or less relative to 100 parts by mass of the hydraulic powder.

10. The method according to claim 1, wherein (B) is present in the hydraulic composition in an amount of 0.0025 parts by mass or more and 6 parts by mass or less relative to 100 parts by mass of the hydraulic powder.

11. The method according to claim 3, wherein the dispersant composition comprises (A) and (C) so that a mass ratio of (C) to (A), (C)/(A), is over 0/100 and 50/50 or less.

12. The method according to claim 3, wherein (B) comprises one or more compounds selected from compounds represented by formula (B1), compounds represented by formula (B2), and compounds represented by formula (B3).

13. The method according to claim 3, wherein the dispersant composition comprises (A) in an amount of 1 mass % or more and 99 mass % or less based on solid content.

14. The method according to claim 3, wherein the dispersant composition comprises (B) in an amount of 2 mass % or more and 90 mass % or less based on solid content.

15. The method according to claim 3, wherein:
the dispersant composition is in the form of a liquid comprising water; and
the dispersant composition comprises (A) in an amount of 1 mass % or more and 50 mass % or less.

16. The method according to claim 3, wherein:
the dispersant composition is in the form of a liquid comprising water; and
the dispersant composition comprises 03) in an amount of 1 mass % or more and 60 mass % or less.

17. The method according to claim 3, wherein (A) is present in the hydraulic composition in an amount of 0.15 parts by mass or more and 9.9 parts by mass or less relative to 100 parts by mass of the hydraulic powder.

18. The method according to claim 3, wherein (B) is present in the hydraulic composition in an amount of 0.0025 parts by mass or more and 6 parts by mass or less relative to 100 parts by mass of the hydraulic powder.

* * * * *